(12) United States Patent
Hunt

(10) Patent No.: US 10,445,702 B1
(45) Date of Patent: Oct. 15, 2019

(54) PERSONAL ADAPTIVE SCHEDULING SYSTEM AND ASSOCIATED METHODS

(71) Applicant: John E. Hunt, Hanstedt (DE)

(72) Inventor: John E. Hunt, Hanstedt (DE)

( * ) Notice: Subject to any disclaimer, the term of this patent is extended or adjusted under 35 U.S.C. 154(b) by 597 days.

(21) Appl. No.: 15/198,393

(22) Filed: Jun. 30, 2016

(51) Int. Cl.
*G06Q 10/10* (2012.01)
(52) U.S. Cl.
CPC ..... *G06Q 10/1091* (2013.01); *G06Q 10/1097* (2013.01)
(58) Field of Classification Search
None
See application file for complete search history.

(56) References Cited

U.S. PATENT DOCUMENTS

| | | | |
|---|---|---|---|
| 5,247,438 A | 9/1993 | Subas et al. | |
| 5,586,021 A * | 12/1996 | Fargher | G05B 19/41865 700/100 |
| 5,692,125 A | 11/1997 | Schloss et al. | |
| 5,873,108 A | 2/1999 | Goyal et al. | |
| 5,991,742 A | 11/1999 | Tran | |
| 6,047,260 A | 4/2000 | Levinson | |
| 7,139,720 B1 | 11/2006 | Foell et al. | |
| 7,318,040 B2 | 1/2008 | Doss et al. | |
| 7,925,528 B2 | 4/2011 | Biazetti et al. | |
| 8,005,703 B2 | 4/2011 | Chakra et al. | |
| 8,484,060 B2 | 7/2013 | D'Andrea et al. | |
| 8,533,716 B2 | 9/2013 | Lippett | |

(Continued)

FOREIGN PATENT DOCUMENTS

| | | |
|---|---|---|
| WO | WO 2002062019 | 8/2002 |
| WO | WO 2009055425 | 4/2009 |
| WO | WO 2014175895 | 10/2014 |

OTHER PUBLICATIONS

Author is Long Han; Article "Boostivity-free tools and techniques for activities tracking & management you need to boost up and continuous improve productivity"; Dated Jul. 10, 2015; can be found at <[http://itunes.apple.com/us/app/boostivity-free-tools-techniques/id802034335?mt=8>] (3 Pages).

(Continued)

*Primary Examiner* — Leland Marcus
(74) *Attorney, Agent, or Firm* — Mark Malek; Paul J. Ditmyer; Widerman Malek, PL

(57) ABSTRACT

System and associated methods for calculating and displaying time management objects in the form of an effort-scaled, Gantt-style bar chart characterized by a series of flexible, time-zone-specific work intervals representing time spans within which effort may be focused on work events. Activity bar segments representing certain work events comprise temporal (e.g., horizontal) extents representing time potentially available for expending effort. Display features include sequential, cascading arrangement of activity bar segments in the chart, preserved by automatically preventing temporal overlapping of activity bar segments and by automatically resequencing and rescheduling activity bar segments in the chart (from earlier to later) when the activities' priorities (from top to bottom in the To Do list) are changed. Display features further include the ongoing calculation and application of an adjustment experience factor and/or interruption experience factor when scheduling future activities.

38 Claims, 66 Drawing Sheets

(56) References Cited

U.S. PATENT DOCUMENTS

| | | | |
|---|---|---|---|
| 8,543,438 B1* | 9/2013 | Fleiss | G06Q 10/0631 705/7.13 |
| 8,776,087 B2 | 7/2014 | Chun | |
| 8,812,339 B1 | 8/2014 | Stone | |
| 8,880,419 B2 | 11/2014 | Chen et al. | |
| 9,164,656 B1* | 10/2015 | Keller | G05B 19/41865 |
| 2001/0008404 A1* | 7/2001 | Naito | G06F 3/14 715/745 |
| 2001/0032110 A1* | 10/2001 | Sinex | G06Q 10/025 701/29.4 |
| 2002/0069001 A1* | 6/2002 | Sinex | G06Q 10/025 701/33.9 |
| 2002/0077842 A1* | 6/2002 | Charisius | G06Q 10/06 705/1.1 |
| 2002/0188597 A1* | 12/2002 | Kern | G06Q 10/06 |
| 2003/0074391 A1* | 4/2003 | Carter | G06Q 10/04 709/200 |
| 2004/0030992 A1* | 2/2004 | Moisa | G06Q 10/06 715/234 |
| 2005/0165631 A1 | 7/2005 | Horvitz | |
| 2005/0182773 A1* | 8/2005 | Feinsmith | G06Q 10/10 |
| 2006/0044307 A1* | 3/2006 | Song | G06Q 10/06 345/419 |
| 2006/0238538 A1* | 10/2006 | Kapler | G06Q 10/06 345/440 |
| 2006/0265418 A1 | 11/2006 | Dolezal et al. | |
| 2007/0056727 A1* | 3/2007 | Newman | E21B 41/00 166/250.01 |
| 2007/0073575 A1* | 3/2007 | Yomogida | G06Q 10/06 705/7.15 |
| 2008/0162615 A1 | 7/2008 | Hurmola et al. | |
| 2009/0133027 A1* | 5/2009 | Gunning | G06Q 10/06 718/103 |
| 2010/0010856 A1* | 1/2010 | Chua | G06Q 10/00 705/7.13 |
| 2010/0017740 A1* | 1/2010 | Gonzalez Veron | G06F 3/0481 715/777 |
| 2010/0088140 A1 | 4/2010 | Gil et al. | |
| 2010/0269049 A1 | 10/2010 | Fearon | |
| 2011/0288900 A1 | 11/2011 | McQueen et al. | |
| 2012/0311586 A1* | 12/2012 | Inagaki | G06F 9/4881 718/100 |
| 2013/0054289 A1* | 2/2013 | SenGupta | G06Q 10/06 705/7.13 |
| 2014/0059562 A1* | 2/2014 | Kuruma | G06F 9/4843 718/106 |
| 2015/0046856 A1* | 2/2015 | Rucker | G06F 3/04883 715/765 |
| 2015/0058324 A1 | 2/2015 | Kauwe | |
| 2015/0154524 A1 | 6/2015 | Borodow et al. | |
| 2015/0379448 A1* | 12/2015 | Santos | G06Q 10/06313 705/7.23 |
| 2017/0140308 A1* | 5/2017 | Cano Zapata | G06Q 10/0633 |

OTHER PUBLICATIONS

Author is Ten Six Consulting; Article "Scheduling a Task Interruption in Microsoft Project 2013"; Dated Dec. 16, 2014; can be found at [<https://tensix.com/2014/12/scheduling-a-task-interruption-in-microsoft-project-2013/>] (6 Pages).

Author is Animal Protection Society Management; Operational Management Model "Project & Time Management"; can be found at [<worldanimal.net/documents/4_Projects_Time_Management.pdf>] (20 Pages).

Author is Erik Couture; Article "Bridging the Gantt"; Dated Dec. 22, 2013; can be found at [<http://www.sans.org/reading-room/whitepapers/leadership/bridging-gantt-34440>] (24 Pages).

Author is Openoffice.org; Article Project-Management with Gannt-Charts, first English edition; Dated Nov. 9, 2005; can be found at [<www.openoffice.org/documentation/HOW_TO?spreadsheet/gannt_pm.pdf>] (27 Pages).

* cited by examiner

Network installation

| Variant | When did the interrup. start? | When did the interrup. end? | Reschedule interrupted work? | Behavior |
|---|---|---|---|---|
| 1 | Now | (fields are disabled; no parameter entry possible) | (field is disabled; no parameter entry possible) | Application enters interruption mode, causing the unexecuted portion of any activities that are currently executing, or any future activities, to be rescheduled farther into the future as the interruption continues; an interruption bar is inserted starting at the point where the Now line was when the interruption was initiated by the user, and extends as the Now line advances. |
| 2 | N minutes ago | It is still continuing | No (unchecked) | An interruption bar is inserted starting at a point that is N minutes prior to the Now line (or starting at the first work-interval boundary which follows that point if it does not fall within a work interval) and extending to the Now line; the application enters interruption mode, causing the unexecuted portion of any activity that is currently executing, and any future activities, to be rescheduled farther into the future as the interruption continues and the interruption bar to be extended as the Now line advances. |
| 3 | N minutes ago | It is still continuing | Yes (checked) | An interruption bar is inserted starting at a point that is N minutes prior to the Now line (or starting at the first work-interval boundary which follows that point if it does not fall within a work interval) and extending to the Now line; the past portions of activities falling within the time span of the interruption are automatically rescheduled to a point after the Now line and marked as unexecuted. The application enters interruption mode, causing the unexecuted portion of any activity that is currently executing, and any future activities, to be rescheduled farther into the future as the interruption continues and the interruption bar to be extended as the Now line advances. |
| 4 | At a specific time in the past | It is still continuing | No | An interruption bar is inserted starting at the specified starting point (or starting at the first work-interval boundary which follows that point if it does not fall within a work interval) and extending to the Now line; other behaviors as in Variant 2. |
| 5 | At a specific time in the past | It is still continuing | Yes | An interruption bar is inserted starting at the specified starting point (or starting at the first work-interval boundary which follows that point if it does not fall within a work interval) and extending to the Now line; other behaviors as in Variant 3. |

FIG. 5A

| Variant | When did the interrup. start? | When did the interrup. end? | Reschedule interrupted work? | Behavior |
|---|---|---|---|---|
| 6 | N minutes ago | Now | No | An interruption bar is inserted starting at a point that is N minutes prior to the Now line (or starting at the first work-interval boundary which follows that point if it does not fall within a work interval) and extending to the Now line. The application remains in normal mode, causing the activity that is currently executing and any future activities to continue feeding into the execution lane as the Now line advances. |
| 7 | N minutes ago | Now | Yes | An interruption bar is inserted starting at a point that is N minutes prior to the Now line (or starting at the first work-interval boundary which follows that point if it does not fall within a work interval) and extending to the Now line; the past portions of activities falling within the time span of the interruption are automatically rescheduled to a point after the Now line and marked as unexecuted. The application remains in normal mode, causing the activity that is currently executing and any future activities to continue feeding into the execution lane as the Now line advances. |
| 8 | At a specific time in the past | Now | No | An interruption bar is inserted starting at the specified starting point (or starting at the first work-interval boundary which follows that point if it does not fall within a work interval) and extending to the Now line; other behaviors as in Variant 6. |
| 9 | At a specific time in the past | Now | Yes | An interruption bar is inserted starting at the specified starting point (or starting at the first work-interval boundary which follows that point if it does not fall within a work interval) and extending to the Now line; other behaviors as in Variant 7. |
| 10 | N minutes ago | M minutes ago (at a point after the starting time) | No | An interruption bar is inserted starting at a point that is N minutes prior to the Now line (or starting at the first work-interval boundary which follows that point if it does not fall within a work interval) and extending to a point that is M minutes prior to the Now line (or extending to the first work-interval boundary which precedes that point if it does not fall within a work interval). The application remains in normal mode, causing the unexecuted portion of any activity that is currently executing, or any future activities, to continue feeding into the execution lane as the Now line advances. |

FIG. 5B

| Variant | When did the interrup. start? | When did the interrup. end? | Reschedule interrupted work? | Behavior |
|---|---|---|---|---|
| 11 | N minutes ago | M minutes ago (at a point after the starting time) | Yes | An interruption bar is inserted starting at a point that is N minutes prior to the Now line (or starting at the first work-interval boundary which follows that point if it does not fall within a work interval) and extending to a point that is M minutes prior to the Now line (or extending to the first work-interval boundary which precedes that point if it does not fall within a work interval); the past portions of activities falling within the time span of the interruption are automatically rescheduled to a point after the interruption and marked as unexecuted or executed depending on whether they were displaced past the Now line. The application remains in normal mode, causing the unexecuted portion of any activity that is currently executing, or any future activities, to continue feeding into the execution lane as the Now line advances. |
| 12 | N minutes ago | At a specific time in the past (at a point after the starting time) | No | An interruption bar is inserted starting at a point that is N minutes prior to the Now line (or starting at the first work-interval boundary which follows that point if it does not fall within a work interval) and extending to the specified ending point (or extending to the first work-interval boundary which precedes that point if it does not fall within a work interval); other behaviors as in Variant 10. |
| 13 | N minutes ago | At a specific time in the past (at a point after the starting time) | Yes | An interruption bar is inserted starting at a point that is N minutes prior to the Now line (or starting at the first work-interval boundary which follows that point if it does not fall within a work interval) and extending to the specified ending point (or extending to the first work-interval boundary which precedes that point if it does not fall within a work interval); other behaviors as in Variant 11. |

FIG. 5C

| Variant | When did the interrup. start? | When did the interrup. end? | Reschedule interrupted work? | Behavior |
|---|---|---|---|---|
| 14 | At a specific time in the past | $M$ minutes ago (at a point after the starting time) | No | An interruption bar is inserted starting at the specified starting point (or starting at the first work-interval boundary which follows that point if it does not fall within a work interval) and extending to a point that is $M$ minutes prior to the Now line (or extending to the first work-interval boundary which precedes that point if it does not fall within a work interval); other behaviors as in Variant 10. |
| 15 | At a specific time in the past | $M$ minutes ago (at a point after the starting time) | Yes | An interruption bar is inserted starting at the specified starting point (or starting at the first work-interval boundary which follows that point if it does not fall within a work interval) and extending to a point that is $M$ minutes prior to the Now line (or extending to the first work-interval boundary which precedes that point if it does not fall within a work interval); other behaviors as in Variant 11. |
| 16 | At a specific time in the past | At a specific time in the past (at a point after the starting time) | No | An interruption bar is inserted starting at the specified starting point (or starting at the first work-interval boundary which follows that point if it does not fall within a work interval) and extending to the specified ending point (or extending to the first work-interval boundary which precedes that point if it does not fall within a work interval); other behaviors as in Variant 10. |
| 17 | At a specific time in the past | At a specific time in the past (at a point after the starting time) | Yes | An interruption bar is inserted starting at the specified starting point (or starting at the first work-interval boundary which follows that point if it does not fall within a work interval) and extending to the specified ending point (or extending to the first work-interval boundary which precedes that point if it does not fall within a work interval); other behaviors as in Variant 11. |

| For time locale: Mountain | | Starting: 2015-04-04 00:00 MDT | | | (MDT = UTC minus 6 hours) |
|---|---|---|---|---|---|
| Day of wk. | Begin Time (local) | End Time (local) | Duration (in 10ths of an hour) | Duration (in minutes) | |
| So. | - | - | 0.0 | 0 | |
| Mo. | 9:00 | 18:00 | 9.0 | 540 | |
| Tu. | 9:00 | 18:00 | 9.0 | 540 | |
| We. | 9:00 | 18:00 | 9.0 | 540 | |
| Th. | 9:00 | 18:00 | 9.0 | 540 | |
| Fr. | 9:00 | 18:00 | 9.0 | 540 | |
| Sa. | - | - | 0.0 | 0 | |

| For time locale: Pacific | | Starting: 2015-05-01 00:00 PDT | | | (PDT = UTC minus 7 hours) |
|---|---|---|---|---|---|
| Day of wk. | Begin Time (local) | End Time (local) | Duration (in 10ths of an hour) | Duration (in minutes) | |
| So. | - | - | 0.0 | 0 | |
| Mo. | 8:00 | 17:00 | 9.0 | 540 | |
| Tu. | 10:00 | 15:00 | 5.0 | 300 | |
| We. | - | - | 0.0 | 0 | |
| Th. | 9:30 | 11:48 | 2.3 | 138 | |
| Fr. | 9:00 | 18:00 | 9.0 | 540 | |
| Sa. | - | - | 0.0 | 0 | |

| For time locale: Mountain | | Starting: 2015-05-15 00:00 MDT | | | (MDT = UTC minus 6 hours) |
|---|---|---|---|---|---|
| Day of wk. | Begin Time (local) | End Time (local) | Duration (in 10ths of an hour) | Duration (in minutes) | |
| So. | - | - | 0.0 | 0 | |
| Mo. | 9:00 | 18:00 | 9.0 | 540 | |
| Tu. | 9:00 | 18:00 | 9.0 | 540 | |
| We. | 9:00 | 18:00 | 9.0 | 540 | |
| Th. | 9:00 | 18:00 | 9.0 | 540 | |
| Fr. | 9:00 | 18:00 | 9.0 | 540 | |
| Sa. | - | - | 0.0 | 0 | |

```sql
with WorkIntervalsToLoad as
(
  select workintervalid from
  (
    -- most recent N complete work intervals ending before NowUtc
    select w.workintervalid from workinterval w
    join chart c on c.chartid = w.chartid
    where w.endutc <= c.nowutc and w.chartid = :bvChartId
    order by w.endutc desc
  ) where rownum <= :bvNumWIsBeforeNow
  UNION
  -- all work intervals ending between NowUtc and the current time (useful when restarting)
  select w.workintervalid from workinterval w
  join chart c on c.chartid = w.chartid
  where w.chartid = :bvChartId and w.endutc > c.nowutc
  and w.endutc <= CURRENT_TIMESTAMP AT TIME ZONE 'UTC'
  UNION
  -- first M work intervals ending after the current time
  select w.workintervalid from
  (
    select w.workintervalid from workinterval w
    join chart c on c.chartid = w.chartid
    where w.chartid = :bvChartId and w.endutc > CURRENT_TIMESTAMP AT TIME ZONE 'UTC'
    order by w.endutc asc
  ) where rownum <= :bvNumWIsAfterCurrTime
  UNION
  -- all work intervals ending after the current time and extending past the last scheduled activity
  select w.workintervalid from workinterval w
  join chart c on c.chartid = w.chartid
  where w.chartid = :bvChartId and w.endutc > CURRENT_TIMESTAMP AT TIME ZONE 'UTC'
  and w.beginutc < (select max(a.endutc) from activity a where a.chartid = :bvChartId)
)
select
  to_char(w.beginutc, 'YYYY-MM-DD HH24:MI') beginutc,
  to_char(w.endutc,   'YYYY-MM-DD HH24:MI') endutc,
  t.LOCALENAME,
  to_char(from_tz(w.beginutc, 'UTC') at time zone t.LOCALESTRKEY, 'Dy Mon DD, HH24:MI ') localebegin,
  to_char(from_tz(w.endutc,   'UTC') at time zone t.LOCALESTRKEY, 'Dy Mon DD, HH24:MI ') localeend,
  sum(w.lenimmin + :bvWIDividerLenInMin) over (order by w.beginutc) - w.lenimmin cfsfromchartorigin,
  w.lenimmin
from workinterval w
join WorkIntervalsToLoad wil on wil.workintervalid = w.workintervalid
join timelocale t on t.LOCALEID = w.LOCALEID
where w.chartid = :bvChartId
order by w.beginutc;
```

FIG. 17

| BeginUtc | EndUtc | LocaleName | LocaleBegin | LocaleEnd | OfsFrom-ChartOrigin | LeninMin |
|---|---|---|---|---|---|---|
| 2015-04-28 15:00 | 2015-04-29 00:00 | US/Mountain | Tue Apr 28, 09:00 | Tue Apr 28, 18:00 | 3 | 540 |
| 2015-04-29 15:00 | 2015-04-30 00:00 | US/Mountain | Wed Apr 29, 09:00 | Wed Apr 29, 18:00 | 546 | 540 |
| 2015-04-30 15:00 | 2015-05-01 00:00 | US/Mountain | Thu Apr 30, 09:00 | Thu Apr 30, 18:00 | 1089 | 540 |
| 2015-05-01 16:00 | 2015-05-02 01:00 | US/Pacific | Fri May 01, 09:00 | Fri May 01, 18:00 | 1632 | 540 |
| 2015-05-04 15:00 | 2015-05-05 00:00 | US/Pacific | Mon May 04, 08:00 | Mon May 04, 17:00 | 2175 | 540 |
| 2015-05-05 17:00 | 2015-05-05 22:00 | US/Pacific | Tue May 05, 10:00 | Tue May 05, 15:00 | 2718 | 300 |
| 2015-05-07 16:30 | 2015-05-07 18:48 | US/Pacific | Thu May 07, 09:30 | Thu May 07, 11:48 | 3021 | 138 |
| 2015-05-08 16:00 | 2015-05-09 01:00 | US/Pacific | Fri May 08, 09:00 | Fri May 08, 18:00 | 3162 | 540 |
| 2015-05-11 15:00 | 2015-05-12 00:00 | US/Pacific | Mon May 11, 08:00 | Mon May 11, 17:00 | 3705 | 540 |
| 2015-05-12 17:00 | 2015-05-12 22:00 | US/Pacific | Tue May 12, 10:00 | Tue May 12, 15:00 | 4248 | 300 |
| 2015-05-14 16:30 | 2015-05-14 18:48 | US/Pacific | Thu May 14, 09:30 | Thu May 14, 11:48 | 4551 | 138 |
| 2015-05-15 15:00 | 2015-05-16 00:00 | US/Mountain | Fri May 15, 09:00 | Fri May 15, 18:00 | 4692 | 540 |
| 2015-05-18 15:00 | 2015-05-19 00:00 | US/Mountain | Mon May 18, 09:00 | Mon May 18, 18:00 | 5235 | 540 |

```
function GetFirstWholeHour(parBeginTime in timestamp, parFirstHour out timestamp, parOfsInMin out number)
return number
is
  BeginMinutes number; -- the minutes component of parBeginTime
begin
  BeginMinutes := extract(minute from parBeginTime);
  if BeginMinutes > 0 then
    parFirstHour := parBeginTime - numtodsinterval(BeginMinutes, 'minute') + interval '1' hour;
    parOfsInMin := 60 - BeginMinutes;
  else
    parFirstHour := parBeginTime - numtodsinterval(BeginMinutes, 'minute');
    parOfsInMin := 0;
  end if;
  return p_const.ERROR_OK;
exception
  when others then
    dbms_output.put_line('Error in GetFirstWholeHour: '||sqlcode||' '||sqlerrm);
    return p_const.ERROR_UNKNOWN;
end GetFirstWholeHour;

function GetWholeHourTimes(parBeginTime in timestamp, parEndTime in timestamp,
  parWholeHourTimes out t_WholeHourTimesCursor) return number
is
  CallResult number;
  FirstHour timestamp; -- the first whole-hour time on or after parBeginTime, e.g. '2015-04-15 09:00'
  FirstOfsInMin number; -- offset in minutes of FirstHour from parBeginTime
begin
  -- validate parameters
  if (parBeginTime is null) or (parEndTime is null) or (parBeginTime >= parEndTime) or
    (parEndTime - parBeginTime > interval '24' hour)
  then
    return p_const.ERROR_INVALID_PARAM;
  end if;

CallResult := GetFirstWholeHour(parBeginTime, FirstHour, FirstOfsInMin);
  if CallResult <> p_const.ERROR_OK then
    return CallResult;
  end if;

open parWholeHourTimes for
    with
      -- joinable list of numbers from 0 to 25
      hour_offsets as (select rownum - 1 HOUR_OFFSET from dual connect by rownum < 27),
      -- a single row containing a timestamp value
      starting_time as (select FirstHour from dual),
      whole_hour_times as
      (
        select
          -- 'MON APR 13', 'TUE APR 14' etc.
          to_char(st.FirstHour + numtodsinterval(ho.HOUR_OFFSET, 'hour'), 'DY MON DD') DAY_OF_WEEK,
          -- 9, 10, 11, 12, 1, 2, 3 etc.
          trim(leading '0' from to_char(st.FirstHour + numtodsinterval(ho.HOUR_OFFSET, 'hour'), 'HH'))
            WHOLE_HOUR_TIME,
          to_char(st.FirstHour + numtodsinterval(ho.HOUR_OFFSET, 'hour'), 'AM') AM_PM,
          -- offset of the current whole hour, in minutes, from parBeginTime
          (ho.HOUR_OFFSET * 60) + FirstOfsInMin OFS_FROM_BEGIN
        from starting_time st
        -- Cartesian join of the list of numbers to the single starting timestamp value
        join hour_offsets ho on 1 = 1
        where st.FirstHour + numtodsinterval(ho.HOUR_OFFSET, 'hour') < parEndTime
        order by ofs_from_begin
      )
    select
      -- output day of week only if it has changed from the previous day of week
      decode(wht.day_of_week, LAG(wht.day_of_week) over
        (order by wht.ofs_from_begin), ' ', wht.DAY_OF_WEEK) SHORT_DATE,
      wht.whole_hour_time || lower(decode(wht.am_pm, LAG(wht.am_pm) over
        (order by wht.ofs_from_begin), ' ', wht.am_pm)) SHORT_TIME,
      wht.ofs_from_begin
    from whole_hour_times wht;

return p_const.ERROR_OK;
exception
  when others then
    dbms_output.put_line('Error in GetWholeHourTimes: '||sqlcode||' '||sqlerrm);
    return p_const.ERROR_UNKNOWN;
end GetWholeHourTimes;
```

| SHORT_DATE | SHORT_TIME | OFS_FROM_BEGIN |
|---|---|---|
| FRI MAY 01 | 9am | 0 |
| | 10 | 60 |
| | 11 | 120 |
| | 12pm | 180 |
| | 1 | 240 |
| | 2 | 300 |
| | 3 | 360 |
| | 4 | 420 |
| | 5 | 480 |

FIG. 22

| SHORT_DATE | SHORT_TIME | Horizontal offset from chart origin |
|---|---|---|
| FRI MAY 01 | 9am | 1632 |
| | 10 | 1692 |
| | 11 | 1752 |
| | 12pm | 1812 |
| | 1 | 1872 |
| | 2 | 1932 |
| | 3 | 1992 |
| | 4 | 2052 |
| | 5 | 2112 |

FIG. 23

```
with WorkIntervalsToLoad as                                              2600
{
  select chartid, workintervalid, beginutc, endutc, localeid from
  {
    -- most recent N complete work intervals ending before NowUtc
    select w.chartid, w.workintervalid, w.beginutc, w.endutc, w.localeid from workinterval w
    join chart c on c.chartid = w.chartid
    where w.endutc <= c.nowutc and w.chartid = :bvChartId
    order by w.endutc desc
  } where rownum <= :bvNumWIsBeforeNow
  UNION
  -- all work intervals ending between NowUtc and the current time (useful when restarting)
  select w.chartid, w.workintervalid, w.beginutc, w.endutc, w.localeid from workinterval w
  join chart c on c.chartid = w.chartid
  where w.chartid = :bvChartId and w.endutc > c.nowutc
    and w.endutc <= p_time_utils.GetCurrTimeUtc
  UNION
  select chartid, workintervalid, beginutc, endutc, localeid from
  -- first N work intervals ending after the current time
  {
    select w.chartid, w.workintervalid, w.beginutc, w.endutc, w.localeid from workinterval w
    join chart c on c.chartid = w.chartid
    where w.chartid = :bvChartId and w.endutc > p_time_utils.GetCurrTimeUtc
    order by w.endutc asc
  } where rownum <= :bvNumWIsAfterCurrTime
  UNION
  -- all work intervals ending after the current time and extending past the last scheduled activity
  select w.chartid, w.workintervalid, w.beginutc, w.endutc, w.localeid from workinterval w
  join chart c on c.chartid = w.chartid
  where w.chartid = :bvChartId and w.endutc > p_time_utils.GetCurrTimeUtc
    and w.beginutc < (select max(a.endutc) from activity a where a.chartid = :bvChartId)
},
ApptSegsToLoad as
{
  select a.apptid, a.chartid, a.apptname, a.suppresstransect, a.executionstatus EVT_STATUS,
    s.executionstatus SEG_STATUS, s.beginutc, s.endutc, s.leninmin, witl.workintervalid, witl.localeid
  from apptsegment s
  join appointment a on a.apptid = s.apptid
  join WorkIntervalsToLoad witl on witl.chartid = a.chartid and witl.beginutc <= s.beginutc
    and witl.endutc >= s.endutc
},
ActySegsToLoad as
{
  select a.actyid, a.chartid, a.actyname, a.priority, a.executionstatus EVT_STATUS,
    s.executionstatus SEG_STATUS, s.beginutc, s.endutc, s.leninmin, witl.workintervalid, witl.localeid
  from actysegment s
  join activity a on a.actyid = s.actyid
  join WorkIntervalsToLoad witl on witl.chartid = a.chartid and witl.beginutc <= s.beginutc
    and witl.endutc >= s.endutc
},
IrupSegsToLoad as
{
  select i.interrupid, i.chartid, i.cause, i.executionstatus EVT_STATUS, 4 /* Executed */ SEG_STATUS,
    s.beginutc, s.endutc, s.leninmin, witl.workintervalid, witl.localeid
  from interrupsegment s
  join interruption i on i.interrupid = s.interrupid
  join WorkIntervalsToLoad witl on witl.chartid = i.chartid and witl.beginutc <= s.beginutc
    and witl.endutc >= s.endutc
}
select object_id, decode(object_type_num, 1, 'WI', 2, 'APPT', 3, 'ACTY', 4, 'IRUP', null) object_type,
localename,
p_time_utils.FormatTime(localebegin) localebegin, p_time_utils.FormatTime(localeend) localeend,
leninmin,
nvl
{
  ofsfromchartorigin,
  first_value(ofsfromchartorigin) over (partition by wid order by beginutc asc, object_type_num asc) +
  p_time_utils.GetTimeDiffInMin
  {
    first_value(beginutc) over (partition by wid order by beginutc asc, object_type_num asc), beginutc
  }
} ofsfromchartorigin,
```

FIG. 26A

```
decode
(
  object_type_num,
  -- if the current row is an unexecuted appointment segment, output the priority of the first activity
  -- following it, i.e. the first non-null priority value after the current row; this is the priority
  -- (lane) in which the appointment transect should be drawn (in addition to the execution lane)
  2 /* appointment */,
  decode
  (
    prio, -99 /* suppress transect */, null, -- lane is null if appointment should not make a transect
    decode
    (
      seg_status, 2 /* scheduled */, first_value(prio ignore nulls) over
      (order by beginutc range between current row and unbounded following), prio
    )
  ),
  -- if the current row is an executed activity segment, suppress the priority (because if part of the
  -- activity is still scheduled, the priority will be >0 but executed activity segments should always
  -- be drawn in the execution lane only
  3 /* activity */,
  decode
  (
    seg_status, 4 /* executed */, null, prio
  ), prio
) lane,
p_events.GetExecStatusDescrip(evt_status) evt_status,
p_events.GetExecStatusDescrip(seg_status) seg_status,
name
from
(
  select
    w.workintervalid wid,
    1 object_type_num,
    w.workintervalid object_id,
    'WORK INTERVAL' name,
    w.beginutc,
    w.endutc,
    w.localeid,
    p_time_utils.GetTimeLocaleName(w.localeid) localename,
    p_time_utils.UtcToLocal(w.beginutc, w.localeid) localebegin,
    p_time_utils.UtcToLocal(w.endutc, w.localeid) localeend,
    sum(w.leninmin + :bvWIDividerLenInMin) over (order by w.beginutc) - w.leninmin ofsfromchartorigin,
    w.leninmin, null prio, null evt_status, null seg_status
  from workinterval w
  join WorkIntervalsToLoad witl on witl.workintervalid = w.workintervalid
  where w.chartid = :bvChartId union select workintervalid wid, 2 object_type_num, apptid object_id, apptname name, beginutc, endutc,
    localeid, p_time_utils.GetTimeLocaleName(localeid),
    p_time_utils.UtcToLocal(beginutc, localeid) localebegin,
    p_time_utils.UtcToLocal(endutc, localeid) localeend,
    null ofsfromchartorigin, leninmin,
    -- by signaling transect-suppr. in prio, we avoid needing an extra column in these unioned SELECTs
    decode(suppresstransect, 1, -99, null) prio, evt_status, seg_status
  from ApptSegsToLoad union select workintervalid wid, 3 object_type_num, actyid object_id, actyname name, beginutc, endutc,
    localeid, p_time_utils.GetTimeLocaleName(localeid),
    p_time_utils.UtcToLocal(beginutc, localeid) localebegin,
    p_time_utils.UtcToLocal(endutc, localeid) localeend,
    null ofsfromchartorigin, leninmin, priority prio, evt_status, seg_status
  from ActySegsToLoad union select workintervalid wid, 4 object_type_num, interrupid object_id, cause name, beginutc, endutc,
    localeid, p_time_utils.GetTimeLocaleName(localeid),
    p_time_utils.UtcToLocal(beginutc, localeid) localebegin,
    p_time_utils.UtcToLocal(endutc, localeid) localeend,
    null ofsfromchartorigin, leninmin, null prio, evt_status, seg_status
  from IrupSegsToLoad
)
order by beginutc asc, object_type_num asc;
```
⤺ 2600

FIG. 26B

| ID No. | Data type | Time zone | Local begin time | Local end time | Length in min. | Horizontal offset from origin in min. | Priority or lane | Parent event status | Segment status | Description |
|---|---|---|---|---|---|---|---|---|---|---|
| 1718 | WI | US/Mountain | 2015-04-28 09:00 | 2015-04-28 18:00 | 540 | 3 | | | | WORK INTERVAL |
| 1719 | WI | US/Mountain | 2015-04-29 09:00 | 2015-04-29 18:00 | 540 | 546 | | | | WORK INTERVAL |
| 1720 | WI | US/Mountain | 2015-04-30 09:00 | 2015-04-30 18:00 | 540 | 1089 | | | | WORK INTERVAL |
| 3212 | ACTY | US/Mountain | 2015-04-30 11:25 | 2015-04-30 11:55 | 30 | 1234 | | Executed | Executed | Write OPQ spec. |
| 3200 | APPT | US/Mountain | 2015-04-30 12:00 | 2015-04-30 13:00 | 60 | 1269 | | Executed | Executed | Lunch |
| 3212 | ACTY | US/Mountain | 2015-04-30 13:05 | 2015-04-30 13:17 | 12 | 1334 | | Executed | Executed | Write OPQ spec. |
| 3215 | ACTY | US/Mountain | 2015-04-30 13:22 | 2015-04-30 14:00 | 38 | 1351 | | Executing | Executed | XYZ draft |
| 3249 | IRUP | US/Mountain | 2015-04-30 14:00 | 2015-04-30 15:15 | 75 | 1389 | | Executing | Executed | Entering interruption mode |
| 3202 | APPT | US/Mountain | 2015-04-30 15:00 | 2015-04-30 15:15 | 15 | 1449 | | Executing | Executed | Weekly team mtg. |
| 3202 | APPT | US/Mountain | 2015-04-30 15:15 | 2015-04-30 16:30 | 75 | 1464 | 0 | Executing | Scheduled | Weekly team mtg. |
| 3215 | ACTY | US/Mountain | 2015-04-30 16:35 | 2015-04-30 17:55 | 80 | 1544 | 0 | Executing | Scheduled | XYZ draft |
| 1721 | WI | US/Pacific | 2015-05-01 09:00 | 2015-05-01 18:00 | 540 | 1632 | 0 | Scheduled | Scheduled | WORK INTERVAL |
| 3204 | APPT | US/Pacific | 2015-05-01 09:30 | 2015-05-01 10:00 | 60 | 1697 | 0 | Executing | Scheduled | Emails |
| 3215 | ACTY | US/Pacific | 2015-05-01 10:05 | 2015-05-01 10:07 | 2 | 1704 | 1 | Scheduled | Scheduled | XYZ draft |
| 3218 | ACTY | US/Pacific | 2015-05-01 10:12 | 2015-05-01 11:42 | 90 | 1812 | 2 | Scheduled | Scheduled | ABC rail load spec. |
| 3206 | APPT | US/Pacific | 2015-05-01 12:00 | 2015-05-01 13:00 | 60 | 1877 | 2 | Scheduled | Scheduled | Lunch |
| 3221 | ACTY | US/Pacific | 2015-05-01 13:25 | 2015-05-01 15:30 | 120 | 1932 | 2 | Scheduled | Scheduled | ABC screen design |
| 3208 | APPT | US/Pacific | 2015-05-01 13:30 | 2015-05-01 16:25 | 50 | 2027 | 2 | Scheduled | Scheduled | Acme project mtg. |
| 3221 | ACTY | US/Pacific | 2015-05-01 15:35 | 2015-05-01 17:30 | 60 | 2082 | 2 | Scheduled | Scheduled | ABC screen design |
| 3210 | APPT | US/Pacific | 2015-05-01 16:30 | 2015-05-01 17:55 | 20 | 2147 | 2 | Scheduled | Scheduled | Disc. DB setup (Bob) |
| 3221 | ACTY | US/Pacific | 2015-05-01 17:35 | 2015-05-04 17:00 | 540 | 2175 | | Scheduled | Scheduled | ABC screen design |
| 1722 | WI | US/Pacific | 2015-05-04 08:00 | 2015-05-04 09:10 | 60 | 2185 | 2 | Scheduled | Scheduled | WORK INTERVAL |
| 3221 | ACTY | US/Pacific | 2015-05-04 08:10 | 2015-05-04 10:15 | 60 | 2250 | 3 | Scheduled | Scheduled | ABC screen design |
| 3226 | ACTY | US/Pacific | 2015-05-04 09:15 | 2015-05-04 11:20 | 60 | 2315 | 4 | Scheduled | Scheduled | OPQ data model |
| 3228 | ACTY | US/Pacific | 2015-05-04 10:20 | 2015-05-04 11:49 | 24 | 2380 | 5 | Scheduled | Scheduled | SQL script admin. |
| 3230 | ACTY | US/Pacific | 2015-05-04 11:25 | 2015-05-04 12:39 | 45 | 2409 | 6 | Scheduled | Scheduled | ABC status report |
| 3232 | ACTY | US/Pacific | 2015-05-04 11:54 | 2015-05-04 13:59 | 75 | 2459 | 7 | Scheduled | Scheduled | Plan DB setup |
| 3234 | ACTY | US/Pacific | 2015-05-04 12:44 | 2015-05-04 15:22 | 78 | 2539 | 8 | Scheduled | Scheduled | Write ABC test cases |
| 3236 | ACTY | US/Pacific | 2015-05-04 14:04 | 2015-05-04 15:57 | 30 | 2622 | 9 | Scheduled | Scheduled | Enter timesheet |
| 3238 | ACTY | US/Pacific | 2015-05-04 15:27 | 2015-05-04 16:55 | 53 | 2657 | 10 | Scheduled | Scheduled | Phonecall (Mike) |
| 3240 | ACTY | US/Pacific | 2015-05-04 16:02 | | | | | Scheduled | Scheduled | Plan OPQ Phase II. |

| ID No. | Data type | Time zone | Local begin time | Local end time | Length in min. | Horizontal offset from origin in min. | Priority or lane | Parent event status | Segment status | Description |
|---|---|---|---|---|---|---|---|---|---|---|
| 1723 | WI | US/Pacific | 2015-05-05 10:00 | 2015-05-05 15:00 | 300 | 2718 | | | | WORK INTERVAL |
| 3240 | ACTY | US/Pacific | 2015-05-05 10:10 | 2015-05-05 11:17 | 67 | 2728 | 10 | Scheduled | Scheduled | Plan OPQ Phase II. |
| 3243 | ACTY | US/Pacific | 2015-05-05 11:22 | 2015-05-05 14:22 | 180 | 2800 | 11 | Scheduled | Scheduled | Draft training materials |
| 3245 | ACTY | US/Pacific | 2015-05-05 14:27 | 2015-05-05 14:55 | 28 | 2985 | 12 | Scheduled | Scheduled | Plan team trip to NY |
| 1724 | WI | US/Pacific | 2015-05-07 09:30 | 2015-05-07 11:48 | 138 | 3021 | | | | WORK INTERVAL |
| 3245 | ACTY | US/Pacific | 2015-05-07 09:40 | 2015-05-07 10:12 | 32 | 3031 | 12 | Scheduled | | Plan team trip to NY |
| 1725 | WI | US/Pacific | 2015-05-08 09:00 | 2015-05-08 18:00 | 540 | 3162 | | | | WORK INTERVAL |
| 1726 | WI | US/Pacific | 2015-05-11 08:00 | 2015-05-11 17:00 | 540 | 3735 | | | | WORK INTERVAL |
| 1727 | WI | US/Pacific | 2015-05-12 10:00 | 2015-05-12 15:00 | 300 | 4248 | | | | WORK INTERVAL |
| 1728 | WI | US/Pacific | 2015-05-14 09:30 | 2015-05-14 11:48 | 138 | 4551 | | | | WORK INTERVAL |
| 1729 | WI | US/Mountain | 2015-05-15 09:00 | 2015-05-15 18:00 | 540 | 4692 | | | | WORK INTERVAL |
| 1730 | WI | US/Mountain | 2015-05-18 09:00 | 2015-05-18 18:00 | 540 | 5235 | | | | WORK INTERVAL |
| 1731 | WI | US/Mountain | 2015-05-19 09:00 | 2015-05-19 18:00 | 540 | 5778 | | | | WORK INTERVAL |

FIG. 27B

```
Package P_TIME_UTILS function FormatTime(parTimestamp in timestamp) return varchar2;
/* Formats the specified date and time using a standard format (YYYY-MM-DD
HH24:MI) */ function GetCurrTimeUtc return timestamp;
/* Returns the current UTC time, truncated to the most recent whole minute (no
seconds or fractional seconds) */ function GetTimeDiffInMin(parEarlierTime in timestamp, parLaterTime in
timestamp)
   return number;
/* Returns the number of minutes between parEarlierTime and parLaterTime. If
parEarlierTime is greater than parLaterTime, returns the number of minutes as a
negative number */ function GetTimeLocaleName(parLocaleId in timelocale.localeid%type)
   return timelocale.localename%type;
/* Returns the name of the specified time locale, or null if no such time
locale was found */ function UtcToLocal(parUtcTimestamp in timestamp, parLocaleId in
timelocale.localeid%type)
   return timestamp;
/* Converts the specified UTC timestamp into the corresponding timestamp at the
specified time locale, as stored in the TIMELOCALE table. If parUtcTimestamp or
parLocaleId is invalid or null, returns null */
```

```
Package P_EVENTS

-- Execution status values shared by all event types
EXECSTATUS_UNDEFINED constant number := 0;
   /* this value should only be assigned temporarily and never survive a
transaction */
EXECSTATUS_UNSCHEDULED constant number := 1;
EXECSTATUS_SCHEDULED constant number := 2;
EXECSTATUS_EXECUTING constant number := 3;
EXECSTATUS_EXECUTED constant number := 4;

-- Special priority values shared by activities
PRIO_UNSCHEDULED constant number := -2;
   /* in the work queue, not yet on the chart */
PRIO_EXECUTED constant number := -1;
   /* priority for completely executed activities (appears in the execution lane
to the left of the Now line) */
PRIO_EXECUTING_OR_PENDING constant number := 0;
   /* priority for the activity that is about to execute or is executing */ function GetExecStatusDescrip(parExecStatus in number) return varchar2;
/* Returns a user-friendly short description of the specified execution-status
value */
```

FIG. 29A

```
Package P_TIMELIMITS

/* Constants for the possible values of ACTYTIMELIMIT.RULE */
  -- Limits relative to another activity
  LMT_START_BEFORE_BEGOF_ACTY constant varchar2(4) := 'SBBY';
  LMT_START_AFTER_BEGOF_ACTY constant varchar2(4) := 'SABY';
  LMT_START_BEFORE_ENDOF_ACTY constant varchar2(4) := 'SBEY';
  LMT_START_AFTER_ENDOF_ACTY constant varchar2(4) := 'SAEY';
  LMT_FINISH_BEFORE_BEGOF_ACTY constant varchar2(4) := 'FBBY';
  LMT_FINISH_BEFORE_ENDOF_ACTY constant varchar2(4) := 'FBEY';

-- Limits relative to an appointment
  LMT_START_BEFORE_BEGOF_APPT constant varchar2(4) := 'SBBP';
  LMT_START_AFTER_BEGOF_APPT constant varchar2(4) := 'SABP';
  LMT_START_BEFORE_ENDOF_APPT constant varchar2(4) := 'SBEP';
  LMT_START_AFTER_ENDOF_APPT constant varchar2(4) := 'SAEP';
  LMT_FINISH_BEFORE_BEGOF_APPT constant varchar2(4) := 'FBBP';
  LMT_FINISH_BEFORE_ENDOF_APPT constant varchar2(4) := 'FBEP';

-- Limits relative to a fixed point in time
  LMT_START_BEFORE_DATETIME constant varchar2(4) := 'SBD';
  LMT_START_AFTER_DATETIME constant varchar2(4) := 'SAD';
  LMT_FINISH_BEFORE_DATETIME constant varchar2(4) := 'FBD';

/* Constants for the possible values of ACTYTIMELIMIT.THREATLEVEL */
  THREAT_NONE constant number := 0;
  THREAT_WARNING_LOW constant number := 1;
  THREAT_WARNING_HIGH constant number := 2;
  THREAT_VIOLATION_LOW constant number := 3;
  THREAT_VIOLATION_HIGH constant number := 4;
```

FIG. 29B

```
Package P_CONST

-- function result codes
   ERROR_OK constant number := 0;
     /* success */
   ERROR_UNKNOWN constant number := 1;
     /* generic error */
   ERROR_INVALID_PARAM constant number := 2;
     /* one or more parameters were invalid */
   ERROR_NO_DATA_FOUND constant number := 3;
     /* data that was searched for was not present */
   ERROR_NOT_ENOUGH_INTERVALS constant number := 4;
     /* the chart does not contain enough work intervals to perform the
requested operation correctly */
   ERROR_ACTY_IS_EXECUTING constant number := 5;
     /* the operation cannot be performed because an activity is currently
executing */
   ERROR_UNEXPECTED_CASE constant number := 6;
     /* an unexpected condition was encountered (this usually reflects a
programming error) */
   ERROR_WRONG_CHART_MODE constant number := 7;
     /* the operation cannot be performed because the chart is in the wrong mode
for that operation */
   ERROR_ACTY_NOT_SPLIT constant number := 8;
     /* the requested operation did not split an activity */
   ERROR_DEPENDENCY_VIOLATION constant number := 9;
     /* the requested operation failed because it would have caused a dependency
relationship to be violated */
   ERROR_OVERLAPPING_IRUPS constant number := 10;
     /* the requested operation failed because it would have caused
interruptions to overlap on the chart */
```

FIG. 29C

```
Delete all segments of the appointment;

Assign the appointment's duration in minutes to a variable that will track the
number of minutes remaining to schedule as the routine proceeds;

Find the earliest work interval (WI) that ends after the appointment's start
time, generating new WIs if no such WI exists so that one can be found; this is
the "current WI";

Starting at the appointment's start time (BeginUtc), find the largest possible
time span within the appointment that will fit within the bounds of the current
WI. The starting point of this time span is the later of the appointment's
BeginUtc and the WI's BeginUtc; the ending point of this time span is the
earlier of the appointment's EndUtc and the WI's EndUtc; assign these two time
values to the variables NextApptSegBeginUtc and NextApptSegEndUtc respectively;

While the number of minutes of the appointment remaining to be scheduled is >0,
loop
{
        If NextApptSegEndUtc is later than NextApptSegBeginUtc
        {
                If the time interval from NextApptSegBeginUtc to NextApptSegEndUtc
                straddles the chart's NowUtc pointer
                {
                        Create two segments, one extending from NextApptSegBeginUtc
                        to NowUtc and one extending from NowUtc to
                        NextApptSegEndUtc; update the earlier segment's execution
                        status to EXECUTED and the later segment's execution status
                        to SCHEDULED;

Subtract the number of minutes between the appointment's
                        BeginUtc and the later segment's EndUtc from the variable
                        holding the number of minutes remaining to be scheduled;
                }
                else
                {
                        Create one segment extending from NextApptSegBeginUtc to
                        NextApptSegEndUtc; update the segment's execution status to
                        EXECUTED if the segment lies before NowUtc (i.e. its EndUtc
                        ≤ NowUtc), to SCHEDULED otherwise;

Subtract the number of minutes between the appointment's
                        BeginUtc and the segment's EndUtc from the variable holding
                        the number of minutes remaining to be scheduled;
                };
```

FIG. 30A

```
            Find the next WI that ends after the most recently created
            segment, generating new WIs if no such WI exists so that one can
            be found; this is now the "current WI";

Set NextApptSegBeginUtc to the later of the most recently created
            segment's EndUtc and the current WI's BeginUtc;

Set NextApptSegEndUtc to the earlier of the appointment's EndUtc
            and the current WI's EndUtc;
        }
        else
        {
            We have advanced beyond the end of the appointment; set the number
            of minutes remaining to be scheduled to 0;
        };
};

Update the appointment's execution status based on its position relative to the
NowUtc pointer, i.e. set it to SCHEDULED if the appointment starts after
NowUtc, EXECUTING if it starts on or before NowUtc and ends after NowUtc, or
EXECUTED otherwise;

Update the appointment's EffortInMin attribute as the sum of its segments'
LenInMin attributes;

Return a code indicating whether the operation succeeded;
```

FIG. 30B

```
For each appointment having an EndUtc lying after the input starting time and a
BeginUtc lying before the input ending time
{
      Resegment and update the appointment, using the routine previously
      described for this purpose;
};

Return a code indicating whether the operation succeeded;
```

FIG. 31

```
Delete all segments of the interruption;

For each work interval (WI) which the interruption overlaps (i.e. the
interruption's BeginUtc lies before the WI's EndUtc and the interruption's
EndUtc lies after the WI's BeginUtc), proceeding in ascending order by the WIs'
BeginUtc
{
      Create an interruption segment extending from the later of the
      interruption's BeginUtc and the current WI's BeginUtc to the earlier of
      the interruption's EndUtc and the current WI's EndUtc;
};

Update the interruption's EffortInMin attribute as the sum of its segments'
LenInMin attributes;

Return a code indicating whether the operation succeeded;
```

FIG. 32

```
For each interruption having an EndUtc lying after the input starting time and
a BeginUtc lying before the input ending time
{
      Resegment and update the interruption, using the routine previously
      described for this purpose;
};

Return a code indicating whether the operation succeeded;
```

FIG. 33

Validate parameters, e.g. check that the minimum length per activity segment is
not greater than the maximum possible length of a work interval, that the
minimum length of the segment starting at Now (if any) is not greater than the
minimum length of a standard segment, and that there is at least one minute of
activity effort to be planned;

Assign the number of minutes to plan to a variable that will track the number
of minutes remaining to plan as the routine proceeds;

Point a time cursor to the starting time; this cursor will be used to test
whether the time span which immediately follows it is available for scheduling,
and will advance as the routine proceeds;

Select all time spans that are unavailable for scheduling any portions of
activities - i.e. that are occupied by non-work intervals, work-interval
buffers, appointments and appointment buffers (except for appointments whose
transect should be suppressed), interruptions and post-interruption buffers -
and that end after the starting time, and order these time spans
chronologically by their starting points; loop through them to find the gaps
between them that are large enough to hold the minimum segment duration, i.e.
for each occupied time span in chronological order
{
    If the starting point of the current occupied span is past the time
    cursor, the time between the cursor and the occupied span's starting
    point is an available gap; thus
    {
        If the available gap is at least as long as the minimum number of
        minutes per segment or is at least as long as the amount of time
        remaining to plan; or if the starting time is NowUtc, the time
        cursor is at NowUtc, and the available gap is at least as long as
        the input parameter for minimum length of the segment starting at
        NowUtc; then
        {
            If the available gap crosses over the Now line then
            {
                Add to the output list of available time spans the
                lesser of (a) the time interval between the start of
                the gap and the Now line and (b) the amount of time
                remaining to plan; this is the current segment
                length;

Subtract the current segment length from the number
                of minutes remaining to plan;

FIG. 34A

```
                            If there is still time remaining to plan then
                            {
                                    Add to the output list of available time spans
                                    the lesser of (a) the time interval between
                                    the Now line and the end of the gap and
                                    (b) the amount of time remaining to plan; this
                                    is the current segment length;

Subtract the current segment length from the
                                    number of minutes remaining to plan;
                            };

If there is no time remaining to plan, we are
                            finished; exit the routine with a success code;
                    }
                    else
                    {
                            Add to the output list of available time spans the
                            lesser of the gap duration and the amount of time
                            remaining to plan; this is the current segment
                            length;

Subtract the current segment length from the number
                            of minutes remaining to plan;

If there is no time remaining to plan, we are
                            finished; exit the routine with a success code;
                    };
            };
        };

If the ending point of the current occupied time span is past the time
        cursor, advance the time cursor to the ending point of the current
        occupied time span;
};

If the loop was completed without exiting the routine, there were not enough
work intervals to allow planning of the activity's segments; exit the routine
with a corresponding error code so that the caller can append more work
intervals and then retry this routine;
```

FIG. 34B

```
Adjust the starting priority to ensure that it is at least 0;

Determine the post-activity buffer time to be applied when calculating the
first rescheduled activity segment's earliest allowable starting time; this is
calculated by adding the chart's global PostActivityBuffer setting to the end
time of the most recently executed activity segment that does not belong to the
activity at the first priority to be rescheduled;

Determine the first rescheduled activity segment's earliest allowable starting
time as the latest of the following time points:
      - the post-activity buffer time that was calculated above;
      - the chart's NowUtc pointer; or
      - the starting time input parameter;

If the activity segment preceding the first one to be rescheduled is for the
same activity and ends at NowUtc, and the first one to be rescheduled has
priority 0 and is to start at NowUtc, then this first segment to be rescheduled
really represents a continuation of the preceding segment; in this case,
determine a reduced minimum segment duration for the first segment to be
rescheduled, such that the sum of that previous segment's length and this
segment's length is at least the minimum nominal segment duration for the
activity;

Delete the not-yet-executed segments of all activities to be rescheduled;

Re-create the segments, starting at the earliest allowable starting time that
was determined above; prepare for this and execute it as follows:

Assign the earliest allowable starting time determined above to a variable that
will track the starting time of each activity to be rescheduled as the routine
proceeds from earlier-priority to later-priority activities;

For each activity to be rescheduled, proceeding from the starting priority
(earlier) to all later priorities
{
      Find the available time gaps in which the current activity's segments can
      be scheduled, using e.g. the routine previously described for this
      purpose, with the following input parameters:
            - the chart ID that was passed to this rescheduling routine;
            - the activity's starting time that was assigned to the tracking
            variable mentioned above;
            - the number of minutes of effort remaining to be scheduled for
            the activity;
            - the reduced minimum segment duration for the first segment to be
            rescheduled that was determined above (null if none was
            determined)
            - the activity's minimum segment duration if locally overridden
            within the activity, otherwise the chart's global minimum activity
            segment duration;
```

FIG. 35A

```
If there were not enough work intervals available for scheduling the
activity's segments, automatically append more work intervals to the
chart (recommended: 100 new work intervals) according to the chart's
work-interval definitions and re-attempt finding the available time gaps
for the current activity's segments; if this fails a second time, exit
with a corresponding error code so that the user can be informed that
more work intervals of sufficient length must be generated before the
chart can be rescheduled;

For each available time gap found for the current activity, create
(insert) an activity segment having the starting time, ending time and
duration of the found time gap, and set the segment's execution status to
SCHEDULED (i.e. not yet executed);

If we just inserted the last segment of an activity, move the activity
starting-time tracking variable forward to the starting point of the next
activity to be scheduled, i.e. the ending point of the just-inserted
activity segment plus the chart's global PostActivityBuffer setting;

Update the overall starting time (BeginUtc) of the current activity
(whose segments we have just finished inserting) as the minimum starting
time among all of the activity's segments, and update the overall ending
time (EndUtc) as the maximum ending time among all of the activity's
segments;
};

If the chart is in normal mode and the first rescheduled activity now touches
NowUtc, update its execution status to EXECUTING;

When the above loop has completed, return a code indicating whether the
operation succeeded;
```

FIG. 35B

```
If the input priority where the gap should be inserted is null or <0, set it to
0;

If the priority where the gap should be inserted is greater than the latest
priority of any activity on the chart, exit the routine with a success code
(nothing to do);

If the priority where the gap should be inserted is 0 and the activity that is
currently at priority 0 is already executing (not just immediately pending),
set that activity's execution status to SCHEDULED;

Increment all activities' priorities by 1, starting at the activity having the
priority where the gap should be inserted;

Return a code indicating whether the operation succeeded;
```

FIG. 36

```
If the input starting priority after which gaps should be removed is null or
<0, set it to 0;

Select (list) all activities having priority greater than or equal to the
starting priority in ascending order by their current priority value;

Add the 0-based row number of each activity in the selected list to the input
starting priority, and assign the resulting value as the activity's new
priority;

Return a code indicating whether the operation succeeded;
```

FIG. 37

Validate that the input starting time is not later than the input ending time;
exit with an error code if this is so;

Resegment and update all appointments that overlap the specified time range,
using the routine previously described for this purpose;

Resegment and update all interruptions that overlap the specified time range,
using the routine previously described for this purpose;

Reschedule all not-yet-executed activity segments starting at priority 0, using
the routine previously described for this purpose;

Return a code indicating whether the operation succeeded;

FIG. 38

```
For each activity segment on the chart where the segment's EndUtc falls after
the input starting time and the segment's BeginUtc falls before the input
ending time
{
      Add the length in minutes of the time span between:
        - the later of the input starting time and the segment's BeginUtc value
        - the earlier of the input ending time and the segment's EndUtc value
      to a variable holding the sum of time-span lengths determined for all
      segments;
};

Return the value of the variable holding the sum of time-span lengths;
```

FIG. 39

```
For each appointment having an EndUtc lying after the previous NowUtc and a
BeginUtc lying before or on the new NowUtc
{
        Resegment and update the appointment, using the routine previously
        described for this purpose;
};

Return a code indicating whether the operation succeeded;
```

FIG. 40

```
If the chart is currently in interruption mode
{
        If an interruption exists that is currently executing, update its EndUtc
        to parNewNowUtc, but if no such interruption exists, create one that
        spans from parOldNowUtc to parNewNowUtc and set its status to Executing;

Set the interruption's LenInMin attribute to the number of minutes
        between the interruption's BeginUtc attribute and the new NowUtc time,
        and add the number of minutes of activity effort that will be displaced
        rightward to the interruption's DisplacedActyEffortInMin attribute
        (calculated as the scheduled activity effort lying within the time range
        between the previous NowUtc pointer and the UTC time calculated by adding
        the post-interruption buffer to the new NowUtc pointer, using the routine
        previously described for calculating scheduled activity effort within a
        time range);

Create or adjust interruption segments extending over the time spans
        where the interruption overlaps work intervals;

Update the interruption's EffortInMin attribute;

Return a code indicating whether the operation succeeded;
}
else
{
        There is nothing to do - return a success code;
};
```

FIG. 41

```
If the chart is currently in normal mode
{
        If two segments of the same activity had been split exactly at the
        previous NowUtc marker, join them (lengthen the earlier segment so that
        it extends to the end of the later segment and delete the later segment);

Split any activity segment that crosses over the new NowUtc marker into
        two segments and update them, such that the earlier segment ends at the
        NowUtc marker and has an execution status of EXECUTED and the later
        segment begins at the NowUtc marker and has an execution status of
        SCHEDULED;

Mark any activity segments (NB: segments, not the parent activities)
        prior to the new NowUtc marker on this chart as Executed if they were
        previously in the Scheduled state;

Mark any activities that lie before the new NowUtc marker on this chart
        as 'Executed' if they were previously in the 'Scheduled' or 'Executing'
        state, set their priority to PRIO_EXECUTED, and pack the priorities of
        any remaining activities scheduled further in the future;

If there is now an activity at priority PRIO_EXECUTING_OR_PENDING and it
        crosses over the new NowUtc marker on this chart, mark it as 'Executing'.
        But if it doesn't yet cross over the new NowUtc line, it is still
        pending, so we don't mark it;

Update the RemainingEffortInMin for all activities over which the NowUtc
        marker just passed, by summing the LenInMin of all these activities'
        future segments, resulting in 0 if there are no such segments left for an
        activity;
}
else if the chart is currently in interruption mode
{
        Reschedule all not-yet-executed activity segments starting at priority 0,
        using the routine previously described for this purpose;
};

Return a code indicating whether the operation succeeded;
```

FIG. 42

```
If chart's current mode is FROZEN then
{
      Exit with error code indicating the chart is in the wrong mode for
      advancing the Now line;
}
else if the new NowUtc time lies on or before the previous NowUtc time then
{
      Exit with error code indicating an invalid input parameter was passed;
};

Ensure that a certain minimum number of work intervals exists (suggested: ca.
100 intervals starting on or after the current UTC time), to facilitate
rescheduling of activities;

Update the chart's PrevNowUtc and NewNowUtc attributes;

Adjust appointments in response to the advancement of NowUtc, using the routine
previously described for this purpose;

Adjust interruptions in response to the advancement of NowUtc, using the
routine previously described for this purpose;

Adjust activities in response to the advancement of NowUtc, using the routine
previously described for this purpose;

Return a code indicating whether the operation succeeded;
```

FIG. 43

```
Assign the range starting time to a variable that will represent the adjusted
range starting time; if the variable's value lies before the chart's NowUtc
marker, adjust it so that it is equal to NowUtc;

If the adjusted range starting time lies on or after the range ending time,
then
{
      Return 0 minutes, since no time is available in the specified range;
};

If there are no work intervals extending beyond the range ending time, generate
a number of work intervals, e.g. 100 work intervals, to allow for estimating
available time using the steps below;

Point a time cursor to the adjusted range starting time; this cursor will be
used to test whether the time span which immediately follows it is available
for scheduling, and will advance as the routine proceeds;

Initialize a variable for summing the amount of potentially available time (in
minutes) found so far to 0;

Select all time spans that are unavailable for scheduling any portions of
activities (i.e. that are occupied by non-work intervals, work-interval
buffers, appointments and appointment buffers, except for appointments whose
transect should be suppressed), that end after the adjusted range starting time
and that begin prior to the range ending time, and order these time spans
chronologically by their starting points; loop through them to find the gaps
between them that are large enough to hold the minimum segment duration, i.e.
for each occupied time span in chronological order
{
      If the starting point of the current occupied span is past the time
      cursor, the time between the cursor and the occupied span's starting
      point is an available gap; thus
      {
            If the available gap is at least as long as the minimum number of
            minutes per segment, then
            {
                  Add the gap length in minutes to the variable for summing
                  the amount of potentially available time;
            };
      };
      If the ending point of the current occupied time span is past the time
      cursor, advance the time cursor to the ending point of the current
      occupied time span;
};
If the last blocked time span does not extend to the range ending time, test
whether the gap between this last time span and the range ending time is
sufficiently long to be included; if so, then
{
      Add the gap length in minutes to the variable for summing the amount of
      potentially available time;
};

Return the value of the variable holding the sum of potentially available time;
```

FIG. 44

```
For each time-limit rule defined for the activity
{
        If the rule is of type SBBY, SABY or FBBY then
        {
                Set the rule's LimitUtc attribute to the UTC time corresponding to
                the target activity's BeginUtc plus the rule's specified OfsInMin;
        }
        else if the rule is of type SBEY, SAEY, or FBEY then
        {
                Set the rule's LimitUtc attribute to the UTC time corresponding to
                the target activity's EndUtc plus the rule's specified OfsInMin;
        }
        else if the rule is of type SBBP, SABP, or FBBP then
        {
                Set the rule's LimitUtc attribute to the UTC time corresponding to
                the target appointment's BeginUtc plus the rule's specified
                OfsInMin;
        }
        else if the rule is of type SBEP, SAEP, or FBEP then
        {
                Set the rule's LimitUtc attribute to the UTC time corresponding to
                the target appointment's EndUtc plus the rule's specified
                OfsInMin;
        }
        else if the rule is of type SBD, SAD, or FBD then
        {
                Set the rule's LimitUtc attribute to the UTC time corresponding to
                the target date and time plus the rule's specified OfsInMin;
        }
        else
        {
                Set the rule's LimitUtc attribute to null;
        };
};

Return a code indicating whether the operation succeeded;
```

FIG. 45

```
For each time-limit rule defined for the activity
{
        If the rule is one of the "start before" rules then
        {
            If the activity's BeginUtc <= the rule's LimitUtc then
            {
                Assess the amount of time between the activity's BeginUtc
                and the rule's LimitUtc that is potentially available for
                scheduling activities, using the routine previously
                described for that purpose; this is the CurrDistanceInMin;

If CurrDistanceInMin is 0 or very low, then
                {
                    Set the rule's ThreatLevel to THREAT_WARNING_HIGH;
                }
                else if CurrDistanceInMin is moderately low, then
                {
                    Set the rule's ThreatLevel to THREAT_WARNING_LOW;
                }
                else
                {
                    Set the rule's ThreatLevel to THREAT_NONE;
                };
            }
            else if the activity's BeginUtc > the rule's LimitUtc then
            {
                Determine the time difference between the rule's LimitUtc
                and the activity's BeginUtc; this is the CurrDistanceInMin;

If CurrDistanceInMin is very high, then
                {
                    Set the rule's ThreatLevel to THREAT_VIOLATION_HIGH;
                }
                else
                {
                    Set the rule's ThreatLevel to THREAT_VIOLATION_LOW;
                };
            };
        }
        else if the rule is one of the "finish before" rules then
        {
            If the activity's EndUtc <= the rule's LimitUtc then
            {
                Assess the amount of time between the activity's EndUtc and
                the rule's LimitUtc that is potentially available for
                scheduling activities, using the routine previously
                described for that purpose; this is the CurrDistanceInMin;

If CurrDistanceInMin is 0 or the ratio of the activity's
                RemainingEffortInMin to CurrDistanceInMin is very low, then
                {
                    Set the rule's ThreatLevel to THREAT_WARNING_HIGH;
                }
```

FIG. 46A

```
            else if the ratio of the activity's RemainingEffortInMin to
            CurrDistanceInMin is moderately low, then
            {
                   Set the rule's ThreatLevel to THREAT_WARNING_LOW;
            }
            else
            {
                   Set the rule's ThreatLevel to THREAT_NONE;
            };
      }
      else if the activity's EndUtc > the rule's LimitUtc then
      {
            Determine the time difference between the rule's LimitUtc
            and the activity's EndUtc; this is the CurrDistanceInMin;

If CurrDistanceInMin is very high, then
            {
                   Set the rule's ThreatLevel to THREAT_VIOLATION_HIGH;
            }
            else
            {
                   Set the rule's ThreatLevel to THREAT_VIOLATION_LOW;
            };
      };
}
else if the rule is one of the "start after" rules then
{
      If the activity's BeginUtc >= the rule's LimitUtc then
      {
            Determine the time difference between the rule's LimitUtc
            and the activity's BeginUtc; this is the CurrDistanceInMin;

If CurrDistanceInMin is 0 or very low, then
            {
                   Set the rule's ThreatLevel to THREAT_WARNING_HIGH;
            }
            else if CurrDistanceInMin is moderately low, then
            {
                   Set the rule's ThreatLevel to THREAT_WARNING_LOW;
            }
            else
            {
                   Set the rule's ThreatLevel to THREAT_NONE;
            };
      }
      else if the activity's BeginUtc < the rule's LimitUtc then
      {
            Determine the time difference between the activity's
            BeginUtc and the rule's LimitUtc; this is the
            CurrDistanceInMin;
```

FIG. 46B

```
                    If CurrDistanceInMin is very high, then
                    {
                        Set the rule's ThreatLevel to THREAT_VIOLATION_HIGH;
                    }
                    else
                    {
                        Set the rule's ThreatLevel to THREAT_VIOLATION_LOW;
                    };
                };
            }
            else
            {
                Set the rule's ThreatLevel attribute to null;
            };
        };

Return a code indicating whether the operation succeeded;
```

FIG. 46C

```
If the new priority to be set is <0, exit with a validation error;

If the new priority is the same as the specified activity's old priority (i.e.
its current priority), exit with a success code;

If reprioritizing the specified activity would place it earlier than any
activity on the same chart on which it is dependent, exit with a corresponding
error;

If the new priority to be set is earlier (i.e. less than) than the old priority
{
        Insert a gap in the sequence of activity priorities at the target
        priority, using the routine previously described for this purpose;

Set the activity's Priority attribute to the new value;

Pack (remove) the gaps in the sequence of activity priorities using the
        routine previously described for this purpose, starting at the target
        priority;

Reschedule all activity segments on the specified activity's chart using
        the routine previously described for this purpose, starting at the
        activity's new priority;
}
else
{
        Insert a gap in the sequence of activity priorities at 1 more than the
        target priority (because moving the activity to a later priority will
        leave a gap at the old priority that will need to be closed, causing all
        priorities subsequent to the gap to be decremented by 1), using the
        routine previously described for this purpose;

Set the activity's Priority attribute 1 more than the target value;

Pack (remove) the gaps in the sequence of activity priorities using the
        routine previously described for this purpose, starting at the activity's
        old priority;

Reschedule all activity segments on the specified activity's chart using
        the routine previously described for this purpose, starting at the
        activity's old priority;
};

Return a code indicating whether the operation succeeded;
```

FIG. 47

```
Validate the parameters, ensuring that:

- the starting time is set to the chart's NowUtc if null is passed by
    caller
    - the ending time is set to NowUtc if null is passed
    - the resulting starting time does not lie after the ending time
    - the ending time does not lie after NowUtc
    - the ending time does not lie before NowUtc if the 'enter interruption
    mode' flag is set Ensure the interruption to be created would not overlap with one that already
exists on the chart (leads to more reliable statistics when evaluating the
chart);

Insert the interruption into the database; if the 'enter interruption mode'
flag is set, set the ExecutionStatus attribute to EXECUTING, otherwise to
EXECUTED; if the 'redistribute activity effort' flag is set, set the
DisplacedActyEffortInMin attribute to the number of minutes of activity effort
that will be displaced by the interruption, which can be calculated using the
routine previously described for calculating scheduled activity effort that
lies within a time range;

Insert the interruption's segments onto the database, using the routine
previously described for resegmenting and updating a single interruption;

If the 'enter interruption mode' flag is set, then
{
    Enter interruption mode on the chart, using the steps previously
    described for entering interruption mode (except that the activity
    rescheduling, time-limit evaluation and chart redrawing steps should not
    yet be performed);
};

If the 'redistribute activity effort' flag is set, then
{
    Displace the activity effort that lies after the starting point of the
    interruption to the available portions of the chart lying after the
    interruption; any such effort that is displaced past the chart's NowUtc
    marker should be added to the corresponding future activities' remaining
    planned effort; if any such activities for which effort is displaced past
    NowUtc have already been prioritized as completely executed
    (PRIO_EXECUTED), they should be assigned a later priority (and their
    execution status set to SCHEDULED), such that they are 'revived' and
    prioritized in the same chronological order as their displaced segments
    had lain before displacement;
};

Reschedule all of the chart's future activity segments, using the routine
previously described for this purpose;

Return a code indicating whether the operation succeeded;
```

FIG. 48

```
Prompt user to decide whether the portions of activities that had been
scheduled for the time after the Now line when the client went offline should
be marked as Executed or instead rescheduled into the future, or whether the
chart should enter frozen mode;

If user selects the "frozen mode" option then
{
        Enter frozen mode (without advancing the NowUtc pointer), using the logic
        previously described for entering frozen mode;
}
else if user selects the "reschedule activities" option then
{
        Enter interruption mode, using the logic previously described for
        entering interruption mode;

Advance the chart's NowUtc pointer, using the routine previously
        described for this purpose;

Place the chart into normal mode, using the logic previously described
        for resuming normal mode;
}
else if user selects the "mark as executed" option then
{
        Place the chart into normal mode, using the logic previously described
        for resuming normal mode;

Advance the chart's NowUtc pointer, using the routine previously
        described for this purpose;
};

Evaluate the time limits and update the time-limit threat levels for all
rescheduled activities, using the routines previously described for that
purpose;

Redraw the chart;
```

FIG. 49

```
For each work interval (WI) loaded for display in the chart (cf. FIGS. 17 and
18)
{
        For each appointment segment (APSEG) where APSEG.BeginUtc ≥ WI.BeginUtc
        and APSEG.EndUtc ≤ WI.EndUtc
        {
                Convert the segment's starting time (APSEG.BeginUtc) to a
                horizontal offset from the frame origin (in minutes) as
                WI.OfsFromChartOrigin (see FIG. 18) + the time difference in
                minutes between WI.BeginUtc and APSEG.BeginUtc;

Convert the segment's ending time (APSEG.EndUtc) to a horizontal
                offset from the frame origin (in minutes) as the segment's
                starting offset (calculated above) + the segment's length
                (APSEG.LenInMin);

Draw the segment in the execution lane, using pixel coordinates
                calculated as described previously in regards to calculation of
                horizontal and vertical coordinates on the chart;

If the appointment segment's state is SCHEDULED and its
                SuppressTransect flag is set to 0 (False) then
                {
                        Find the earliest activity segment on the chart where the
                        activity segment's state is SCHEDULED and its BeginUtc >
                        APSEG.BeginUtc, and determine the priority of the activity
                        segment's parent activity;

If such an activity segment was found, draw an appointment
                        transect in the lane corresponding to the found parent
                        activity's priority, using the same horizontal coordinates
                        as were used to draw the appointment segment in the
                        execution lane;
                };
        }; // end loop for appointment segments For each activity segment (ACSEG) where ACSEG.BeginUtc ≥ WI.BeginUtc and
        ACSEG.EndUtc ≤ WI.EndUtc
        {
                Convert the segment's starting time (ACSEG.BeginUtc) to a
                horizontal offset from the frame origin (in minutes) as
                WI.OfsFromChartOrigin + the time difference in minutes between
                WI.BeginUtc and ACSEG.BeginUtc;

Convert the segment's ending time (ACSEG.EndUtc) to a horizontal
                offset from the frame origin (in minutes) as the segment's
                starting offset (calculated above) + the segment's length
                (ACSEG.LenInMin);

If the activity segment's state is EXECUTED then
                {
                        Draw the activity segment in the execution lane;
                }
                else if the activity segment's state is SCHEDULED then
                {
                        Draw the activity segment in the lane corresponding to the
                        parent activity's priority;
                };
        }; // end loop for activity segments
```

FIG. 50A

```
For each interruption segment (IRSEG) where IRSEG.BeginUtc ≥ WI.BeginUtc
and IRSEG.EndUtc ≤ WI.EndUtc
{
        Convert the segment's starting time (IRSEG.BeginUtc) to a
        horizontal offset from the frame origin (in minutes) as
        WI.OfsFromChartOrigin (see FIG. 18) + the time difference in
        minutes between WI.BeginUtc and IRSEG.BeginUtc;

Convert the segment's ending time (IRSEG.EndUtc) to a horizontal
        offset from the frame origin (in minutes) as the segment's
        starting offset (calculated above) + the segment's length
        (IRSEG.LenInMin);

Draw the segment in the execution lane, using pixel coordinates
        calculated as described previously in regards to calculation of
        horizontal and vertical coordinates on the chart;
}; // end loop for interruption segments
}; // end loop for work intervals loaded for display
```

FIG. 50B

PERSONAL ADAPTIVE SCHEDULING SYSTEM AND ASSOCIATED METHODS

FIELD OF THE INVENTION

The present invention relates to the field of time management and, more specifically, to computer-implemented systems and methods for accounting for and presenting interdependent, schedule-influencing factors that impact personal time management.

BACKGROUND OF THE INVENTION

A worker in a modern office environment faces a number of time-related difficulties when planning and carrying out work activities, especially if the worker has many smaller tasks to get done that have changing deadlines or other time limits. The cumulative, interactive effects of frequent new task assignments, shifting task sequence (i.e., the order in which tasks are accomplished), new and changing appointments, overtime/undertime requirements, irregular working times and/or dates, work in different time zones, switching between different activities, and interruptions or distractions on the worker's ability to finish specific tasks within certain time limits are complex and often significant. Therefore, an office worker may find it quite difficult to make a truly rational, reliable estimate of when the worker may accomplish certain tasks or to make advantageous decisions about (re)scheduling one's work. These difficulties lead to scheduling uncertainty which, in turn, may lead to thrashing (i.e., unnecessary multitasking), lowered productivity, jeopardized or missed deadlines, and increased worker stress. College students with heavy course loads face similar problems, as the time available for studying for tests, preparing papers, and/or completing other course-related work is often highly irregular and must be coordinated with fixed obligations such as attending classes. Thus, students may find it difficult to plan their activities in a way that ensures they can complete all required work.

To help manage personal working time, many individuals use a combination of manual and/or automated To Do lists, calendars of appointments and deadlines, and/or planning software such as Gantt charts in order to help schedule and prioritize work activities. Unfortunately, such repositories of information may be maintained separately, although they often are characterized by factual interdependencies. For example, a worker may fail to execute an item on a To Do list because of a conflicting appointment that must be attended. Also for example, a Gantt chart may become outdated when a set of appointments, To Do items, and other schedule-relevant factors that existed at the time the Gantt chart was made have changed. Personal time management using the tools and processes described above may quickly become overwhelming and unworkable because of the effort required to keep calendars or Gantt schedules updated and synchronized on an ongoing basis so that all interdependent, schedule-influencing factors are taken into consideration.

Unfortunately, known personal work-planning software does not address the problems listed above in a unified application context. More specifically, known software does not forecast a work schedule that takes all of the above factors into account, does not instantly respond to changes in these factors, and does not give guidance about how to best adjust the schedule in order to relieve time pressure and/or ensure time limits will not be overrun. Known work planning software tools typically purport to anticipate when project phases will be completed, or milestones will be reached, by taking account of factors such as resource bottlenecks, task dependencies, task priorities, and planned events in order to calculate time ranges within which tasks or groups of tasks are likely to get accomplished. However, such tools are typically designed to schedule work for multiple resources acting in parallel.

Known work planning tools often present schedules using some form of calendar-scaled Gantt chart (i.e., a Gantt chart in which the task bars extend horizontally over a time grid demarcated at regular calendrical boundaries such as years, months, weeks or days). On such a Gantt chart, each task bar is normally calculated on the basis of estimated effort, but is presented on the grid as an estimated duration (or range of durations) within which work on the task is expected to take place. To ensure that a given resource is not scheduled to do more than one thing at a time, known software may apply techniques such as automatic resource leveling and automatic schedule calculation based on task priorities. As a basis for calculating the schedule of individual workers, project managers may enter the weekdays and times when the workers are expected to be available for work, and may subtract from this basis the amount of time that workers are anticipated to spend on non-project-related activities. Such configured work-availability times, as well as events having fixed start and finish times that fall within the configured work-availability times, may then be taken into account when the schedule is calculated.

The macro-level resource modeling approach described above can be useful for project management purposes, where it is helpful to know the ranges of probable project phase completion dates, Inaccuracies in the assumptions on which the calculated project schedules are based (for example, the time intervals when a given resource will actually be available for working) often will cancel each other out over longer time horizons, as long as the assumptions are correct on average. However, for an individual, such as a student or office worker, who performs several smaller tasks per day, who works on a "just-in-time" basis with little margin for delays, who has irregular working hours, who works in relatively unstable environments with multiple superiors making conflicting demands, and/or who works in different time zones, such macro-level modeling tools do not give sufficiently responsive or accurate prescriptive guidance, at a useful time resolution, about activities upon which the person should focus effort at a given specific time in order to meet his or her obligations, or about how the person's work schedule could best be adjusted in order to account for changing circumstances.

Thus, an industry need exists to provide methods, systems, and architectures capable of facilitating visualization and continuous tracking of the immediate and future effects of schedule-influencing factors in a unified context that is easy to understand and to keep current, and which assists individuals in actively avoiding scheduling pressures before they occur. While known solutions are directed to time management issues in general, none allow an individual to visualize his personal work schedule and see how interruptions and other factors will impact that schedule so that corrective measures can be taken. Nor do known automated time management solutions generate a series of screens that allow an individual to generate a schedule showing tasks in a To Do list and indicating how much time is available between a task and its time limits for actually focusing effort on the task, and to adjust that schedule as needed in order to avoid violating the limits. Nor do known automated time management solutions employ an interruption experience factor to automatically adjust the scheduling of tasks to compensate for interruptions that typically occur during a work day.

For example, U.S. Pat. No. 5,247,438 to Subas et al., titled "Personal Time Management System and Method," (hereinafter "the '438 patent") discloses a computer system that generates a primary visual display including individual event time bars and a composite conflict time bar. The event time bars graphically display times for scheduled events using visual markers occupying one or more slot times on selected bars. The composite conflicts time bar simultaneously displays all the visual markers of the event time bars in order to provide a positive indication of a conflict. However, the '438 patent does not disclose the ability to track interruptions, nor the employment of an interruption experience factor to automatically adjust the scheduling of tasks to compensate for interruptions.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a personal adaptive scheduling system (PASS) that may advantageously provide workers with a clear and plausible view of the future and, in particular, of future time-related obstacles and pressures, by displaying the exact interactions among appointments, activities, and interruptions, and by respecting these interactions automatically when calculating the schedule. PASS may also advantageously support workers by clearly showing the most plausible and effective means by which the anticipated obstacles may be avoided or anticipated time pressures may be relieved. PASS may also advantageously allow workers to easily and quickly update appointments, To Do items, and interruption information so that all of these schedule elements may remain current and synchronized with each other. PASS may also advantageously allow an individual to visualize his/her personal work schedule and to see how interruptions and other factors (e.g., realizing that a task may take longer than expected) may impact that schedule so corrective measures can be taken.

A method aspect of the present invention may employ an effort-scaled bar chart that may be similar in appearance to a Gantt chart, arranged as a series of flexible, time-zone-specific work intervals which may represent time spans within which effort is focused on work events (for example, and without limitation, activities, appointments and interruptions) and in which temporal (e.g., horizontal) extents represent expended or potential effort. The method may be characterized by a To Do list containing names of activities and/or by a sequential, cascading arrangement of activity bars in the chart, preserved by automatically preventing temporal overlapping of activity effort and by automatically resequencing and rescheduling activity bars in the chart (from earlier to later) when the activities' priorities (from top to bottom in the To Do list) are changed. The method may further include the ongoing calculation and application of an adjustment experience factor when scheduling future activities. Adjustment experience factor may be defined as a measure of the relation of actual effort expended on activities to the original effort estimated for those activities prior to commencement of their execution.

In one embodiment, the method may support inter-activity buffers which may automatically insert additional "task-switching" time between the bar segments of any two adjacent activities on the chart. The method may also feature appointment transects, by which the scheduled effort of any activity on the chart may be automatically displaced by the scheduled effort of certain appointments with which it overlaps. The method may also include appointment-activity buffers which may automatically insert additional time (0 or more minutes) between an activity's segments and the appointment(s) that it overlaps.

In another embodiment, the method may be characterized by interruption tracking, by which the scheduled effort of activities on the chart may be displaced to a later time during or after the occurrence of an interruption. More specifically, the method may include post-interruption buffers which may automatically insert additional time (0 or more minutes) between an interruption and the bar segment of any activity that immediately follows or resumes after it. The method may further include ongoing calculation and application of an interruption experience factor when scheduling future activities.

In another embodiment, the method may be characterized by work-interval-boundary buffers which may automatically insert additional time (0 or more minutes) between an activity segment and the boundaries of the work interval within which it is scheduled. The method may apply a minimum activity segment duration to prevent the software from scheduling periods of activity effort that are impracticably short. The method may include means of defining absolute time limits (i.e., each delineating an explicit point in time) or relative (referential) time limits (i.e., each referring to the start or end time of an event such as an appointment or activity), with or without time offsets.

In another embodiment, the method may feature use of colors, icons or other visual indicators to call attention to potentially threatened or violated time limits of future activities on the chart. The method may further apply time-limit handles (i.e., chart elements extending between activities and their time limits) to graphically show the exact time pressure operating on activities. The method may feature an execution lane (i.e., a band extending along the chart timeline) to track the execution of activities, appointments and interruptions. The method may further arrange and present future scheduled appointments along the work-interval timeline.

Figure 1:
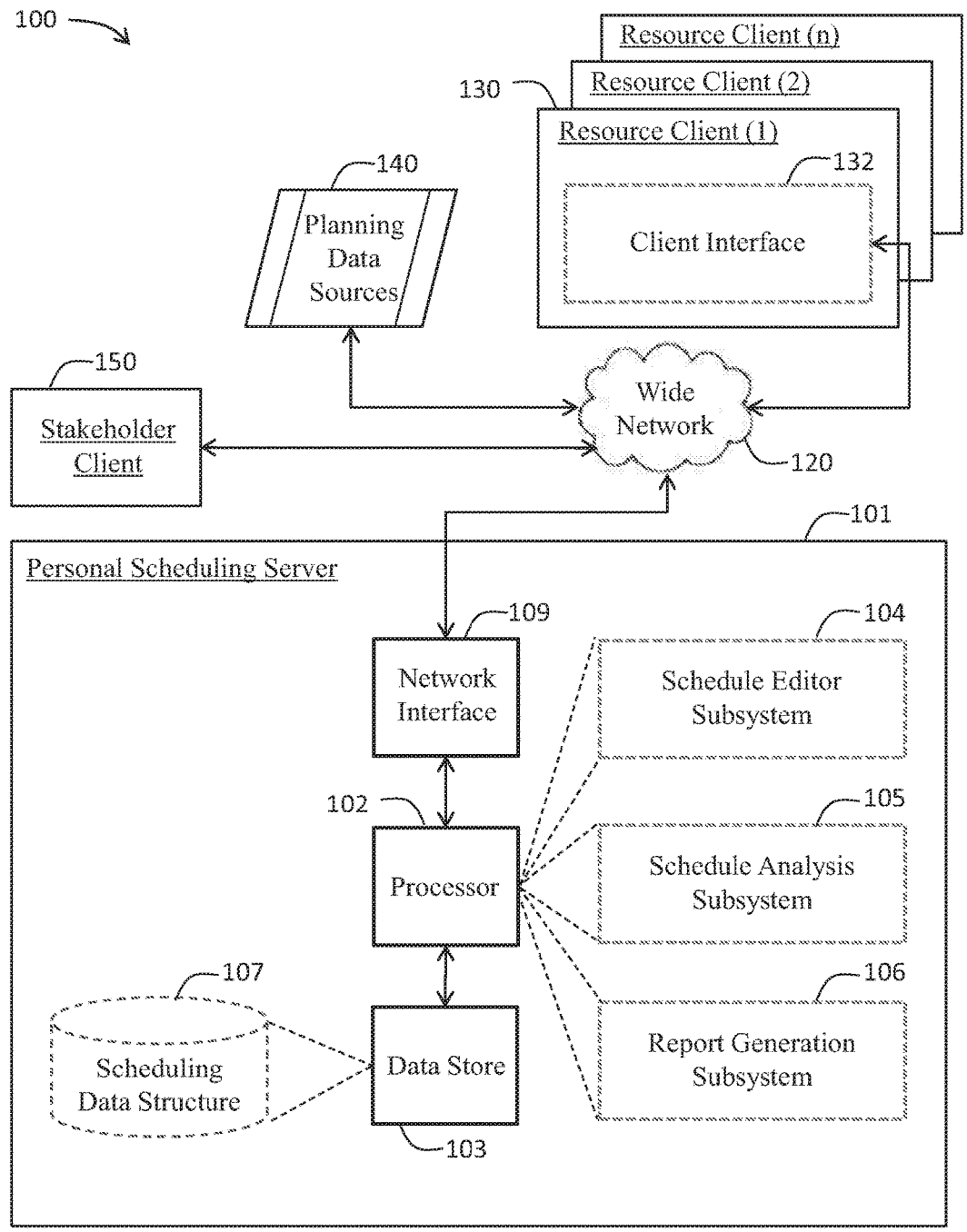
FIG. 1 is a schematic block diagram of a personal adaptive scheduling system (PASS) according to an embodiment of the present invention.
Figure 1A:
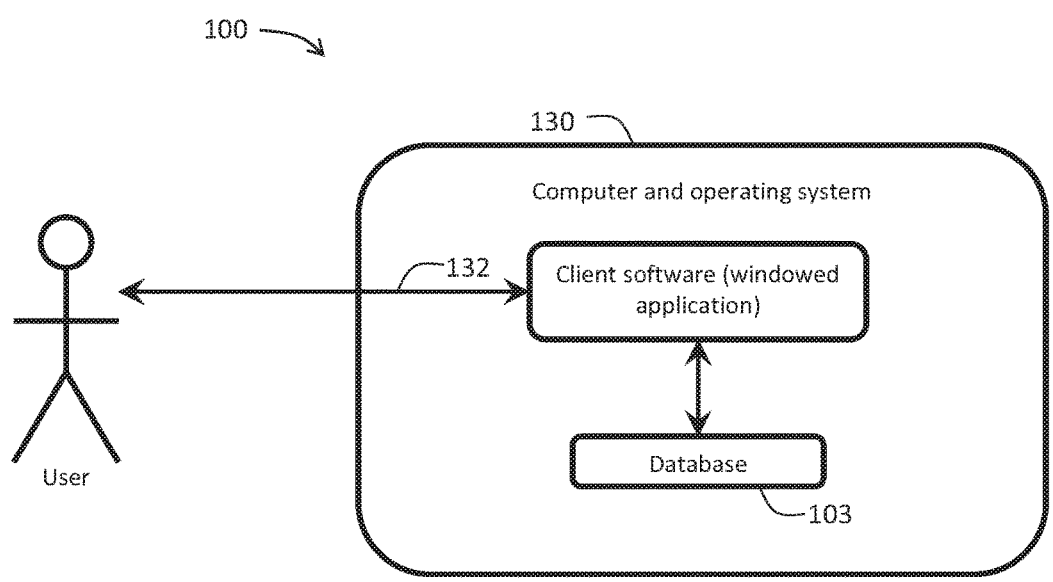
Figure 1B:
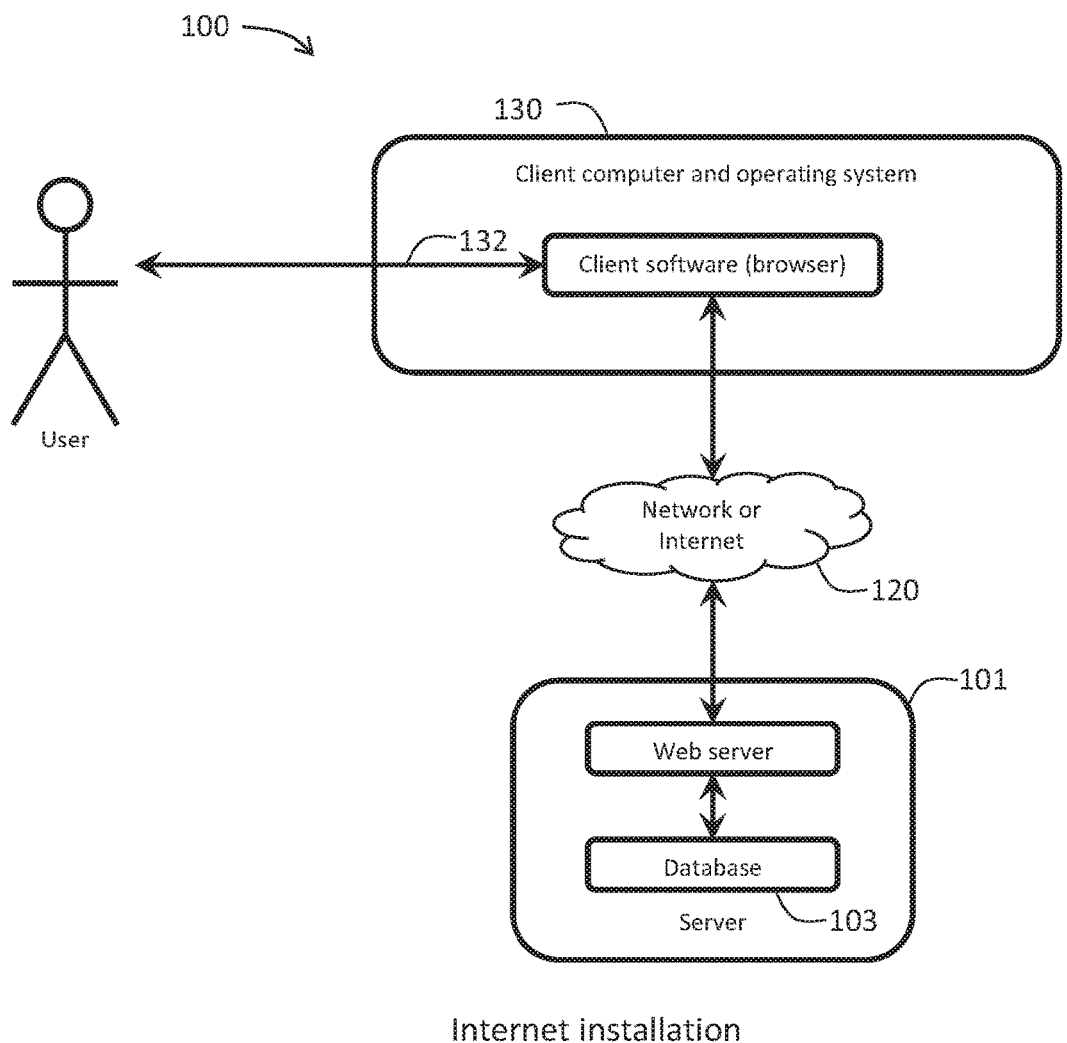
Figure 1C:
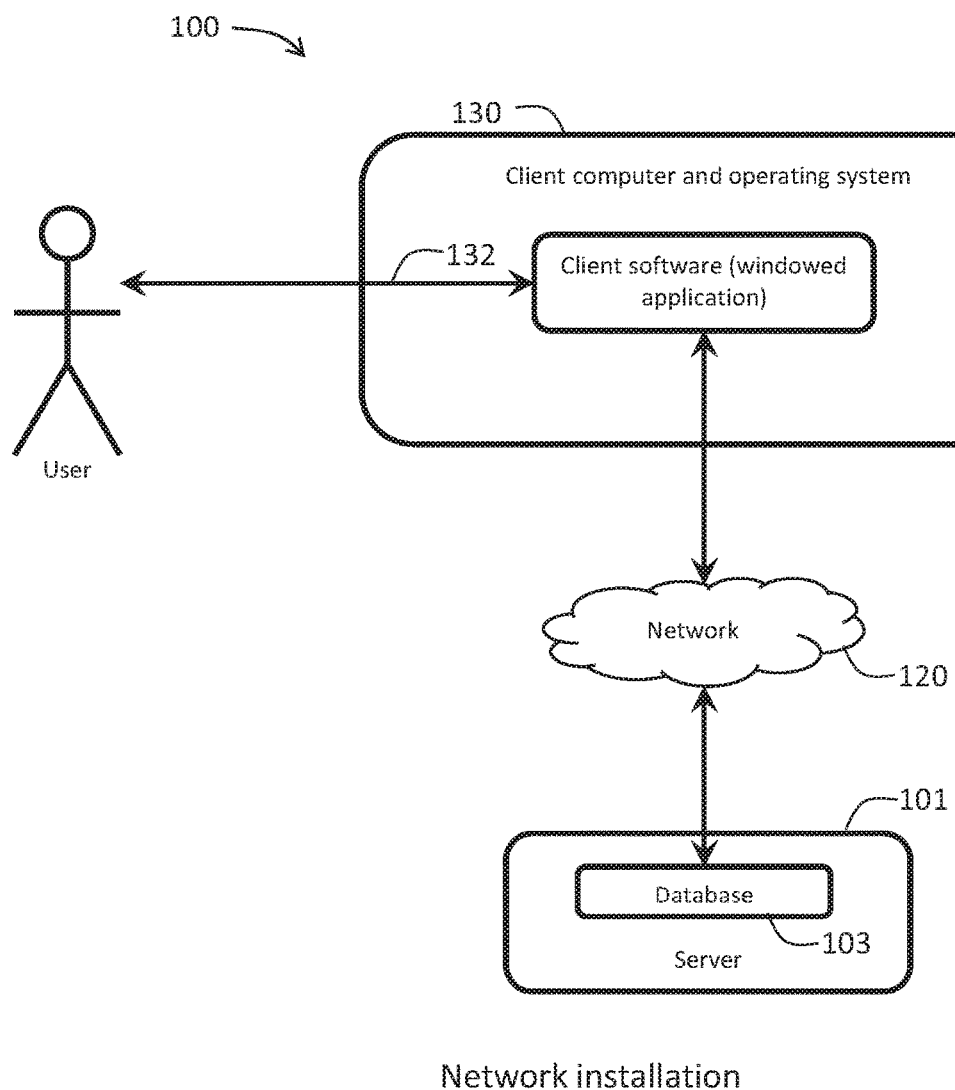

Each of FIGS. 1A, 1B, and 1C is a schematic block diagram of a respective exemplary architecture of a PASS according to an embodiment of the present invention.

Figure 2:
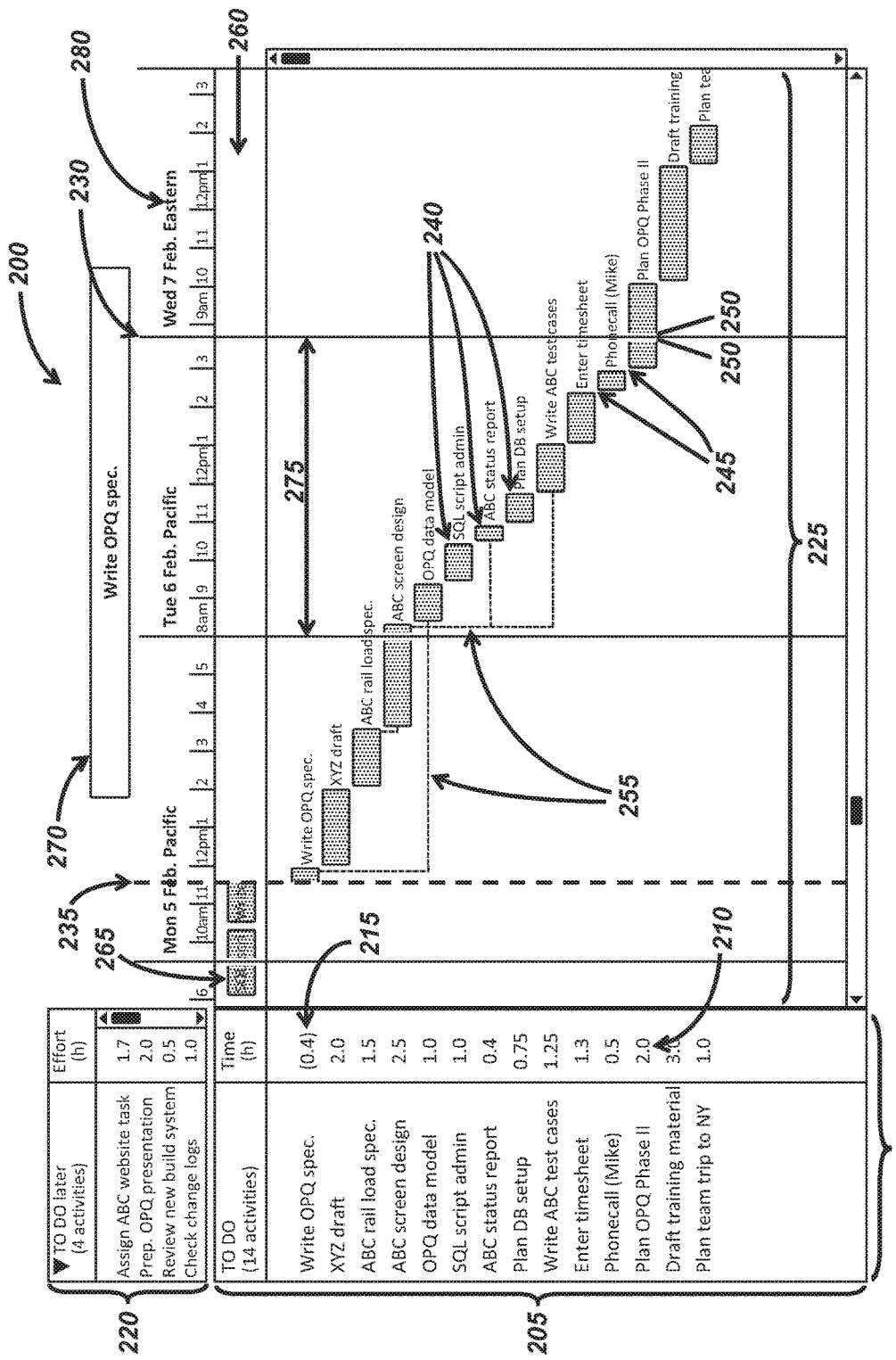
Figure 3:
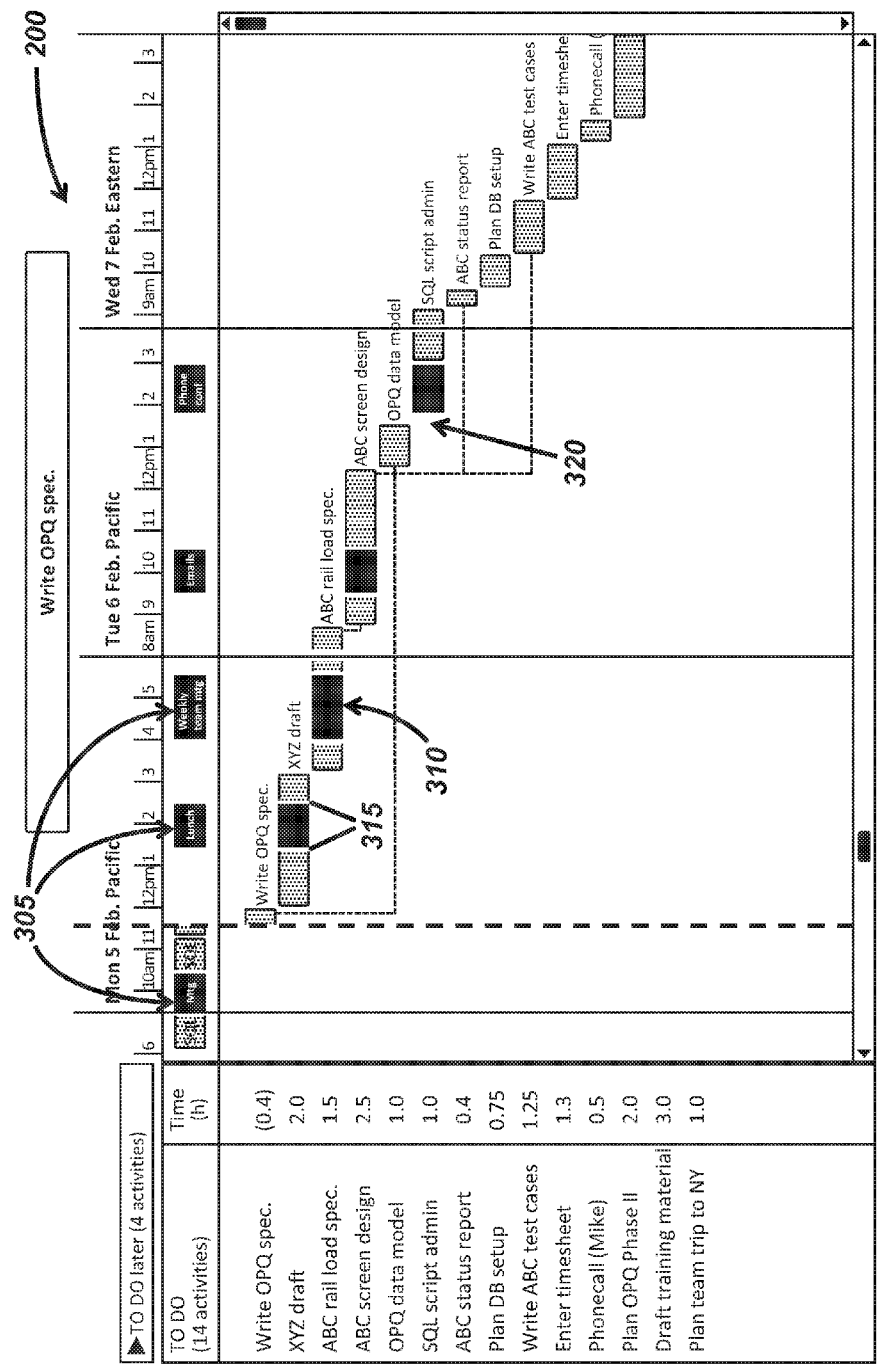
Figure 4:
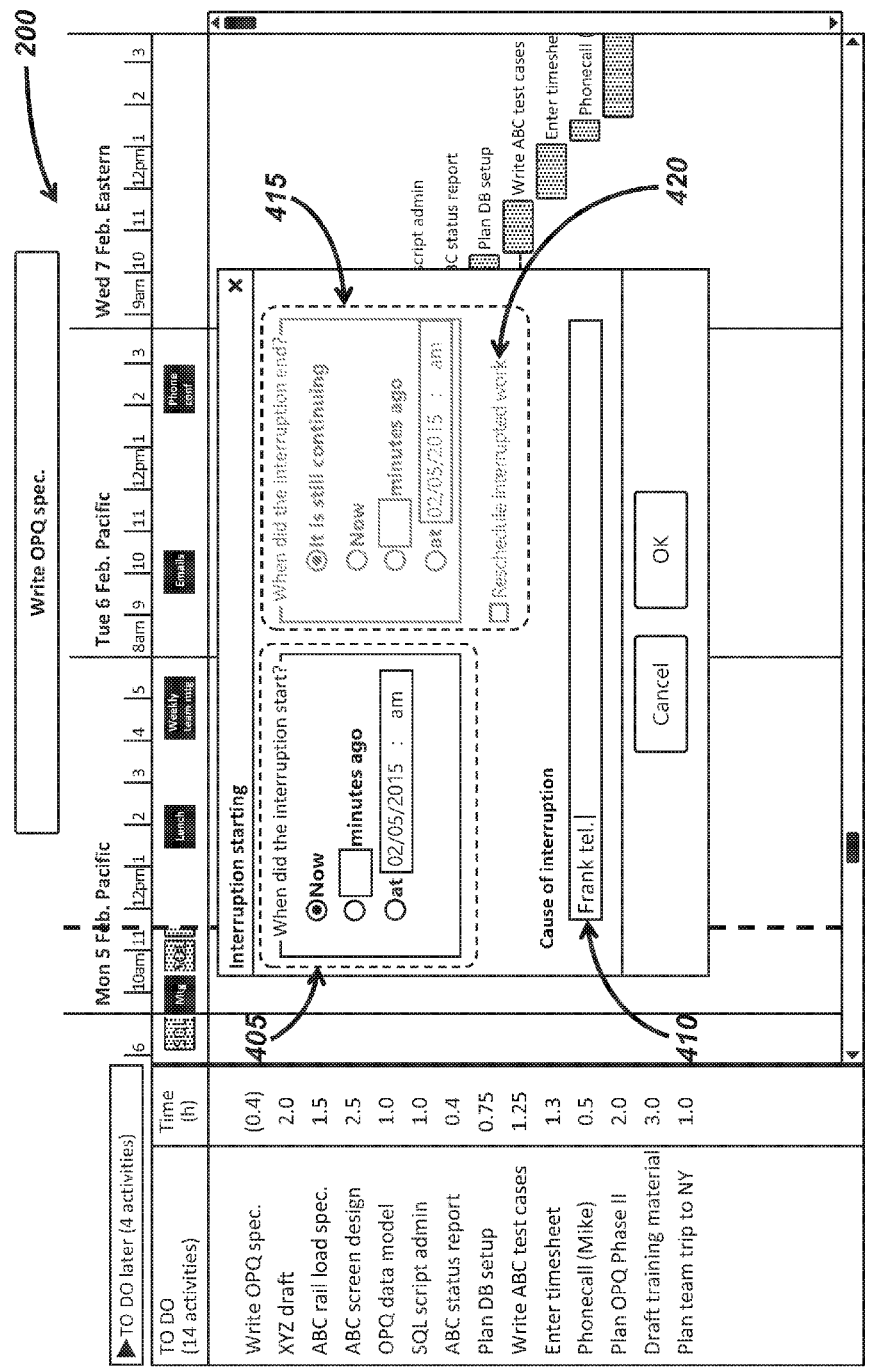

Each of FIGS. 2 through 4 is a diagram respectively illustrating exemplary features of a personal adaptive schedule chart as displayed by a PASS according to an embodiment of the present invention.

FIGS. 5A through 5D is a table of exemplary interruption handling conditions processed by a personal adaptive schedule chart as maintained by a PASS according to an embodiment of the present invention.

Each of FIGS. 6 through 12 is a diagram respectively illustrating exemplary features of a personal adaptive schedule chart as displayed by a PASS according to an embodiment of the present invention.

Figure 13:
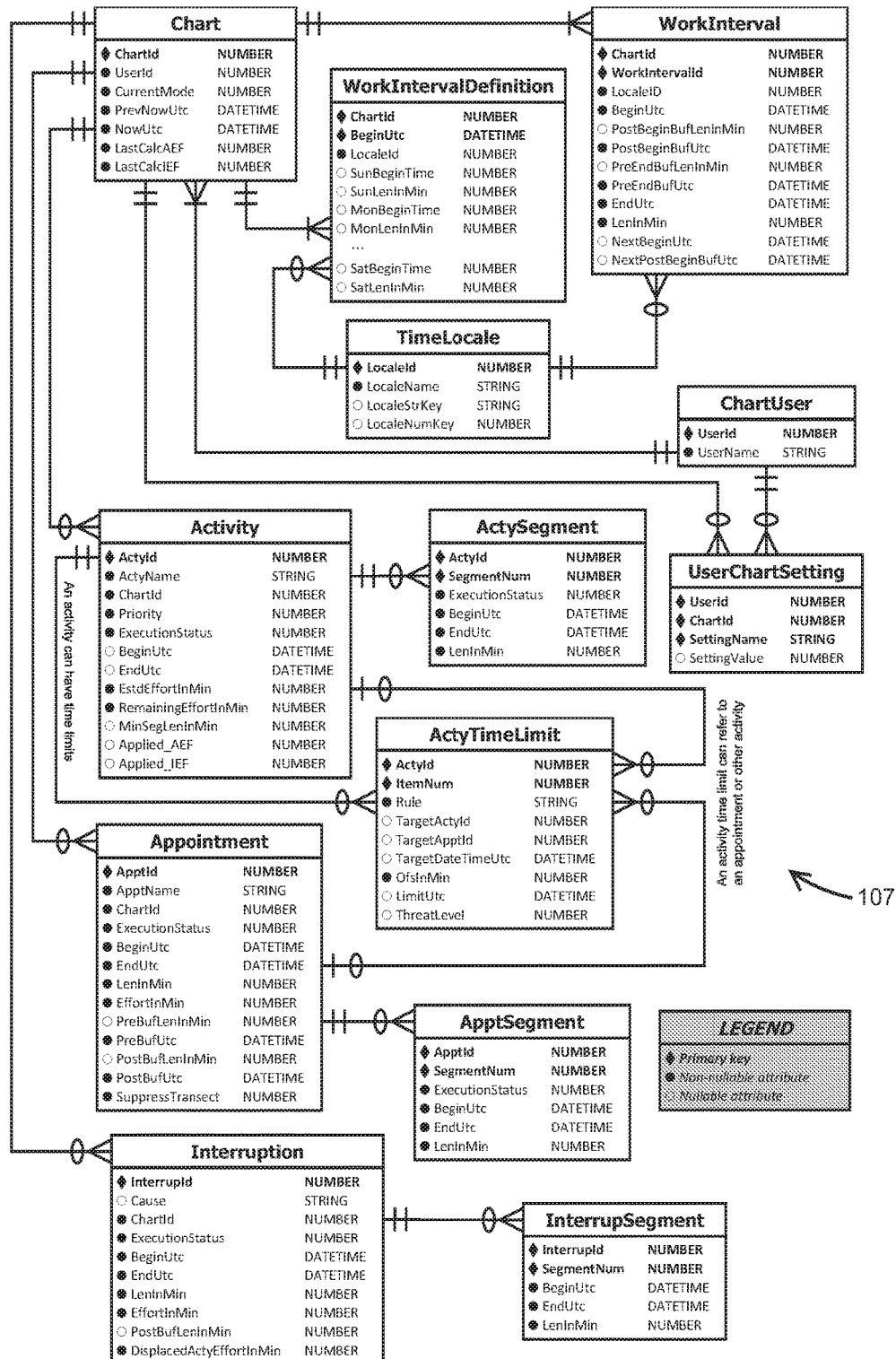

FIG. 13 is an illustration of an exemplary data structure for the PASS depicted in FIG. 1.

Figure 14:
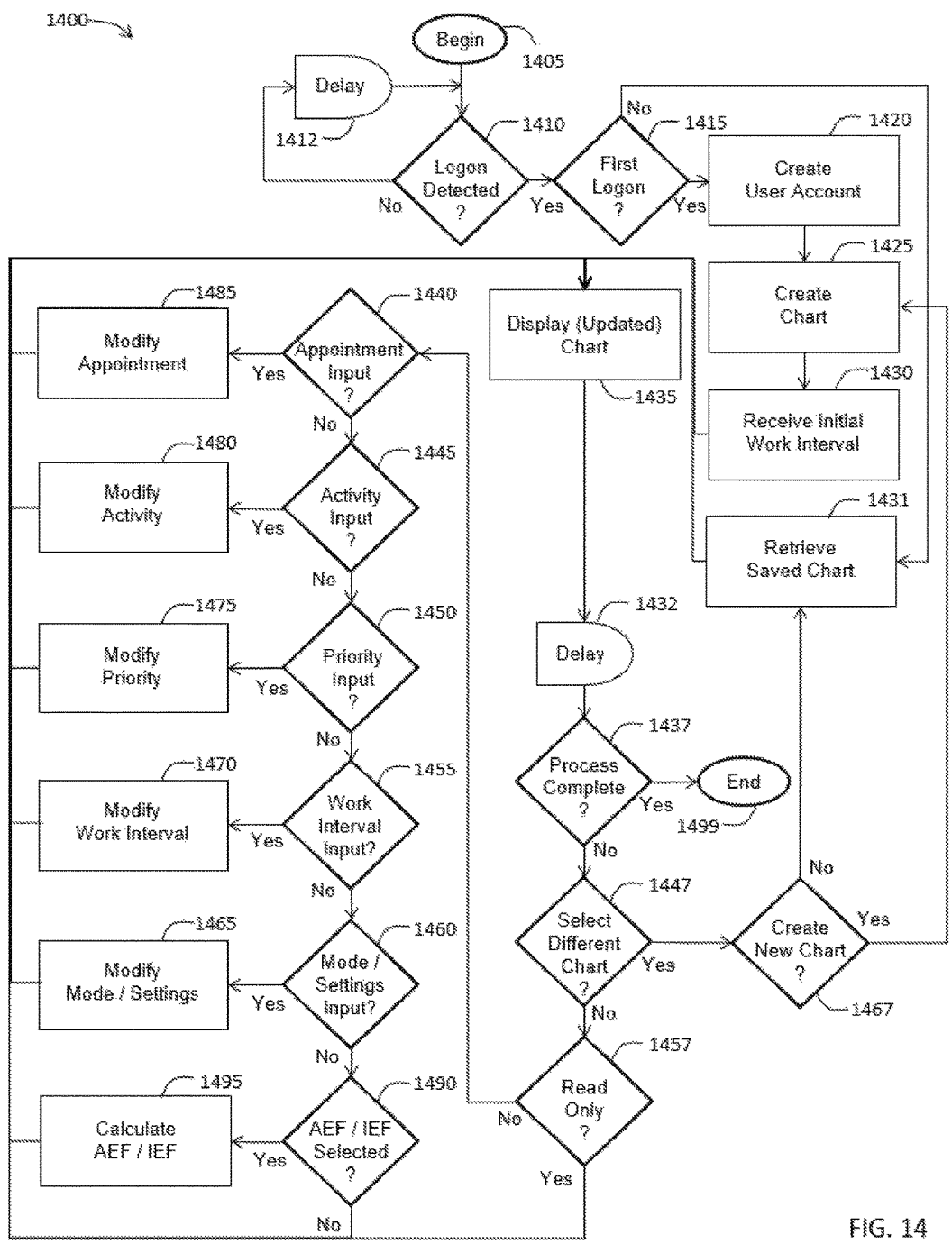

FIG. 14 is a flow chart illustrating a method of setting up and using a PASS according to an embodiment of the present invention.

FIG. 15 is a table illustrating rules for generating work intervals of a personal adaptive schedule chart as used by a PASS according to an embodiment of the present invention.

Figure 16:
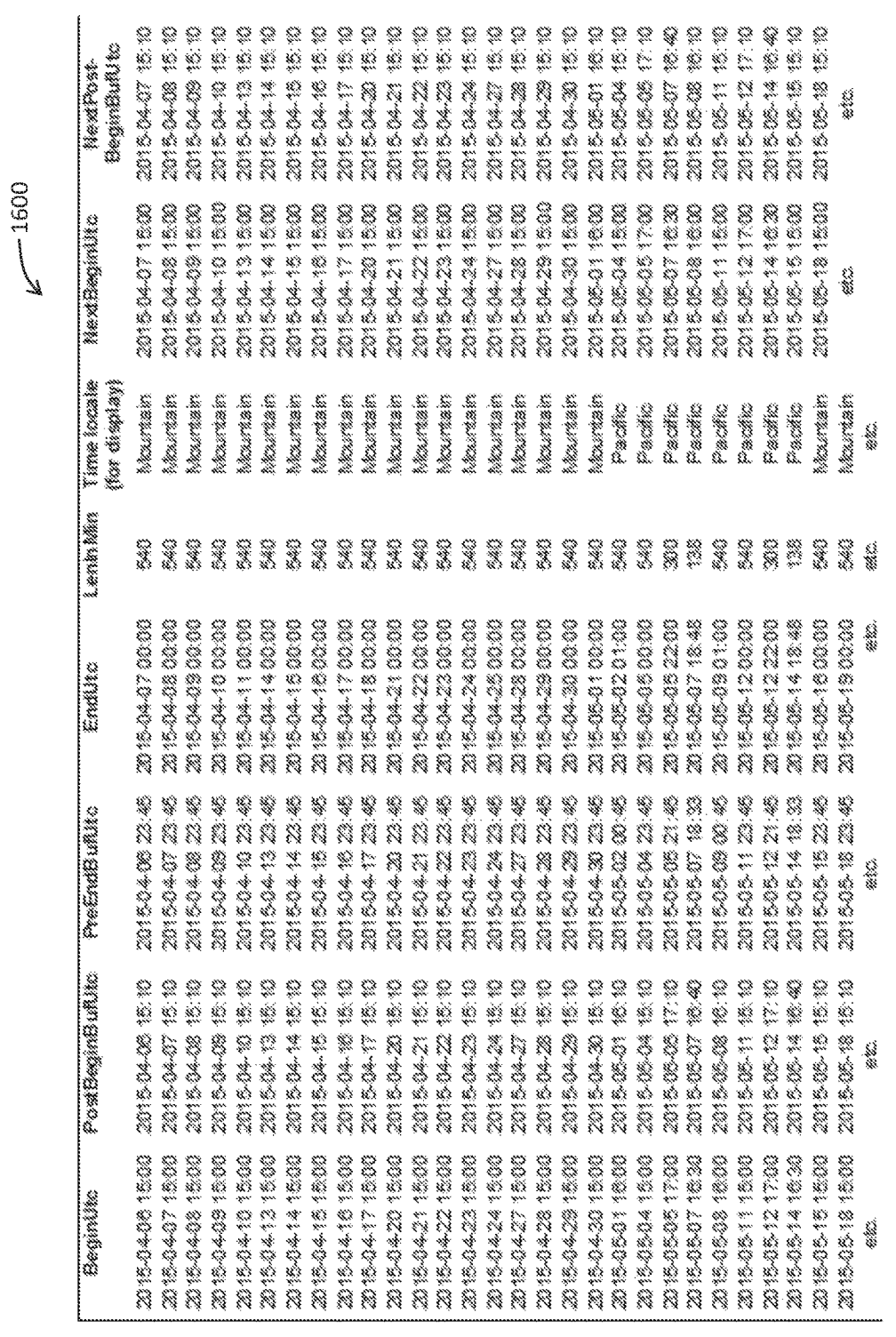

FIG. 16 is a table illustrating exemplary generated work intervals of a personal adaptive schedule chart as used by a PASS according to an embodiment of the present invention.

FIG. 17 is an SQL query illustrating an exemplary method of assembling information on work intervals for display in a personal adaptive schedule chart as used by a PASS according to an embodiment of the present invention, FIG. 18 is a table illustrating exemplary information on work intervals assembled using the SQL query of FIG. 17.

Figure 19:
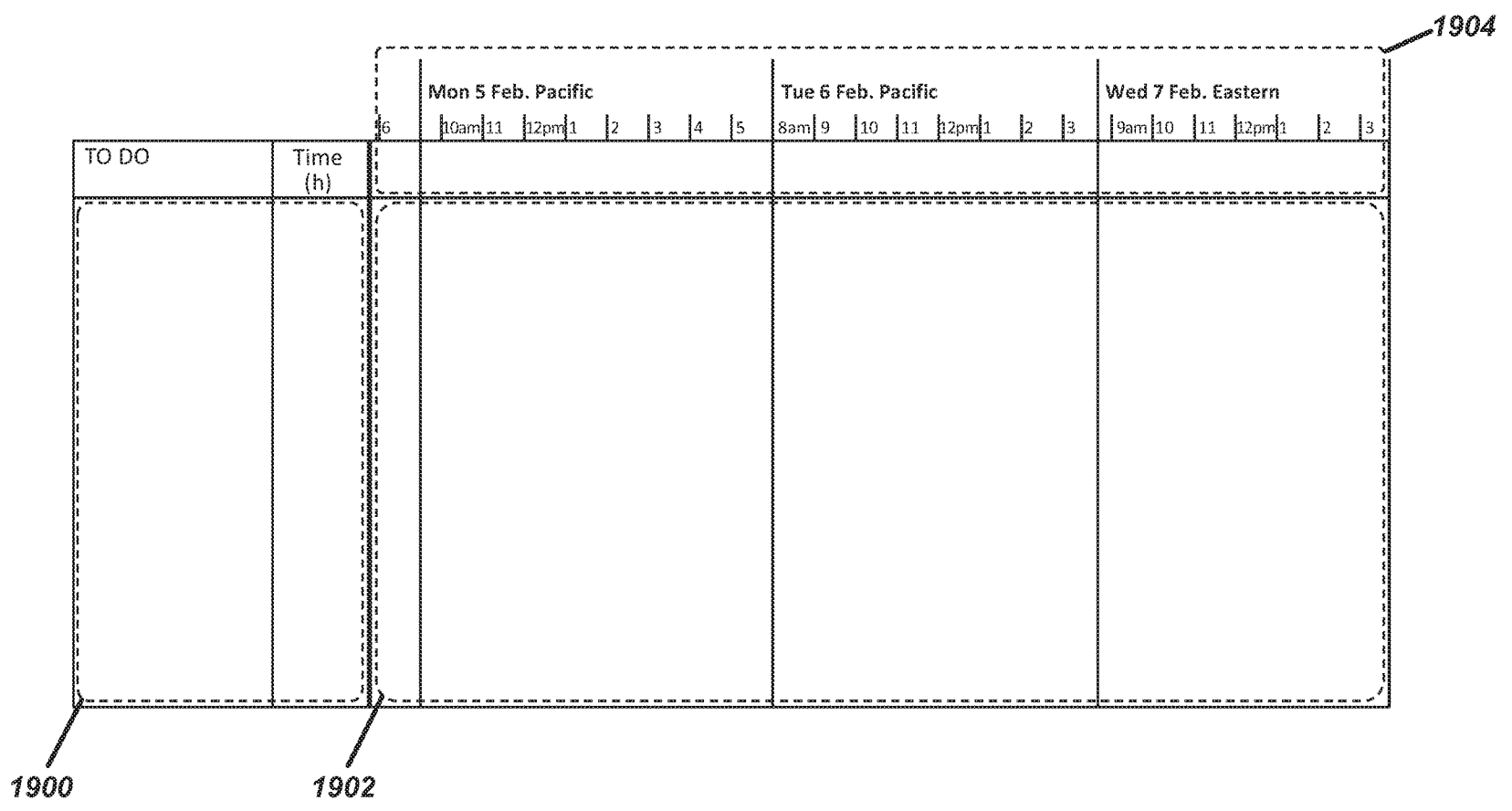
Figure 20:
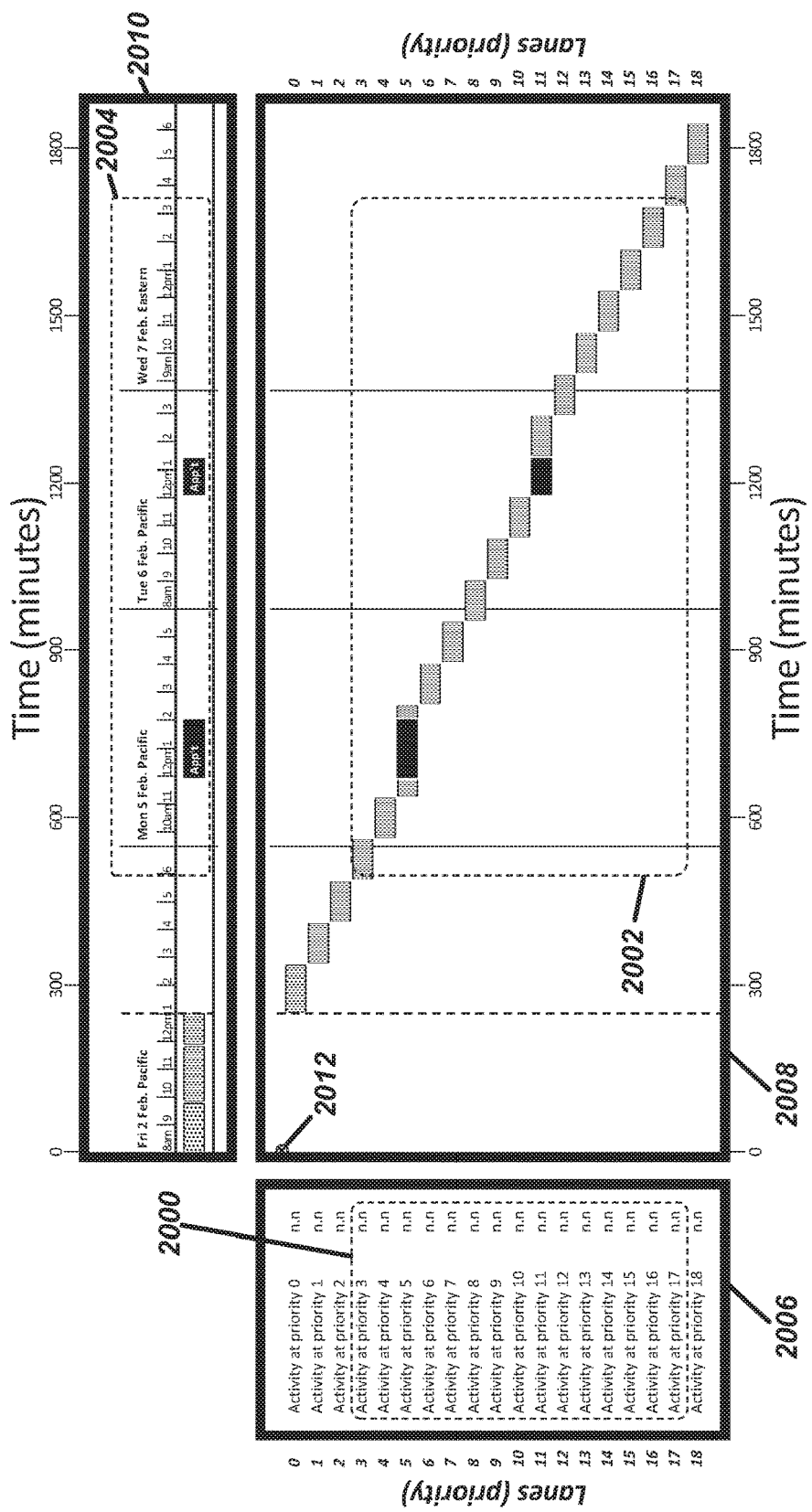

Each of FIGS. 19 and 20 is a diagram respectively illustrating exemplary features of a personal adaptive schedule chart as displayed by a PASS according to an embodiment of the present invention.

FIG. 21 is a pair of exemplary PL/SQL routines for calculating hourly divisions as used by a PASS according to an embodiment of the present invention.

FIG. 22 is a table illustrating exemplary hourly divisions calculated using the routines of FIG. 21.

FIG. 23 is a table illustrating exemplary horizontal offsets set for the hourly divisions of FIG. 22 and calculated using the routines of FIG. 21.

Figure 24:
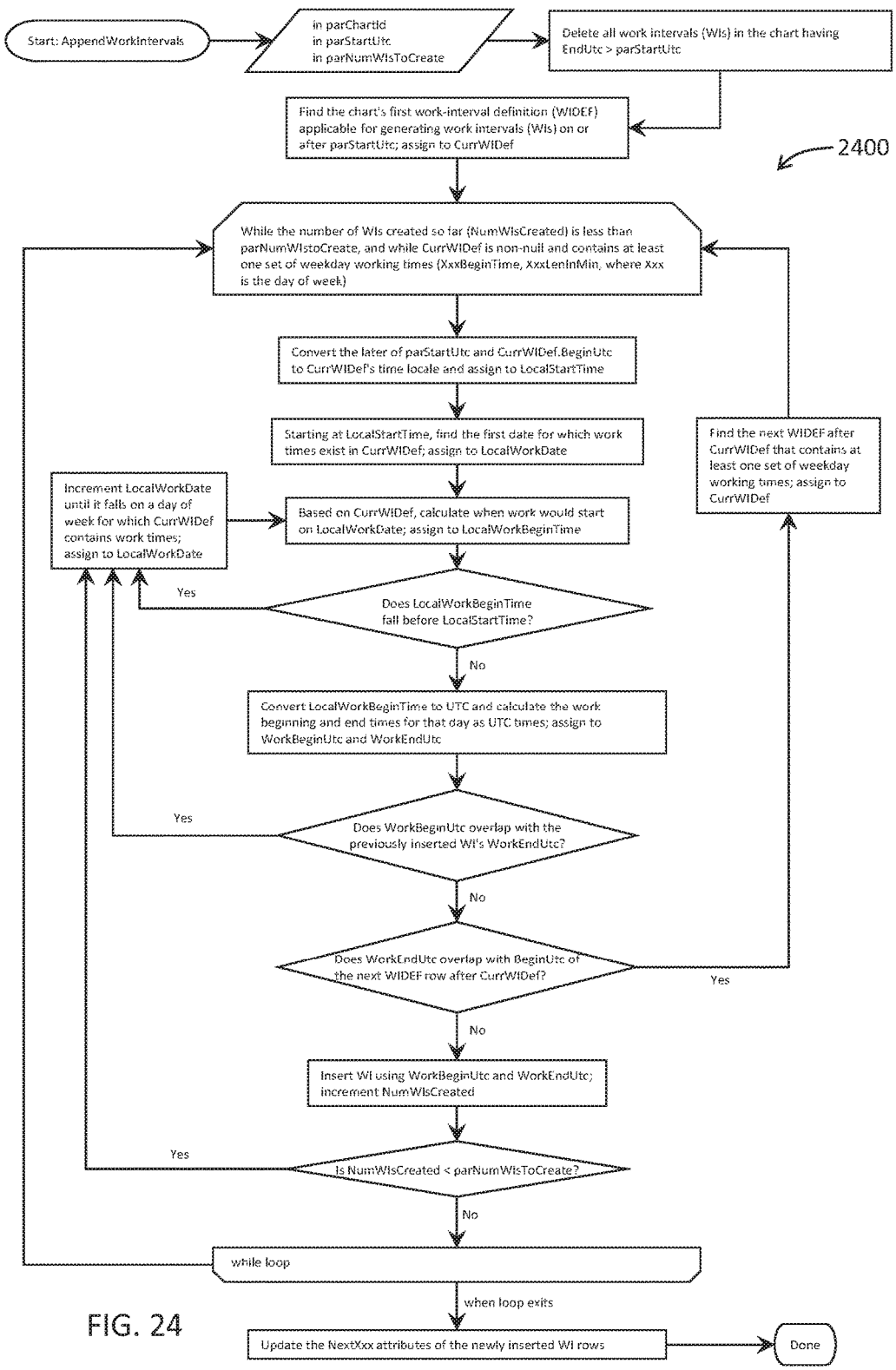

FIG. 24 is a flow chart illustrating a method of appending new work intervals to a personal adaptive schedule chart as displayed by a PASS according to an embodiment of the present invention.

Figure 25:
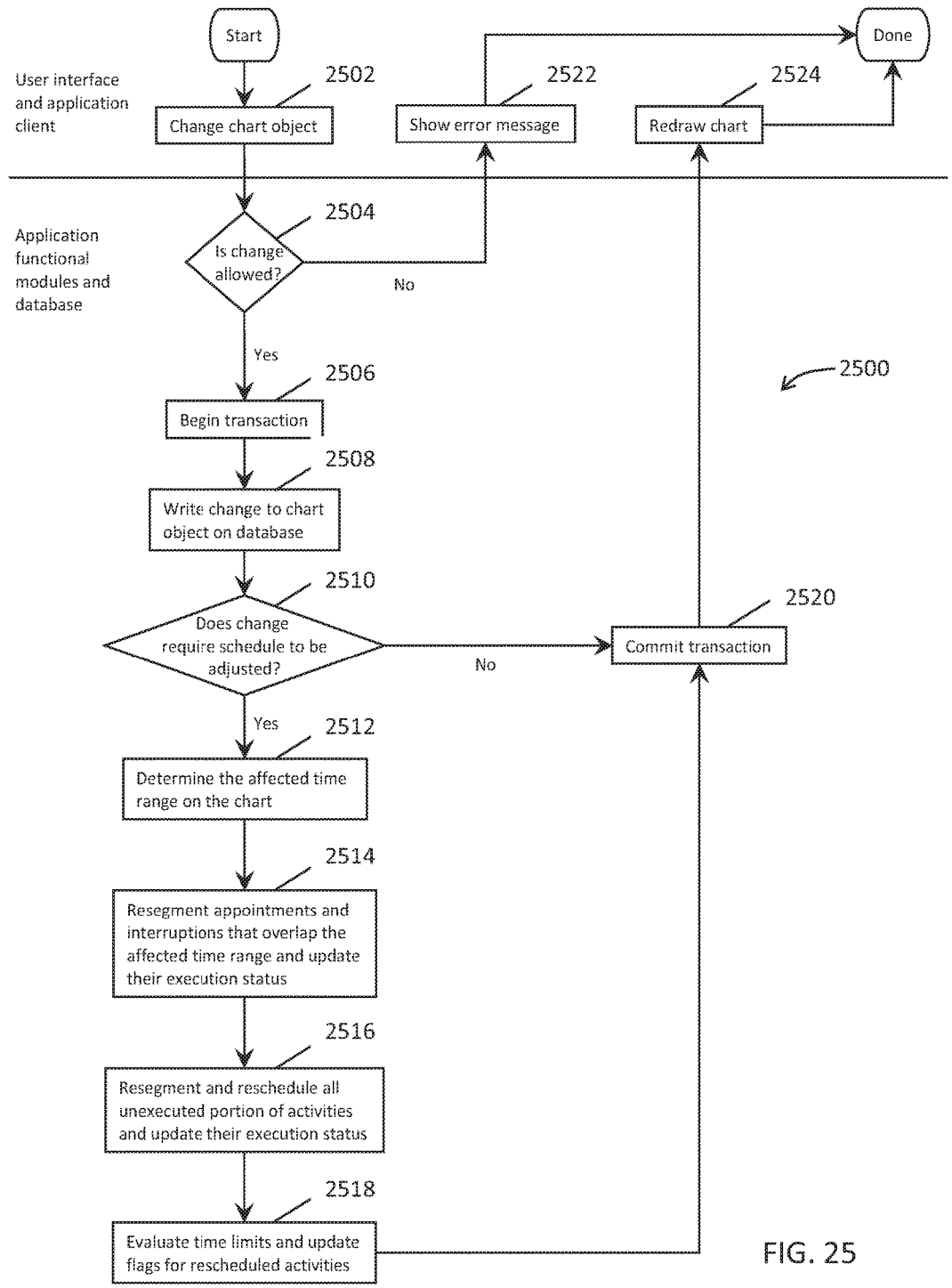

FIG. 25 is a flow chart illustrating a method of processing changes in elements within a personal adaptive schedule chart as maintained by a PASS according to an embodiment of the present invention.

FIGS. 26A through 26B is an SQL query illustrating an exemplary method of assembling information on elements for display in a personal adaptive schedule chart as maintained by a PASS according to an embodiment of the present invention.

FIGS. 27A through 27B is a table illustrating exemplary information on elements assembled using the SQL query of FIGS. 26A through 26B.

Figure 28:
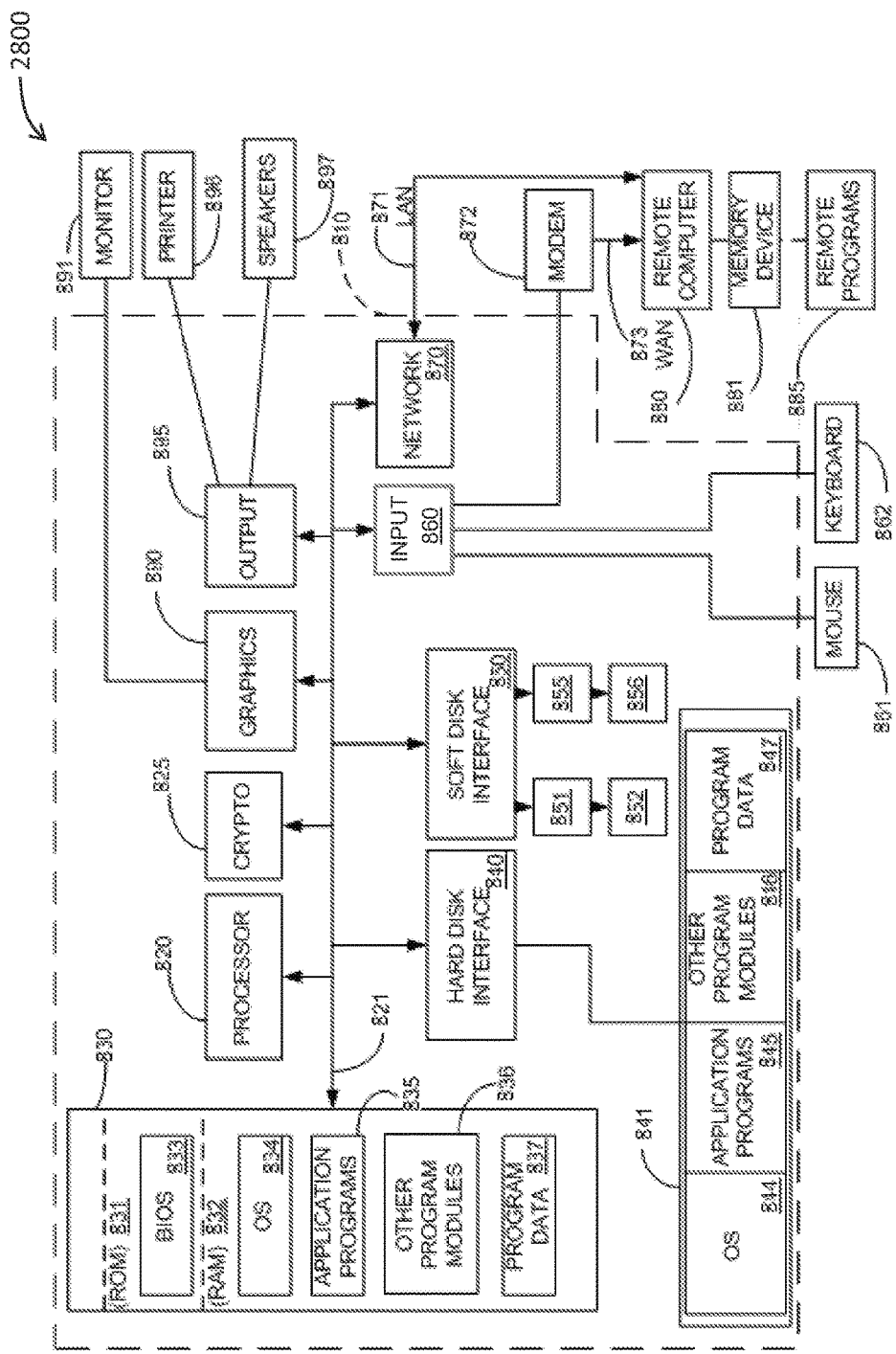

FIG. 28 is a block diagram representation of a machine in the example form of a computer system according to an embodiment of the present invention.

FIGS. 29A through 29C is a set of declarations of utilities and constants as used by an exemplary implementation of a PASS according to an embodiment of the present invention.

Each of FIGS. 30A, 30B, 31, 32, 33, 34A, 34B, 35A, 35B, 36, 37, 38, 39, 40, 41, 42, 43, 44, 45, 46A, 46B, 46C, 47, 48, 49, 50A, and 50B is a pseudocode procedure illustrating logic for an exemplary implementation of a respective function of a PASS according to an embodiment of the present invention.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

In the interest of clarity, not all of the routine features of the implementations described herein are shown and described. It will, of course, be appreciated by one of ordinary skill in the art that in the development of any such actual implementation, numerous implementation-specific decisions must be made in order to achieve the developer's specific goals, such as compliance with application-related and business-related constraints, and that these specific goals will vary from one implementation to another and from one developer to another. Moreover, it will be appreciated by one of ordinary skill in the art that such a development effort might be complex and time consuming, but would nonetheless be a routine undertaking of engineering for those of ordinary skill in the art having the benefit of this disclosure.

Referring now to FIGS. 1-50B, an overall design for a computer-implemented solution, generally described as a Personal Adaptive Schedule System (PASS), and characterized by the features, specific elements, and behaviors described below which may support the needs of individuals in planning the execution of their work, is now described in detail. Throughout this disclosure, the present invention may be referred to as a personal schedule system, a personal adaptive schedule, an adaptive schedule system, a scheduling system, a scheduling service, a personal schedule, a scheduling tool, an application, a device, a system, a product, a service, and a method. Those skilled in the art will appreciate that this terminology is only illustrative and does not affect the scope of the invention. For instance, the present invention may just as easily relate to project planning and to program management.

Example systems and methods for a personal adaptive scheduling system are described herein below. In the following description, for purposes of explanation, numerous specific details are set forth to provide a thorough understanding of example embodiments. It will be evident, however, to one of ordinary skill in the art that the present invention may be practiced without these specific details and/or with different combinations of the details than are given here. Thus, specific embodiments are given for the purpose of simplified explanation and not limitation.

Referring to FIG. 1, a Personal Adaptive Scheduling System (PASS) 100 will now be discussed. For example, and without limitation, the Personal Adaptive Scheduling System 100, according to an embodiment of the present invention, may include a Personal Scheduling Server 101, which may be in data communication with a Resource Client 130 and/or a Stakeholder Client 150. The Resource Client 130 and/or Stakeholder Client 150 each may be coupled to the Scheduling Server 101 using a wide area network 120 such as the Internet. The Scheduling Server 101 also may have access to various Planning Data Sources 140 via the Internet 120.

More specifically, the Resource Client 130 may comprise a mobile device or a workstation. For example, and without limitation, the mobile device 130 may be a cell phone, smart phone, notebook computer, a tablet personal computer (PC), or a personal digital assistant (PDA). Also for example, and without limitation, the workstation 130 may be a desktop computer or a laptop computer. Either the mobile device 130 or workstation 130 may be configured in data communication with the Scheduling Server 101, for example, and without limitation, using a wide area network 120 such as the Internet. The workstation 130 may be connected to the network 120 via a network server, a network interface device, or any other device capable of making such a data communication connection. The mobile device 130 may be configured to be connected with the network 120 via a hotspot that, for example, may employ a router connected to a link to the network 120. For example, and without limitation, the mobile device 130 may be connected to the Internet 120 by a wireless fidelity (WiFi) connection to the hotspot described above. Also for example, and without limitation, the mobile device 130 may be configured to be connected with the network 120 via a mobile network (not shown) that may be any type of cellular network device, including GSM, GPRS, CDMA, EV-DO, EDGE, 3G, DECT, OFDMA, WIMAX, and LTE™ communication devices. These and other communication standards permitting connection to a network 120 may be supported within the invention. Moreover, other communication standards connecting the mobile device 130 with an intermediary device that is connected to the Internet, such as USB, FireWire, Thunderbolt, and any other digital communication standard may be supported by the invention.

For example, and without limitation, the Resource Client 130 may be configured to host some number of data processes which may be referred to as a Client Interface 132. For example, and without limitation, the Client Interface 132 may comprise a web browser and a communication application. "Web browser" as used herein includes, but is not limited to, any application software or program (including mobile applications) designed to enable users to access online resources over a wide network such as the internet. "Communication" as used herein includes, but is not limited to, electronic mail (email), instant messaging, mobile applications, personal digital assistant (PDA), a pager, a fax, a cellular telephone, a conventional telephone, television, video telephone conferencing display, other types of radio wave transmitter/transponders and other forms of electronic communication. Those skilled in the art will recognize that other forms of communication known in the art are within the spirit and scope of the present invention.

A typical user of a Resource Client 130 may be a prospective consumer of personal time management data and/or functions that employ such data, and that are made available by an online resource. A user may interact with various servers included in the Personal Adaptive Scheduling System 100 through the Resource Client 130. For example, and without limitation, users may include any individual seeking to manage personal and professional time toward accomplishment of a task and/or goal. Also for example, and without limitation, users may include any individuals or companies desiring to manage interdependencies among the task lists and/or schedules of multiple resources.

The Stakeholder Client 150 may comprise a mobile device or a workstation configured in data communication with the Scheduling Server 101 through the Internet 120. For example, and without limitation, services (in the form of available applications and components) hosted on the Scheduling Server 101 may be accessible from the Stakeholder Client 150. For example, and without limitation, stakeholders may include any individuals seeking to monitor progress toward completion of a task(s) by one or more resources. Also for example, and without limitation, stakeholders may include any individuals or companies having managerial responsibility for the productivity of multiple resources assigned to a project and/or to multiple, interdependent projects.

Continuing to refer to FIG. 1, the Scheduling Server 101 may comprise a processor 102 that may accept and execute computerized instructions, and also a data store 103 which may store data and instructions used by the processor 102. More specifically, the processor 102 may be configured in data communication with some number of Resource Clients 130, Stakeholder Clients 150, and Planning Data Sources 140. The processor may be configured to direct input from other components of the Personal Adaptive Scheduling System 100 to the data store 103 for storage and subsequent retrieval. For example, and without limitation, the processor 102 may be in data communication with external computing resources 130, 140, 150 through a direct connection and/or through a network connection 120 facilitated by a network interface 109.

Schedule Editor Subsystem 104 instructions, Schedule Analysis Subsystem 105 instructions, and Report Generation Subsystem 106 instructions may be stored in the data store 103 and retrieved by the processor 102 for execution. The Schedule Editor Subsystem 104 may advantageously receive and validate resource-centric time management information including both user input and project constraints (e.g., originating from Planning Data Sources 140), and may record that information into a Scheduling Data Structure 107. The Schedule Analysis Subsystem 105 may retrieve the time management information from the Scheduling Data Structure 107 and analyze the information for purposes of determining risks to achieving project progress and/or to meeting project deadlines. The Report Generation Subsystem 106 may advantageously generate reports illustrating results of resource-centric schedule analyses.

Those skilled in the art will appreciate, however, that the present invention contemplates the use of computer instructions that may perform any or all of the operations involved in personal adaptive scheduling, including project plan construction, task tracking, resource collaboration servicing, project information collection and storage, and resource management. The disclosure of computer instructions that include Schedule Editor Subsystem 104 instructions, Schedule Analysis Subsystem 105 instructions, and Report Generation Subsystem 106 instructions is not meant to be limiting in any way. Those skilled in the art will readily appreciate that stored computer instructions may be configured in any way while still accomplishing the many goals, features and advantages according to the present invention.

For example, and without limitation, the system 100 may employ any of the structures shown in FIGS. 1A-1C. The architecture described above may be configured as a windowed application corresponding to a stand-alone installation (FIG. 1A) or network installation (FIG. 1C). Such installations may represent a client-server architecture in which the client may include a "front-end" windowing application that, for example, and without limitation, may be constructed using a standard programming tool and language (e.g., Delphi@, C#) and the server may include a database running on a database engine such as Oracle® 11g. The database server may execute on the same computer as the client although, as illustrated above, such colocation is not required. The system 100 may be adapted to an internet architecture (FIG. 1B), for example, and without limitation, in which the functional logic described herein may be encapsulated as stored procedures on the database (as exemplified in the code listings described herein) or as classes or routines separate from the classes or routines for displaying information to the user.

Example methods and systems for a Personal Adaptive Scheduling System (PASS) are described herein below. In the following description, for purposes of explanation, numerous specific details are set forth to provide a thorough understanding of example embodiments. It will be evident, however, to one of ordinary skill in the art that the present invention may be practiced without these specific details and/or with different combinations of the details than are given here. Thus, specific embodiments are given for the purpose of simplified explanation and not limitation. Some of the illustrative aspects of the present invention may be advantageous in solving the problems herein described and other problems not discussed which are discoverable by a skilled artisan.

An embodiment of the present invention, as shown and described by the various figures and accompanying text herein, provides a Personal Adaptive Scheduling System (PASS) that may implement automated, intelligent time management support services. The system may advantageously automatically forecast when a person may be able to accomplish planned activities and may give detailed prescriptive guidance as to exactly when the person should focus effort on those activities. For example, and without limitation, the system may be configured to determine not only the overall time range within which work on a given activity might be performed, but also the exact times when effort should be actively focused upon the activity. The system also may advantageously provide a graphical means of immediately recognizing the relative amount of effort which the person may need to actively focus on each scheduled activity.

The system also may advantageously allow complete flexibility in defining and adjusting what times the person has available to work, and may readily allow frequent changes to these times. For example, and without limitation, the system may be employed to define any desired individual time span as a work interval to be used when forecasting the schedule. The system also may advantageously allow mixing of different time zones in the schedule, so that the person may accurately forecast how work will proceed if s/he plans to travel to and work in different time zones. The system may advantageously maximize the amount of schedule-relevant information that is displayed, omitting "dead intervals" that may be unavailable for working, so that even at high time resolutions (e.g., hours, minutes), no space may be wasted on information that may be irrelevant for planning the person's work effort.

The system also may advantageously readily allow rapid entry of new activities, adjusting of activity attributes, adjusting of activity priorities, and deletion of no-longer-relevant activities. The system also may advantageously allow the person to plan for appointments having fixed start and end times. For example, and without limitation, these appointments may be mapped to the flexible work intervals within which they fall and taken account of when forecasting. The system also may advantageously provide a way to immediately recognize how much activity effort may have been displaced by planned appointments, so that the person may easily anticipate the possible effects that adjusting or removing those appointments may have on activities that should be performed as soon as possible.

The system also may advantageously allow the person to quickly record the occurrence and cause of interruptions and to easily recognize both past and ongoing interruptions' effects on the schedule, and particularly on the ability of the person to get tasks done on time. The system also may advantageously take account of the time needed to switch between different kinds of activities, and/or the time needed for resuming an activity after an interruption has occurred. The system also may advantageously instantly reforecast the scheduled distribution of activity effort in response to changes in the expected remaining effort of any individual activity; in the number of planned activities (i.e. when activities are created or deleted); in the planned priority of activities (i.e., order in which they are to be performed); and/or in the timing of appointments, or new or deleted appointments. The system also may advantageously instantly reforecast the scheduled distribution of activity effort in response to addition of new interruptions, and/or changes to ongoing interruptions; introduction of undertime, overtime, or any other changes in the person's work-availability time; and/or revisions to the expected time needed for switching between different kinds of activities. The forecasting may take account of the interrelated effects of all the above factors.

The system also may advantageously allow the person to specify a minimum duration of continuous effort per activity that may be respected when forecasting, for example, and without limitation, so that work is not scheduled for unrealistically short time-availability slots. The system also may advantageously assess the amount of effort displaced by interruptions and, optionally, may apply the experience from them to the schedule when forecasting. The system also may advantageously assess the inaccuracy of the person's past effort estimates and, optionally, may apply the experience from them to the schedule when forecasting.

The system also may advantageously warn the person in advance when time constraints within which an activity may be performed threaten to be violated, so that the person may take steps as early as possible to adjust the schedule in order to avoid the violation. The system also may advantageously allow the person to define not only explicit time constraints on activities (e.g. "Activity A must finish before 10:00 a.m. on Feb. 2, 2015") but also referential time constraints (e.g. "Activity A must finish at least two hours before Appointment B starts, whenever that is"), so as to facilitate proper evaluation of the risk of violating these constraints even if the referenced events change. The system also may advantageously provide graphical cues allowing the person to recognize quickly which adjustments to the schedule may relieve time pressure or otherwise reduce the proximity of an activity to its time constraints.

The system also may advantageously provide a way to automatically record and trace the effort spent on work activities, appointments, and interruptions, in order to more easily allow for analysis of work efficiency, for invoicing, and for determining why certain kinds of scheduling difficulties may have occurred. The system also may advantageously present all of the schedule elements in a single unified view so as to allow a user of the system to evaluate and adjust the schedule elements quickly, with a minimum of time and thought required for intervention. The system also may advantageously quickly and accurately answer questions such as, for example, and without limitation, "Can I get this task done before the meeting on Tuesday if I work two hours of overtime this Friday, two more hours of overtime on Saturday, and cancel my appointment on Monday?" The system also may advantageously support after-the-fact analysis of why certain time constraints could not be met, for example, and without limitation, by showing which activities were delayed, and by how much, due to specific interruptions.

For example, and without limitation, a Personal Adaptive Scheduling System (PASS) may comprise a design for computer software configured to facilitate a user advantageously managing various schedule-influencing factors so as to avoid unnecessary multitasking, reduce deadline pressures, and avoid stress.

Referring now to FIGS. 2-4 and 6-12, and still referring to FIG. 1, for example, and without limitation, objects created by the Schedule Analysis Subsystem 105 and displayed by the Report Generation Subsystem 106 may include a prioritized To Do list; an effort-scaled, serialized cascading bar chart that may be similar in appearance to a Gantt chart, extending over a time axis; a lane at the top of the chart in which appointments may be scheduled and interruptions and executed activities may be tracked; elements within the cascading bar chart, defined as "appointment transects," which may show the immediate and future cumulative effects of scheduled appointments on the timing of all planned activities; interruption-tracking bars which may show the immediate and future effects of interruptions on the timing of all planned activities; warning colors or icons that may alert the user to future potential increases in time pressure and time-limit-violation threats; and time-limit indicators for each activity that may support easier reprioritization of activities by graphically indicating the degree of "play" available for rescheduling each activity. By graphically representing the interactions of schedule-relevant factors and presenting them in an easy-to-use, unified application context, the Report Generation Subsystem 106 may allow the user to recognize with greater accuracy when individual activities may most likely be completed; may alert the user in advance when deadlines or other time limits are likely to be violated; and may support the user in quickly and proactively resolving potential time conflicts and deadline pressures before they cause a real problem. (Note: As a matter of definition, temporal constructs mentioned hereinafter may be commonly referred to as Gantt-like, horizontal constructs. However, a person of skill in the art will immediately recognize that temporal constructs are not limited to horizontal representations, but instead may be represented in any number of visually-advantageous ways.)

Also for example, and without limitation, the Report Generation Subsystem 106 may advantageously display representations of elements in the schedule charts of multiple resources as being linked together so that the interactions of schedule-influencing factors within small organizational units (e.g., teams) may be better tracked and responded to, and may display representations of elements in the schedule charts of different resources as being linked to high-level project-planning charts so that potential scheduling pressures may be visualized at the project-planning level, advantageously allowing project managers to recognize more accurately when time-related threats to project completion are occurring or may occur.

In one embodiment of the invention, as shown and described by the various figures and accompanying text herein, the resource-centric time management information written to the Scheduling Data Structure 107 by the Schedule Editor Subsystem 104, and/or retrieved from the Scheduling Data Structure 107, may be processed by the Schedule Analysis Subsystem 105 instructions to create and/or manipulate the following system 100 objects and/or implement the following system 100 functionalities:

(1) general work-interval settings in which the user may be able to specify the usual working days of the week (e.g. Monday to Friday), the usual working times of each day (e.g. 9:00 a.m. to 6:00 p.m.), and the time zone and date range in which the work-interval settings may be applied. For example, and without limitation, the user may be able to enter multiple sets of such work-interval settings to account for travel and work in different time zones over different time intervals.

(2) a table of working dates and times, defined as schedule work intervals (WIs), that may be generated from the above settings and stored in a database. For example, and without limitation, the user may be able to adjust the start and end times of individual WIs and add or remove WIs as exceptions to the standard settings described above, so that they may accurately represent the time intervals which may be available for working.

(3) a database table containing planned appointments that the user may be able to enter (or may be able to import from a standard calendar program), for example and without limitation, specifying at least the name and the start and end time of each appointment; and a database table containing the individual scheduled segments that may belong to each appointment.

(4) a database table containing activities (e.g., "To Do" items required to be done when possible, but which may be characterized as having no predefined start time) that the user may be able to enter in a list, specifying, for example, and without limitation, the name of each activity, and the estimated core effort of each activity (i.e. how long the worker may take to perform the activity if allowed to work on it continuously without any interruptions or appointments occurring); a database table containing the individual scheduled segments that may belong to each activity; and a database table configured to receive time limit information (e.g., a deadline by when an activity may be completed).

(5) a database table configured to store any unplanned interruptions that may occur during WIs, and which the user may be able to enter either as they occur or afterwards, specifying, for example, and without limitation, when (or how long ago) the interruption began and when the interruption ended (or how long it lasted); and a database table containing the individual scheduled segments that may belong to each interruption. For example, and without limitation, dates and times of WIs, appointments, activities and interruptions may be stored on the database and in memory as Coordinated Universal Times (UTC) to avoid time-offset-calculation difficulties due to standard vs. daylight savings time and due to working in different time zones, but may be input by and displayed to the user as local-time-zone dates and times as specified in the general work-interval settings.

(6) a horizontal, scrollable chart that may graphically display the table of WIs described above on a main user interface as a schedule chart with a horizontal time axis, in which horizontal bars representing the times when effort may be focused on appointments, activities and interruptions may appear.

(7) a vertical line, referred to as the "Now" line, that may represent the current date and time and advance from left to right across the schedule chart as time proceeds.

(8) an editable To Do list that may be positioned at the left of the schedule chart and which may display the activities described above. For example, and without limitation, the user may be able to change the estimated core effort and the sequence of each To Do item in the list, or add or remove To Do items in the list. The relative priority of each activity (i.e. the order in which a particular activity may be planned to occur compared to other activities) may be represented by its sequence in the list, such that activities closer to the top of the list may be scheduled earlier and those closer to the bottom may be scheduled later.

(9) a graphical, horizontal bar appearing on the schedule chart that may be aligned horizontally with its corresponding To Do item and may consist of one or more continuous segments. For example, and without limitation, the horizontal bars for the To Do items may be serialized and cascading (i.e., arranged from left to right, to signify "earlier" to "later," on the schedule chart as their corresponding To Do items proceed from top to bottom). If the user changes the sequence of To Do items in the list at the left, the items' corresponding bars may be moved upwards/downwards, as appropriate. Also, the items' left-to-right sequence may be automatically changed so that bars for activities further down on the list may appear below and to the right of bars for activities further up on the list. Thus, the activity bars may be arranged as "steps" cascading downward from left to right as the schedule proceeds into the future.

(10) an "execution lane" running horizontally across the top of the schedule chart, in which horizontal bars representing current and future appointments may be scheduled and into which horizontal bars representing appointments, interruptions, and activities may flow as the "Now" line (as described above) proceeds from left to right.

(11) "time limit handles" that may be displayed or hidden, and that may extend horizontally from one end of each bar for an activity having a time limit (e.g., a deadline) to the time point on the schedule chart representing the time limit. As a matter of definition, a time limit handle may appear as a thin line similar to one of the "whiskers" on a box-and-whisker plot, except that the line may lie parallel to the time axis such that the "cross-bar" may be situated at the distal end of the line, at the point where the activity's time limit may lie. For example, and without limitation, the time limit handle may provide a visual cue about the degree to which its activity may be rescheduled to an earlier time in order to relieve any time pressure on the activity, or the degree to which the activity may be rescheduled to a later time without threatening its time limit. (Note: time pressure, as that term is used herein, may be defined as the proximity of an activity to any of its time limits such as, for example, and without limitation, a deadline.)

(12) warning/alerting icons or colors that may appear in or next to activity bars as they approach or cross their time limits.

For example, and without limitation, the start time of each future activity bar described above may be calculated as the end time of the activity which immediately precedes it, plus a parameterizable buffer time that may occur between any two consecutive activities. If instead the activity bar starts immediately after the start of a W, immediately after an appointment or immediately after an interruption, parameterizable buffer times pertaining to each of those situations may be applied in order to calculate the activity bar's start time.

The effort distribution of each future activity bar described in (9) above, as represented by one or more continuously or discontinuously distributed bar segments, may be calculated by adding the activity's estimated core effort to the duration of any appointments (appearing in the lane across the top of the chart) whose time intervals transect the bar, plus a parameterizable buffer time occurring before and after each appointment that transects the bar, and before and after any WI boundaries that transect the bar. If an interruption occurs, the unexecuted portion of any activity currently being performed (i.e. the portion of the activity bar immediately to the right of the "Now" line) may be displaced rightwards (to a later time) as the interruption proceeds, as may be all activity bars that appear to the right of (i.e. subsequent to) this activity bar, until the interruption concludes.

Whenever appointments are added, removed or rescheduled, or items on the To Do list are added, removed or reordered, or interruptions occur, or the start or end times of WIs are altered, the start times and effort distribution of scheduled activities and their segments may be immediately updated to reflect the new circumstances, adhering to the rules described above.

Employing the constructs described above, in other embodiments of the present invention, a PASS may be further characterized by one or more of the following features:

(1) the ability to scale the schedule chart to show fewer or more work intervals at once.

(2) the ability to automatically generate timesheet-style entries for billing or effort-analysis purposes (optionally aggregated by project and time interval, such as day, week or month).

(3) a means for the user to enter To Do items that are to be done at some time in the future but are not yet scheduled (prioritized); such unscheduled activities may be turned into scheduled ones, for example, and without limitation, by dragging them into the active To Do list so that they appear on the schedule chart.

(4) a means for the user to specify dependencies between activities, which may be shown with a line connecting the interdependent activities. For example, and without limitation, the system may prevent an activity from being ordered (i.e. prioritized) before another activity on which it is dependent; also, the system may allow an activity to be dependent on multiple activities.

(5) a means for the user to define the deadline or other time limits pertaining to an activity by specifying the activity's temporal relationship to the start or end of another activity or an appointment, plus a positive or negative time offset (e.g. a rule stating that an activity must "finish at the latest by two days before Appointment ABC begins," or must "begin at the latest by 4 hours before Appointment XYZ ends").

(6) a means for the user to define multiple such deadlines or time limits of an activity (e.g. rules stating that an activity must "finish by 4 hours before Appointment LMN begins" and must "finish within 8 hours of when Appointment OPQ ends").

(7) the ability for the user to display time-limit handles on the chart for referential time limits, such as those specified in features (5) and (6) above.

(8) a means for the user to override buffer times, as described hereinbelow, on a per-activity, per-appointment or per-interruption basis.

(9) a means for the user to edit/adjust information on executed appointments, activities and interruptions after the fact (that may be represented in the execution lane to the left of the "Now" line).

(10.1) the ability to calculate and apply an "interruption experience factor" when forecasting the effort distribution of future activities (e.g., by calculating a running average, or other statistically determined quantity, of the proportion of working time spent on past interruptions and adjusting the effort distribution of future activities accordingly).

(10.2) the ability to calculate and apply an "adjustment experience factor" when forecasting the effort distribution of future activities (e.g., by comparing the original effort estimates of past activities to their actual effort as executed, and adjusting the effort distribution of future activities accordingly, for example, accomplished separately for different types or categories of activity).

(10.3) the ability to calculate and apply an "activity dispersion factor" when forecasting the effort distribution of future activities (e.g., by calculating a running average, or other statistically determined quantity, of the ratio of the total work-interval time lying between the start and end of an activity to the effort that was actually spent on the activity and adjusting the effort distribution of future activities accordingly, while compensating for already existing interruptions and appointments to ensure the factor is not over-applied for any specific activity).

(11) a means to detect when the user (or the resource client 130) has been offline so that, upon going online again, the program may determine whether any of the time spent offline occurred during working hours and, if so, may ask the user to whether this time should be represented by an interruption (which may then be automatically inserted) or instead whether the work that had been scheduled for execution during the offline period has been performed (in which case the corresponding portion of the pertinent activity bars may enter the execution lane).

(12) a voice-command interface for the chart (mainly for use with mobile devices, including smartwatches), so that interruptions and changes to activities may be easily made even when a user is not at his/her desktop computer or laptop.

(13) the ability to automatically insert periodic pauses into planned activities, in order to support time-boxing techniques of time management.

(14) the ability to interlink charts (i.e., a means for the user to define the deadline or other time limits pertaining to an activity by specifying the activity's temporal relationship to the start or end of activities or appointments on other users' charts, plus a positive or negative time offset, such as a rule stating that an activity must "finish at the latest by two days before Dave's Appointment ABC begins," or must "begin at the latest by 4 hours before Bob's Activity XYZ ends").

(15) a means for team leads or other authorized users to view multiple users' charts and to assign activities to those users, which then may appear on their charts.

(16) a means for project planners to assign portions of planned tasks in a Gantt-style project plan to individual users such that corresponding activities may appear in their charts; and for project planners to monitor the users' execution of those activities and to be automatically informed when those activities threaten to violate (or actually violate) the time limits that may be represented in the project-level Gantt-style chart.

(17) a "hypothetical" mode for the chart in which the user may adjust activities, priorities, and appointments in order to test the effects of various scheduling decisions before finally committing to a set of decisions.

(18) the ability to tag activities as belonging to a particular project.

(19) the ability to display activity bars in different colors corresponding to different types or categories of activities, or to different projects.

(20) the ability to filter which activities may be displayed in the chart based on project, type, or category of activity.

(21) the ability to have the chart automatically scroll itself horizontally (along the time axis) as the user scrolls the To Do list up and down, so that the corresponding activity bars of displayed To Do items may remain visible on the screen.

(22) the ability to display various statistics on activities, such as the extent to which past activities (or certain categories or types of activities) may have been interrupted or underestimated or overestimated.

(23) the ability to immediately scroll horizontally to the activity bar of any given To Do item with a single click or command.

(24) the ability to specify a minimum segment duration which the system may respect when scheduling activities (e.g. if a minimum activity segment duration of 15 minutes is specified, the system may prevent scheduling of any portion of an activity between two consecutive appointments that are only 10 minutes apart).

(25) the ability to automatically generate a series of activities based on "task templates" representing typical sequences of activities a user may perform.

(26) the ability to automatically generate an activity by dragging and dropping an email or file onto the chart.

(27) the ability to specify the minimum duration an interruption may have before causing the parameterized post-interruption buffer time to be inserted after the interruption upon resuming the interrupted activity.

(28) the ability to split or merge activities.

(29) the ability to advance the "Now" line manually rather than automatically (e.g., by manually entering the time spent on one or more specified activities since the last time the "Now" line was advanced).

(30) the ability to change the vertical spatial distribution of the To Do list items (and their corresponding activity bars) and, for example and without limitation, to group these items by date such that items scheduled to begin or end on the same date are distinguished by closer vertical spacing within each date group, coloration on the screen, a header in the list, or similar means.

(31) the ability to define work-interval generation rules so that they may automatically generate more than one work interval per weekday.

(32) the ability to display a symbol or number at work-interval divisions, and/or vary the thickness of work-interval division lines, so as to indicate how much non-working time lies between any two adjacent work intervals (and thus might potentially be included in the chart's work intervals).

(33) the ability to display one or more charts such that non-working time (i.e. time between work intervals) is also displayed along the timeline, for example, to allow a team lead to compare multiple users' charts more easily.

(34) the ability to add file attachments, notes, conversation threads and similar items to individual activities, appointments and interruptions.

(35) the ability to store a static "snapshot" (copy) of a chart or of part of a chart for later reference and comparison.

(36) the ability to import and synchronize appointments into the chart automatically from and with external calendar programs.

(37) the ability to define an activity time limit by reference to the start or end of a work interval.

(38) the ability to "jump to" (horizontally scroll to) a specific work interval in the timeline by selecting a date from a calendar control, for example, so that the chart scrolls to the first work interval preceding or following the selected date.

The elements and behaviors described in the following subsections do not each separately represent a sufficient solution for the problems listed above, but instead achieve this purpose when combined as described. Exemplary combinations of interface elements and behaviors are described hereinbelow.

In one embodiment of the invention, a specially-modified bar chart (similar in appearance to a Gantt chart), referred to herein as a Personal Adaptive Schedule chart 200, may be organized around flexible, adjustable windows of effort rather than a regular calendrical grid (see FIG. 2). For example, and without limitation, elements of the Personal Adaptive Schedule chart 200 may include a To Do list containing scheduled activities 205, scheduled effort for each activity 210, remaining effort for the currently executing activity 215, To Do list containing unscheduled activities (collapsible or hideable) 220, timeline showing dates and times of work intervals 225, separator between work intervals 230, the "Now line" (time cursor) 235, activity bars 240, buffer time between activities 245, buffer time on either side of a work-interval boundary 250, lines showing dependencies of activities on each other 255, the execution lane 260, executed activities (and any other executed events) in the execution lane to the left (i.e., temporally-precedent) of the Now line 265, indicator of the currently executing event 270, a work interval 275, and time-zone indicator for a work interval 280.

In one embodiment, as illustrated in FIG. 2, a To Do list is shown at the left (205), and the task bars (here called "activity bars") corresponding to the To Do list items are shown at the right (240) in the timeline portion of the chart (225). A person of ordinary skill in the art will immediately recognize that there are many other theoretically possible combinations of the To Do list location, timeline location and direction in which the timeline proceeds chronologically, such as locating the To Do list on the right and the timeline on the left, running from left to right or right to left chronologically. Because certain Gantt-style charts known in the art are arranged with the To Do list on the left and the timeline on the right, with the timeline proceeding chronologically from left to right, a similar, but not identical, layout is exemplified in FIG. 2.

Continuing to refer to FIG. 2, the dates and times on the chart's 200 timeline may extend across successive work intervals (275), which may be continuous time intervals in which effort potentially may be actively focused on activities. Non-work time may be excluded from the timeline, as illustrated. To set up a series of work intervals on the timeline, the user may be able to define which days of the week are working days, may be able to define standard working times for these (e.g. 8:00 a.m. to 6:00 p.m.), and may be able to specify the time zone in which the defined working times may occur. It may be possible to create multiple such work-week definitions for successive time ranges. The work intervals may then be generated for each of their respective time ranges, in accordance with the definitions for those ranges. The user may also be able to freely adjust the start and end times of generated work intervals, except that the system 100 may prevent any two work intervals from overlapping chronologically (based on the work intervals' UTC time equivalents), and the user may be able to freely add or remove individual work intervals, thus advantageously providing complete flexibility in configuring when work may occur in the schedule. Each individual work interval may be associated with a specific time zone (280). A vertical line (230) may divide work intervals on the chart 200. The user may be able to scale the chart 200 horizontally so that s/he may see several work intervals at once without having to scroll horizontally. Because the chart 200 may omit non-work time, it may be able to display much more schedule-relevant information at higher time-resolutions than may be possible with a standard Gantt.

Figure 10:
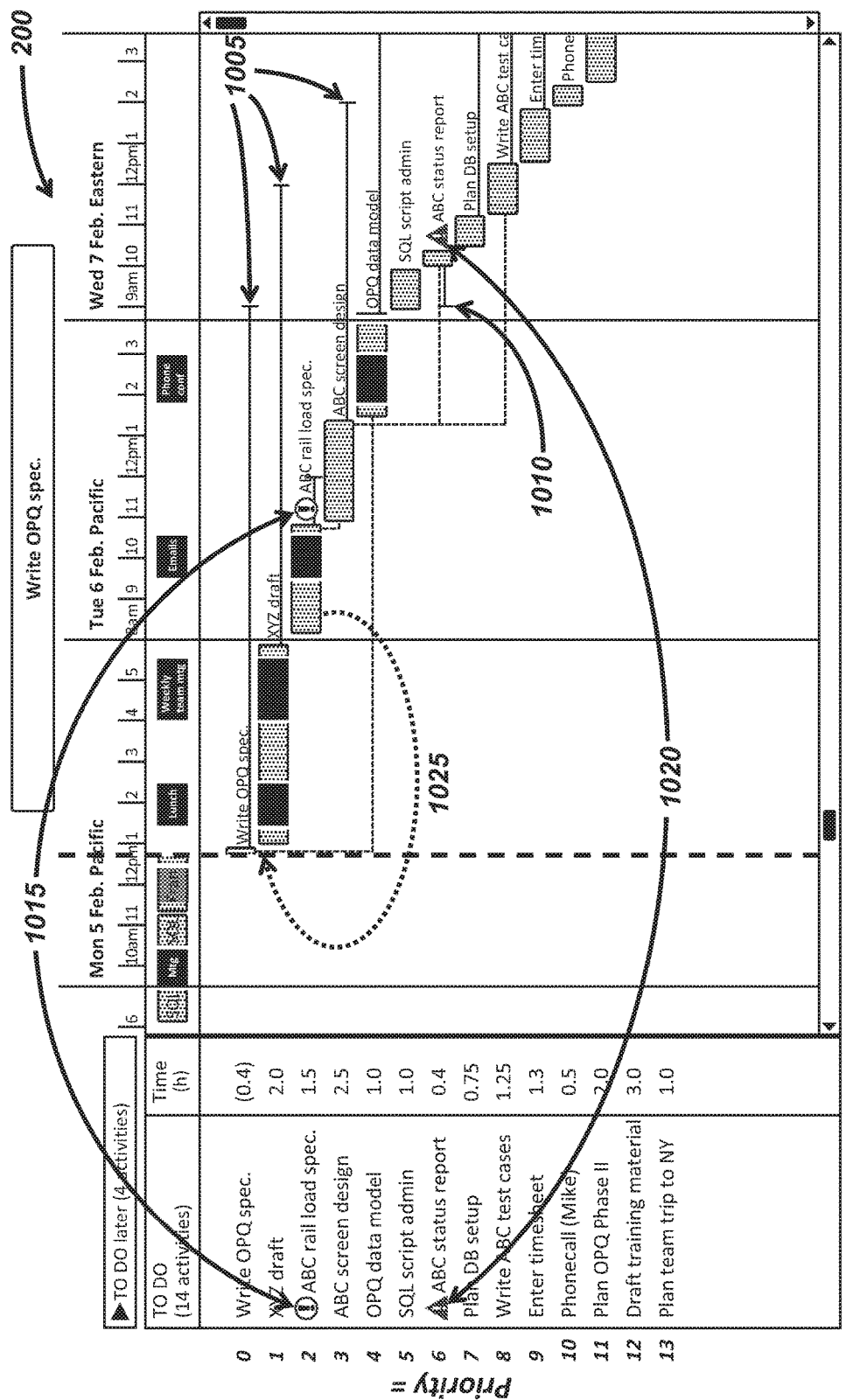

The activity bars on the chart 200 may represent when the person/worker should actively focus effort on each activity in the To Do list. Activity bars may be strictly serialized (i.e. occurring one after the other, and not simultaneously or overlapping) and cascading (lower-priority activities in the To Do list may be arranged later in time in the chart 200). The user may be able to insert or remove activities anywhere in the To Do list at the left. When activities on the To Do list are added or reordered, the corresponding activity bars may be automatically adjusted so that they remain serialized and cascaded in the corresponding order. Activity bars in this application may appear in strict chronological sequence (i.e., one after another from left to right), because the To Do list may pertain to only one person. The user may be able to drag and drop To Do list items, or their corresponding activity bars, higher or lower to change the left-to-right order in which they appear on the chart 200. Activities that will occur earlier may appear higher in the To Do list and further left on the chart 200. Activities that will occur later may appear lower in the To Do list and further right on the chart 200. Each horizontal lane in the chart 200 may correspond to a different priority value. An activity that is currently executing or is about to start executing and thus is in the top lane of the chart may have priority 0 (for example, and without limitation, "Priority=" labels on the left side, as illustrated in FIG. 10). The top lane may thus be termed Lane 0. The activity in the next lane of the chart may have priority 1 and thus this lane may be termed Lane 1, and so on.

As the user enters (or edits) To Do list items, s/he also may be able to enter an estimated effort for completing each item (210). Because the timeline scale may be based on work intervals rather than a calendar-normalized grid, the location and length of the activity bars (240) may directly correspond to the times when the user may be expected to focus effort on the given activity. A longer bar segment may represent more effort than a shorter bar segment. After entering an estimated effort, the user may be able to adjust it later if desired, for example, and without limitation, by editing the value in the To Do list or by clicking on one end of the corresponding activity bar and dragging that end to make it shorter or longer. Immediately after editing the effort, the position of the subsequent activity bars may be automatically adjusted so that those activities may be accomplished as soon as possible.

A vertical line termed the "Now line" (235) on the chart 200 may mark the current time and may continuously proceed to the right (advancing periodically, for example every several minutes). As it proceeds through the activity bar for the activity currently being performed—which may show as the top item on the To Do-list and may also be indicated prominently on the chart (e.g. as shown at 270)—the portion of the activity already performed may automatically be moved into the "execution lane" (260), which may be presented as a horizontal strip running across the top of the chart 200. Thus, the activity bars to the left of the Now line in the execution lane (265) may represent work that has actually been performed. As the current activity enters the execution lane, the amount of effort remaining for completing it may also be shown (215). When the last part of an activity has finished executing, it may be removed from the top lane, and all subsequent scheduled activities may be promoted (i.e., moved up) by one lane.

If an activity has already begun executing and its unexecuted portion is then reprioritized to a lower lane, the system 100 may reschedule the activity's not-yet-executed portion to a time appropriate to the activity's new priority in the To Do list, and the activity that was in Lane 1 may be promoted to Lane 0 so that it may begin executing. The executed portions of the activity that was originally in Lane 0 may remain executed, however.

Besides the scheduled To Do items (205), the system 100 also may allow the user to enter To Do items that may be done at some time in the future, but may not yet be scheduled (220). For example, and without limitation, this list of unscheduled activities may be termed the "work queue." It may be possible to turn an unscheduled activity into a scheduled one whenever desired, for example, and without limitation, by dragging it into any location of the active To Do list, so that it may appear on the schedule.

The user may be able to define dependencies between activities. It may not be possible to schedule an activity before another activity on which it is dependent. Dependencies may be shown by connecting them on the chart 200 with a line (255). As shown in FIG. 2, for example, and without limitation, the activities "ABC status report" and "Write ABC test cases" may both only be done after "ABC screen design" has been done, which itself is dependent on ABC rail load spec. So it may be possible, for example, and without limitation, to move "ABC status report" so that it may be done before "SQL script admin" and "OPQ data model." However, it may not be possible to move it back any earlier than that, unless "ABC rail load spec" and "ABC screen design" are also moved back earlier (above "XYZ draft" in the To Do list). Such dependencies may represent a special kind of time limit, which are described in more detail hereinbelow.

The user may be able to define a post-activity "buffer time" interval. Buffer time may be defined as the time needed for "task switching" (i.e., assembling one's thoughts and preparing to work on something new after a previous activity has been completed). An example of buffer times between activities is illustrated at 245. Furthermore, the user may be able to define buffer time intervals at the start and end of work intervals. For example, and without limitation, an effect of the work-interval-boundary buffers on scheduling of activities is illustrated at 250. Buffer times immediately adjacent to an activity may not be considered part of that activity's effort when scheduling the activity.

In one embodiment of the invention, a Personal Adaptive Schedule chart 200 may be characterized by elements representing appointments and appointment transects. As illustrated in FIG. 3, for example, and without limitation, a user may be able to elect to schedule appointments having a fixed start time and end time (305). Appointments may be displayed across the chart 200 in the execution lane, so that the user may be able to view them together with planned activities in the same unified context. Examples of appointments and the effects they may have on scheduled activities as shown in FIG. 3 include an executed appointment (to the left of the Now line) and two future appointments (to the right, i.e. temporally-subsequent, of the Now line) 305, an appointment transect 310 (wherein, in the example shown in FIG. 3, the activity bar for "ABC rail load spec." is split because it cuts across the time span occupied by the appointment "Weekly team mtg.," as well as buffer times preceding and following the appointment, a work-interval boundary, and work-interval-boundary buffers, and thus extends over approximately 3.4 hours instead of 1.5 hours), buffer times preceding and following an appointment 315, and/or a minimum activity segment duration 320 (note, as illustrated, no portion of the "SQL script admin" activity is scheduled here, because there is not enough time available in this gap to meet the minimum activity segment duration setting).

The portion of an activity bar that cuts across the time that may be planned for an appointment may be called an appointment transect (310). Activities that transect an appointment may take at least that much longer to complete or may be displaced in their entirety to a later time, because effort expended on the appointment may displace the effort that would have been spent on the activity.

Similar to the buffer time between two activities, the buffer time before and after an appointment transect may take account of the time needed to prepare for attending an appointment and the time needed to resume productive work on the activity that was temporarily paused due to the appointment. The user may be able to define a standard pre- and post-transect buffer time interval and may be able to override this for individual appointments.

Because the length of a given appointment transect may closely correspond to the amount of activity effort that it displaces on the chart 200, the user may intuitively recognize the potential effect that rescheduling or removing the appointment might have on the transecting activity and subsequent activities. This feature may make it easier for the user to recognize how the schedule could be adjusted in order to relieve time pressure.

Sometimes the amount of working time available between the end of one activity and the first appointment following that activity, or between two appointments, may be too small to make it worthwhile for the user to perform any work at all during that interval. The user may therefore be able to define a standard minimum duration that may be scheduled on the chart for any individual, continuous segment of an activity, and may be able to override this for individual activities. For example, and without limitation, if the user has set a standard minimum duration of ten minutes for individual activity segments, the application might not schedule any future activity segments having a duration less than ten minutes (except for the final segment of an activity). FIG. 3 illustrates an example of the effect (320) this setting may have on the scheduling of activities.

If the user changes the sequence of a To Do item, then its activity bar automatically may adjust to any appointments (and applicable buffer times) appearing at its new location in the chart 200, so that the estimated amount of effort for the activity may be preserved and the minimum allowed duration of individual activity segments may be respected. For example, and without limitation, on FIG. 3, if "ABC rail load spec." and "XYZ draft" were switched, "ABC rail load spec." might only take 2.5 hours to complete (1.5 hours effort plus 1 hour lunch break). However, "XYZ draft" might take 3.5 hours to complete (i.e., 2.0 hours effort plus 1.5 hour weekly meeting).

If an activity is inserted into or deleted from the list, or its estimated effort is changed, all subsequent activities may be automatically rescheduled, taking into account appointment times, buffer times, and the minimum allowed duration of individual activity segments. Likewise, if a future appointment is inserted into or deleted from the chart 200, an activity that transects the appointment, and all subsequent activities, may be automatically rescheduled, taking into account appointment times and buffer times. Appointments may overlap on the chart 200. Overlapping appointments and their respective buffer overrides (if present) may each be respected separately when the activities on the chart are rescheduled.

Interruptions such as unexpected phone calls, spontaneous conversations, and other unplanned distractions are a further factor influencing the performance of work activities. In one embodiment of the invention, a PASS 100 may allow users to put the system 100 into "interruption mode" when an interruption starts (or after it starts). Doing so may cause the unexecuted portion of any activities that are currently executing, as well as any future activities, to be rescheduled farther into the future until the interruption ends. Users may also be able to record an interruption after it has finished. Some exemplary combinations of interruption-entry parameters which may affect system 100 behavior regarding interruptions are illustrated in FIG. 4.

Initiating an interruption may involve manipulating the following chart 200 elements: the user may be able to indicate when the interruption started 405, and may be able to optionally record the cause of the interruption 410. If the interruption started in the past (last two choices in area 405 of FIG. 4), the user may be able to indicate 415 whether it is still continuing or instead has already ended. The example given in FIG. 4 assumes the interruption has just begun (first choice in area 405), and therefore, the controls in area 415 may be disabled. If the interruption started in the past, then the user may be able to choose 420 whether the portion of past activity segments that lie within the time span of the interruption may be automatically redistributed to the available time range(s) immediately following the interruption.

Effects which each possible combination of parameters may have are detailed in the table at FIGS. 5A-5D. For Variants 1 to 5 in the table, the chart 200 may enter interruption mode, which proceeds as described in FIGS. 6 and 7.

Figure 6:
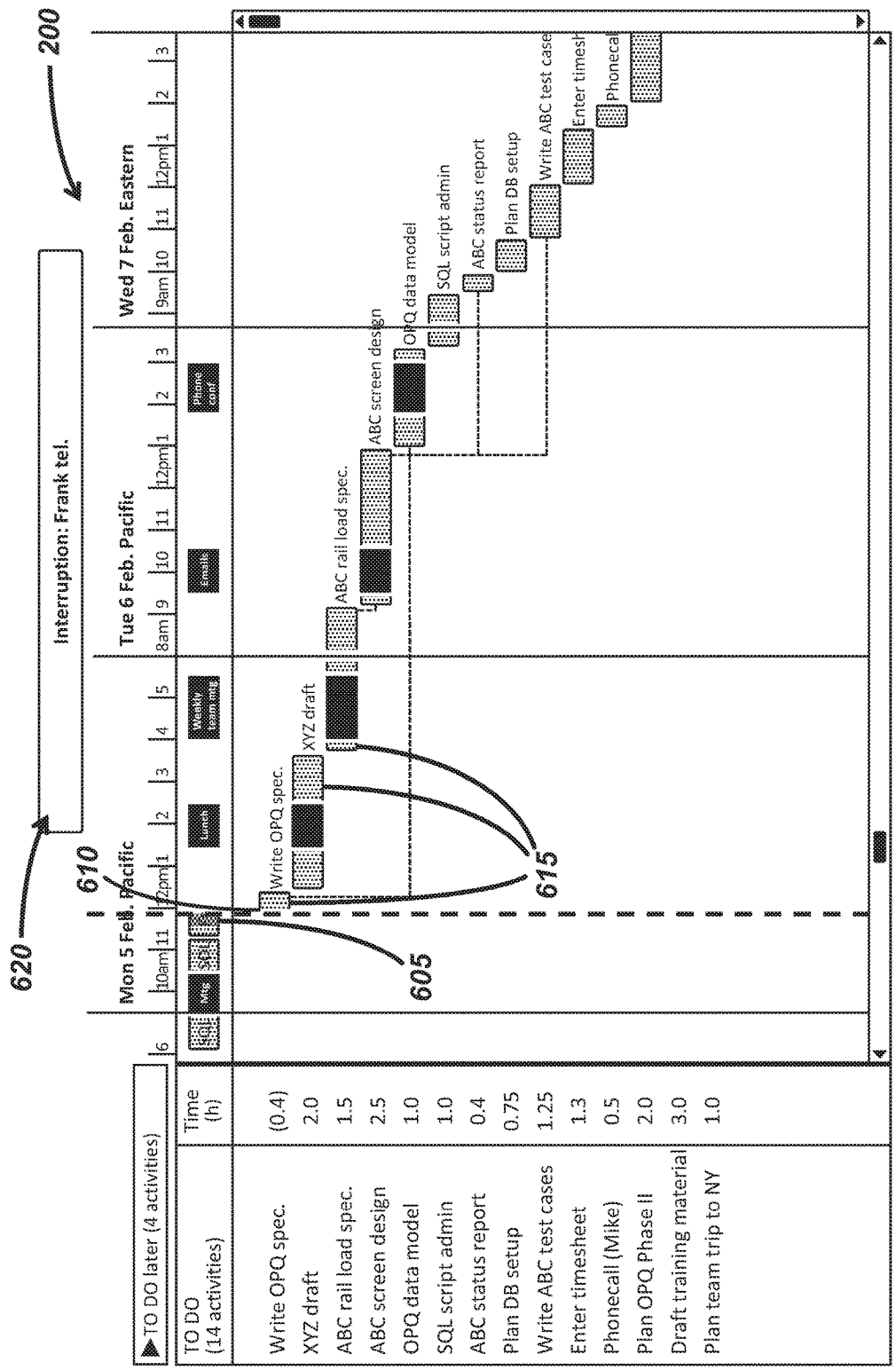

Referring now to FIG. 6, for example, and without limitation, and proceeding from the interruption initiated as described above for FIG. 4, a bar 605 similar to an activity bar may be inserted in the execution lane, extending from the point when the interruption started to the Now line; as the Now line advances, the interruption's bar 605 may be extended so that it remains adjacent to the Now line, A buffer time 610 corresponding to the global post-interruption buffer setting (or the interruption's individual override of that setting, if the user has entered one) may be inserted between the current ending point of the interruption bar and the first segment of the activity bar immediately following the interruption, if any. As the Now line advances, all future activity bars (including any unexecuted portion of an interrupted activity) may be displaced to a later point in the schedule, for example, and without limitation, as shown for the bars at 615 in FIG. 6. During this rescheduling process, the system 100 may ensure that all the constraints regarding appointment transects, buffer times, minimum activity segment duration, and priority are respected. The system 100 may also display an indicator 620 of the currently executing interruption.

Figure 7:
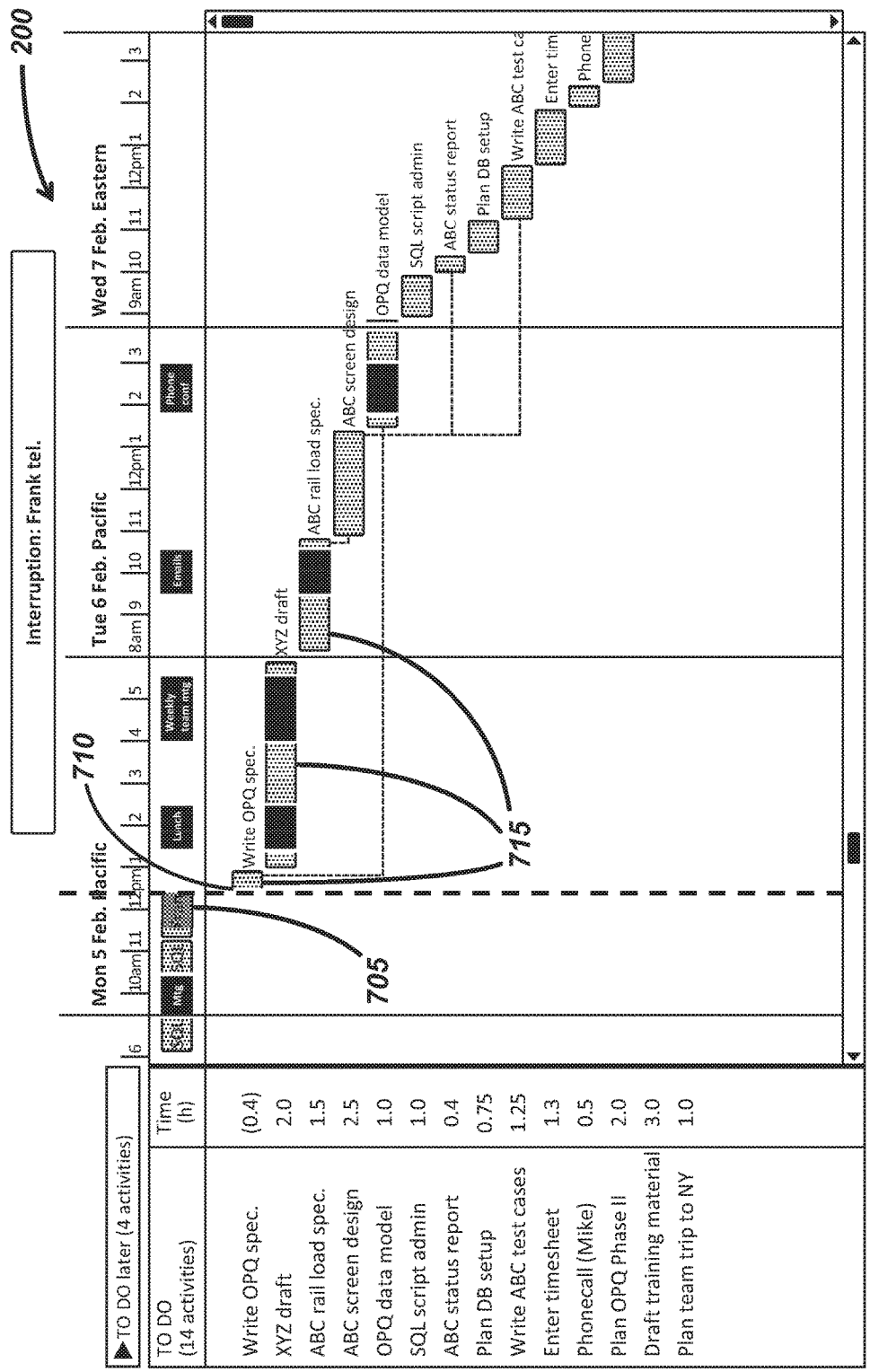

Referring now to FIG. 7, behavior of the system 100 as the interruption proceeds further is described in more detail. For example, and without limitation, as the Now line advances, the interruption bar may be extended 705, the post-interruption buffer time may be displaced 710 so that it may remain adjacent to the Now line, and subsequent activity bars may be displaced 715 farther into the future. As the activity bars advance, they may encounter and transect additional appointments (as shown for the "XYZ draft" activity) or may stop transecting appointments (as shown for the "ABC screen design" activity).

For example, and without limitation, it may be possible for the user to parameterize a standard post-interruption buffer time (e.g. 10 minutes) to allow time for gathering his/her thoughts when resuming a complex activity. If such a duration is entered in the user's settings, all activity segments subsequent to the interruption may automatically be displaced rightward (i.e., later in time) as the interruption proceeds, as shown in 610, 710. The system 100 may permit this buffer duration to be overridden for individual interruptions if desired.

Figure 8:
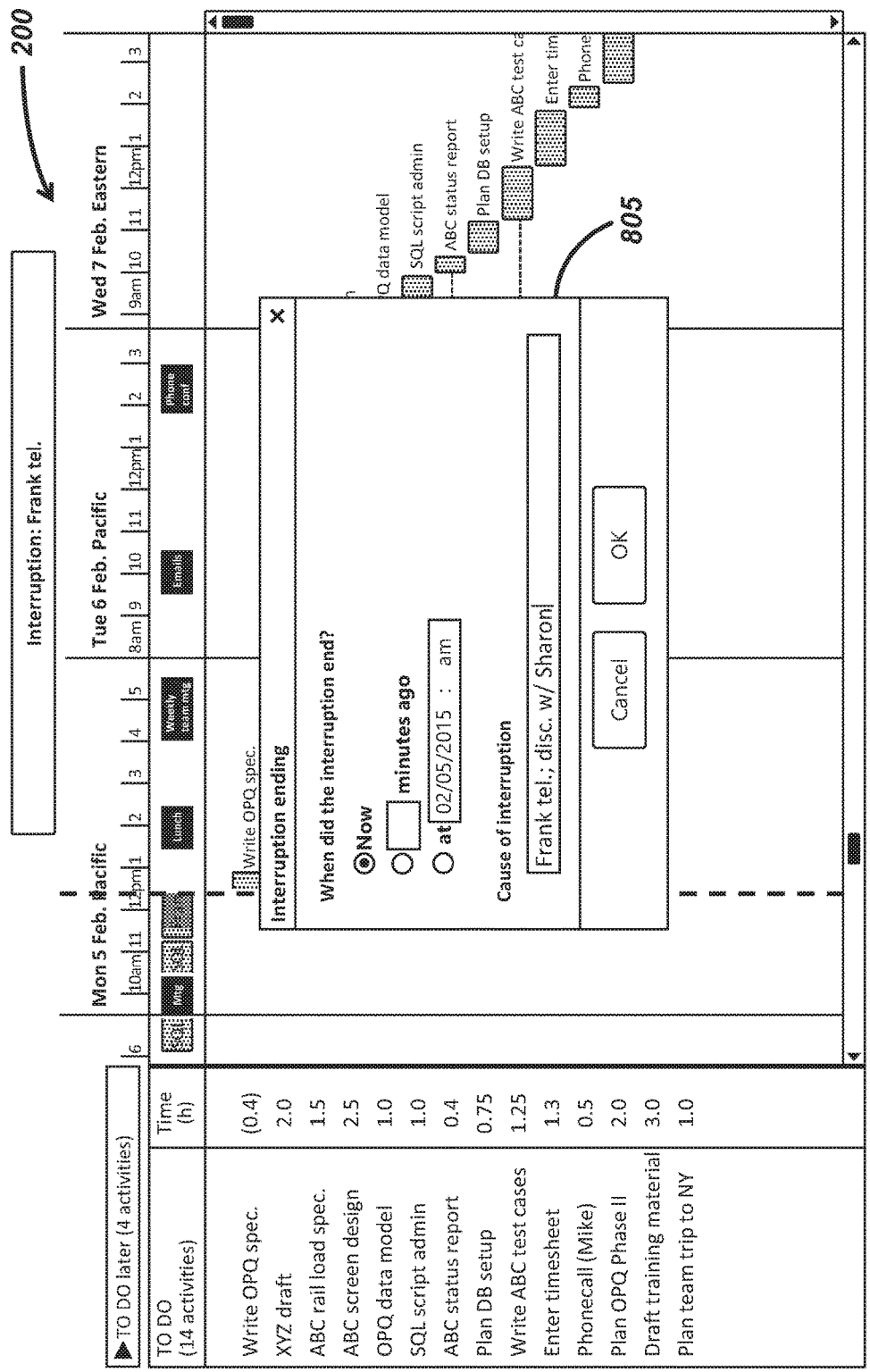

Referring now to FIG. 8, concluding interruption mode is now described in detail. For example, and without limitation, the user may be able to indicate 805 when the interruption is finished and may be able to optionally edit the cause of the interruption. After interruption mode has ended, unexecuted activity segments may no longer be displaced further into the future, but instead may resume feeding into the execution lane as the Now line advances, as shown in FIG. 9.

Figure 9:
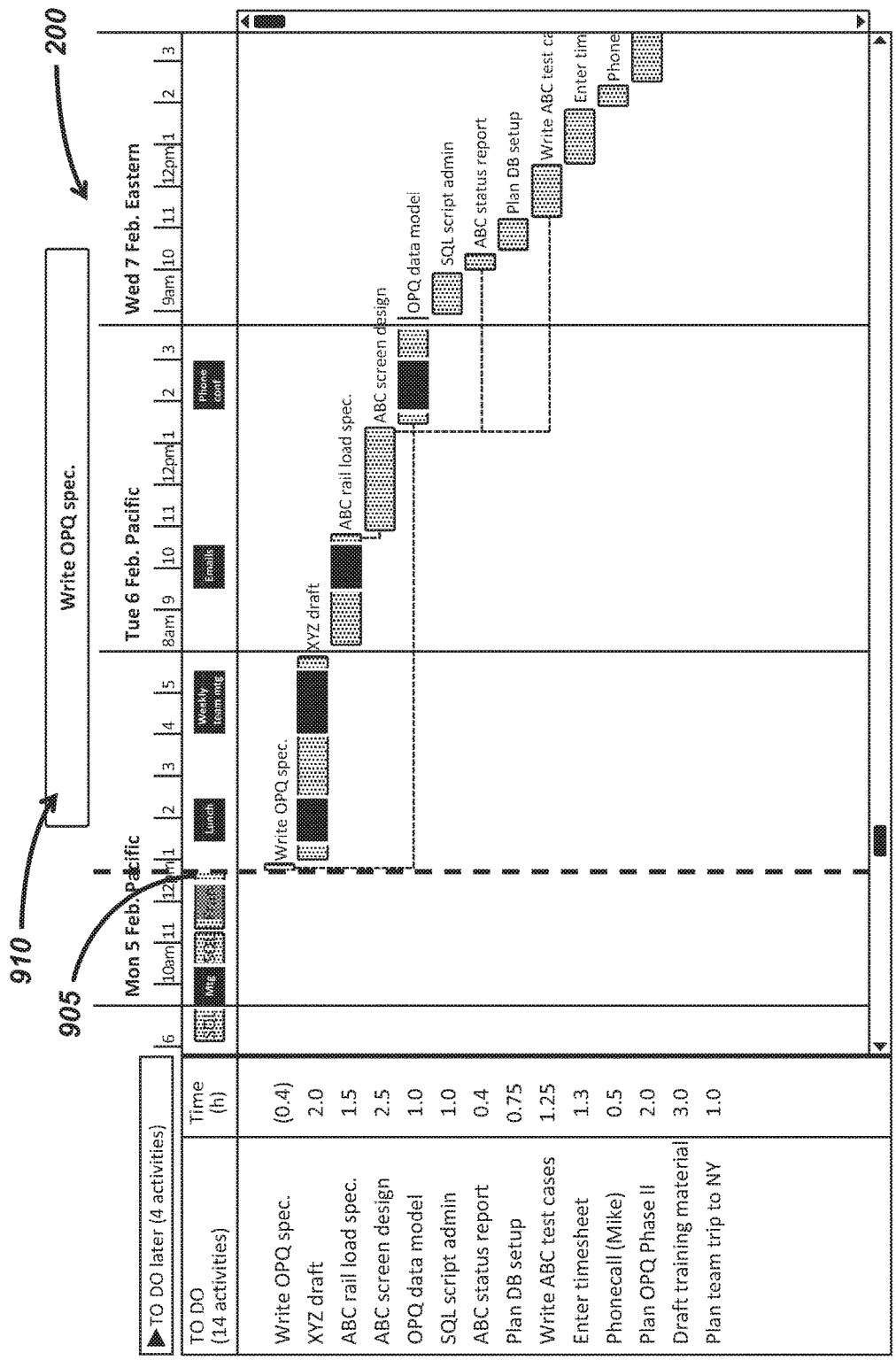

Normal system 100 operation, as described in more detail above, and as illustrated in FIG. 9, may resume after an interruption has concluded. For example, and without limitation, the segments of any activity that had been interrupted may no longer be displaced 905 further into the future but instead may resume feeding into the execution lane as the Now line proceeds. The system 100 may display an indicator 910 of the currently executing (resumed) activity.

The "Reschedule interrupted work" option that may be selected in some of the combinations shown in the table at FIGS. 5A-5D may reduce the need for manual adjustments to the schedule in cases where the user's work has recently been interrupted but where the interruption could not be immediately entered into the schedule.

Other variants in the table at FIGS. 5A-5D may result in the insertion of an interruption bar into the execution lane sometime after the interruption has finished, which the user may wish to do in order to document that an interruption occurred in the past. Doing so might not cause the segments of any activities that have already been fed into the execution lane to be displaced on the timeline. However, the user may be able to adjust (i.e., shorten, lengthen, delete) these segments manually, if desired. The scheduling constraints which apply to future activity segments may not apply to already executed activity segments, which the user may be able to manually move to any desired time point within past work intervals or the past portion of the current work interval, as long as the segments themselves also fall entirely within the past at their new location.

By automatically taking account of the interactions between variable work intervals in specific time zones, the expected effort for completing activities, the relative priority (chronological sequence) of those activities, the appointments transected by the activities, interruptions, and the buffer times needed for switching from one kind of work to another, the system 100 may provide a simple means of realistically scheduling the execution of future activities and, therefore, may advantageously support more realistic estimates of when certain activities will be completed.

Regarding time limits, time-limit handles and time-limit warnings, the system 100 may allow a user to define different kinds of time limits for each activity that has not yet finished executing. Time limits may be used as bases for warning the user when important deadlines or other constraints may be approaching and for providing guidance to the user as to how activities may be reprioritized or the chart 200 may be otherwise adjusted in order to relieve time pressure within the schedule.

A time limit may be either explicit (i.e., refers to a specific date and time) or relative (i.e., refers to the start or end of another activity on the same or on a different chart, or to the start or end of an appointment on the same or on a different chart). For example, and without limitation, the different kinds of time limit which the user may be able to set are detailed hereinafter in the description of the ACTYTIMELIMIT.Rule attribute found in the Entity Relationship Diagram description at Appendix I.

An example of an explicit time limit for an activity is as follows: "Finish before 6 Feb. 2015 3:00 p.m." (this kind of time limit—i.e., "Finish before <specified date/time>"—is what is commonly thought of as a deadline).

An example of a relative time limit for an activity is as follows: "Start at least 2 hours before Appointment JKL begins." For any time limit it may be possible to specify a positive or negative offset relative to the referenced time point, where a negative offset represents a point in time before the referenced time and a positive offset represents a point in time after the referenced time. The relative time limit described above is an example of a time limit defined with a negative offset ("2 hours before") relative to the referenced time (start of Appointment JKL).

Inter-activity dependencies, as described previously, may be stored on the database as time limits of type SAEY (start after the end of another activity; see also Entity Relationship Diagram description of the ACTYTIMELIMIT.Rule attribute) which may refer to a target activity on the same chart. In contrast to most time limits, the system 100 may enforce this type of time limit by preventing the user from reprioritizing an activity such that it would be scheduled to occur before the target activity if the latter lies on the same chart.

The user may be able to choose to display time-limit elements on the chart 200, for example, and without limitation, as shown in FIG. 10. More specifically, the user may be able to choose to display time-limit handles 1005 on the chart 200. A time-limit handle 1005 may be represented as a line extending from the activity bar to the limit's time-point on the schedule. A user may be able to choose to show deadlines (i.e., the time by which an activity must be finished), but also may be able to choose to show other types of time limits. The example illustrated in FIG. 10 assumes deadlines are being shown. It may be possible for time-limit handles to extend to a time-point 1010 lying before an activity bar. As illustrated in FIG. 10, the "ABC status report" activity is scheduled such that it violates its deadline of 7 February at 9:00 a.m. Time-limit threat warnings 1015 and time-limit violation warnings 1020 may be displayed using a different icon and/or color (or other means of signaling). For example, and without limitation, to relieve the time pressure on the "ABC rail load spec." activity, it may be scheduled to an earlier time 1025 by assigning it an earlier priority than that of "XYZ draft," so that the priority of "ABC rail load spec." may become 1 and the priority of "XYZ draft" may become 2.

More specifically, a time-limit handle 1005 may be represented as a line (or other graphical object) extending from the start or end of an activity bar to the limit's time-point on the schedule. Like all horizontal extents on the chart 200, the length of a time-limit handle 1005 may represent an amount of time potentially available for expending effort. Time-limit handles 1005 may be displayed for unexecuted activity segments. Therefore, if an activity has a time-limit of one of the "start before" types specified for it, and if the user has chosen to display handles for that type of time limit, the time-limit handle may extend from the start of the activity bar and thus may disappear when the activity begins executing. By contrast, if an activity has a time-limit of one of the "finish before" types specified for it, and if the user has chosen to display handles for that type of time limit, the time-limit handle 1005 may extend from the end of the activity bar and thus may disappear when the activity finishes executing.

Time-limit handles 1005 may advantageously aid the user in rescheduling planned activities because they may show the exact time pressure operating on each activity (i.e. how much working time separates the activity from its time limit) and may give the user a clear picture of where and how the schedule can be adjusted in order to avoid time-limit overruns as early as possible. The user may be able to then lengthen or add individual work intervals, delete unnecessary appointments, move appointments, reprioritize activities, renegotiate deadlines or delete unnecessary activities in order to ensure the necessary work will get done in time.

Whenever an action occurs in the chart that may cause the schedule to be updated on the display, the system 100 may check the time-limit rules for all activities that have not yet finished executing. If an activity is scheduled such that it may threaten to violate one of its time limits (for example, and without limitation, because it is too close to its completion deadline), the system 100 may signal a time-limit threat warning to the user if the user has chosen to display such warnings. If an activity is scheduled such that it violates (e.g., crosses over) one of its time limits, the system 100 may signal a time-limit violation warning to the user. For example, and without limitation, this signaling may be done by displaying an icon next to an activity bar and/or the activity's To Do list item (see 1015, 1020 at FIG. 10), drawing the activity bar and/or To Do list text using a specific color to denote a warning, and/or drawing the activity bar and/or To Do list text so that they blink.

What constitutes being "too close" to a deadline or other time limit, such that a time-limit threat condition exists, may be determined in different ways. For example, and without limitation, the system 100 may consider the "too close" condition for limits to be true when the available working time between the start or end of the activity (depending on the type of limit) and the limit is less than twice the remaining effort for the activity. The system 100 may also allow the user to define other means of recognizing the "too close" condition, such as when the time span between the start or end of an activity is less than a certain constant number of minutes. One of ordinary skill in the art will immediately recognize various approaches for designing and implementing such behaviors.

Figure 11:
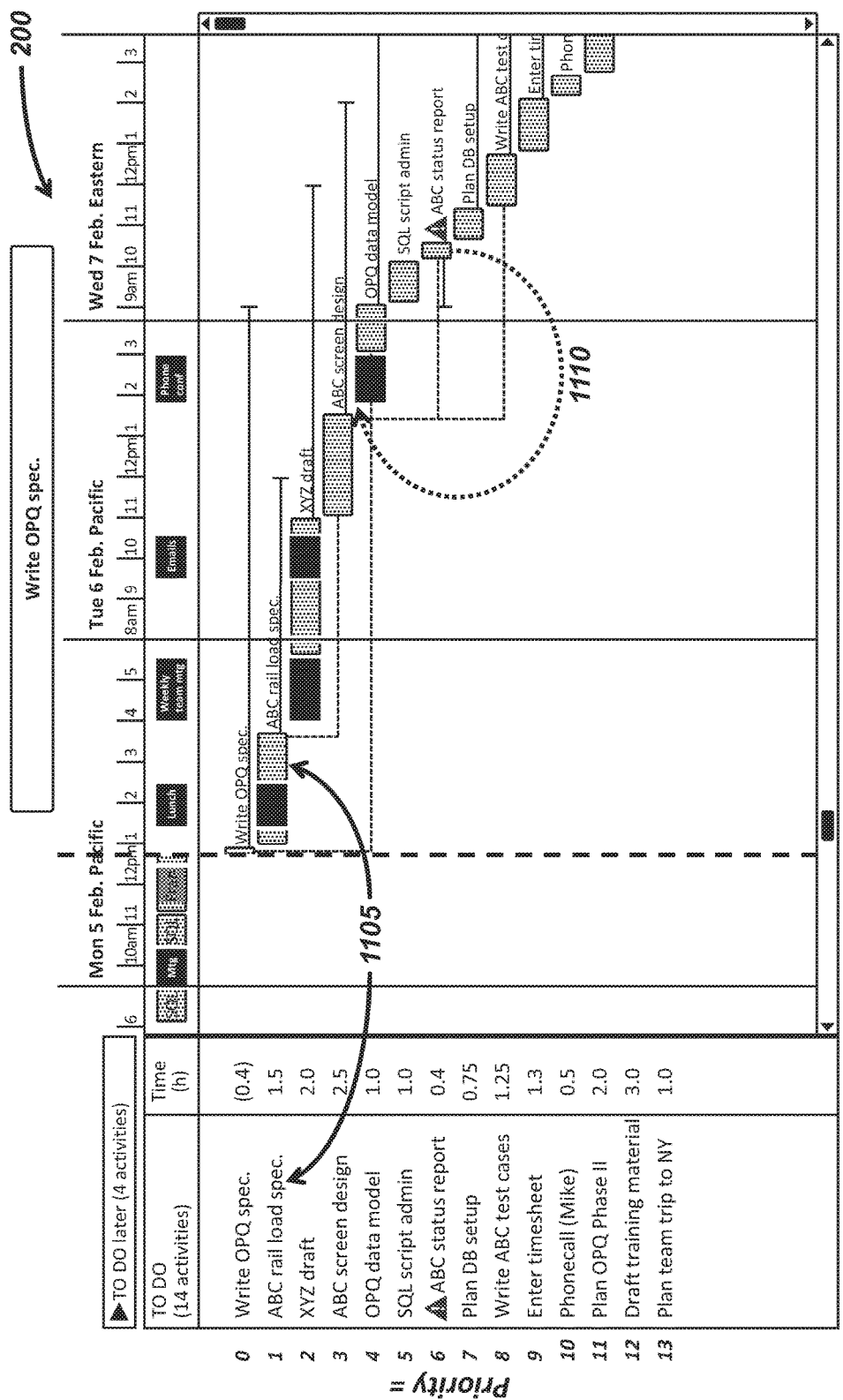

Time-limit handles and warnings, as described above, may give guidance to the user as to what changes may potentially be made to the schedule in order to reduce the likelihood that a time limit will be overrun. Reprioritizing activities is one means of achieving this aim. For example, and without limitation, FIG. 10 shows how the activity "ABC rail load spec." 1025, for which a time-limit threat warning is displayed and which has priority 2, may be reprioritized to priority 1 (and the activity "XYZ draft" may be reprioritized to priority 2) so that it is not scheduled so close to its deadline. From the time-limit handles, it is evident that there is probably sufficient working time available between "XYZ draft" and its deadline to allow this reprioritization without causing a time-limit threat to occur for "XYZ draft." FIG. 11 shows, at 1105, the effect of carrying out this measure: "ABC rail load spec." now has priority 1, "XYZ draft" has priority 2, and the time-limit threat warning for "ABC rail load spec." has disappeared.

Similarly, FIG. 11 at 1110 shows, for example, and without limitation, how the activity "ABC status report," for which a time-limit violation warning is displayed and which has priority 6, may be reprioritized to priority 4 (and the activities "OPQ data model" and "SQL script admin." may be reprioritized to priorities 5 and 6 respectively) so that it does not violate its deadline. Note that its time-limit handle shows that switching its priority with that of "SQL script admin." will not be sufficient to fix the violation. Instead, "ABC status report" may be moved to a point before "OPQ data model." The effect of doing so is shown in FIG. 12.

Figure 12:
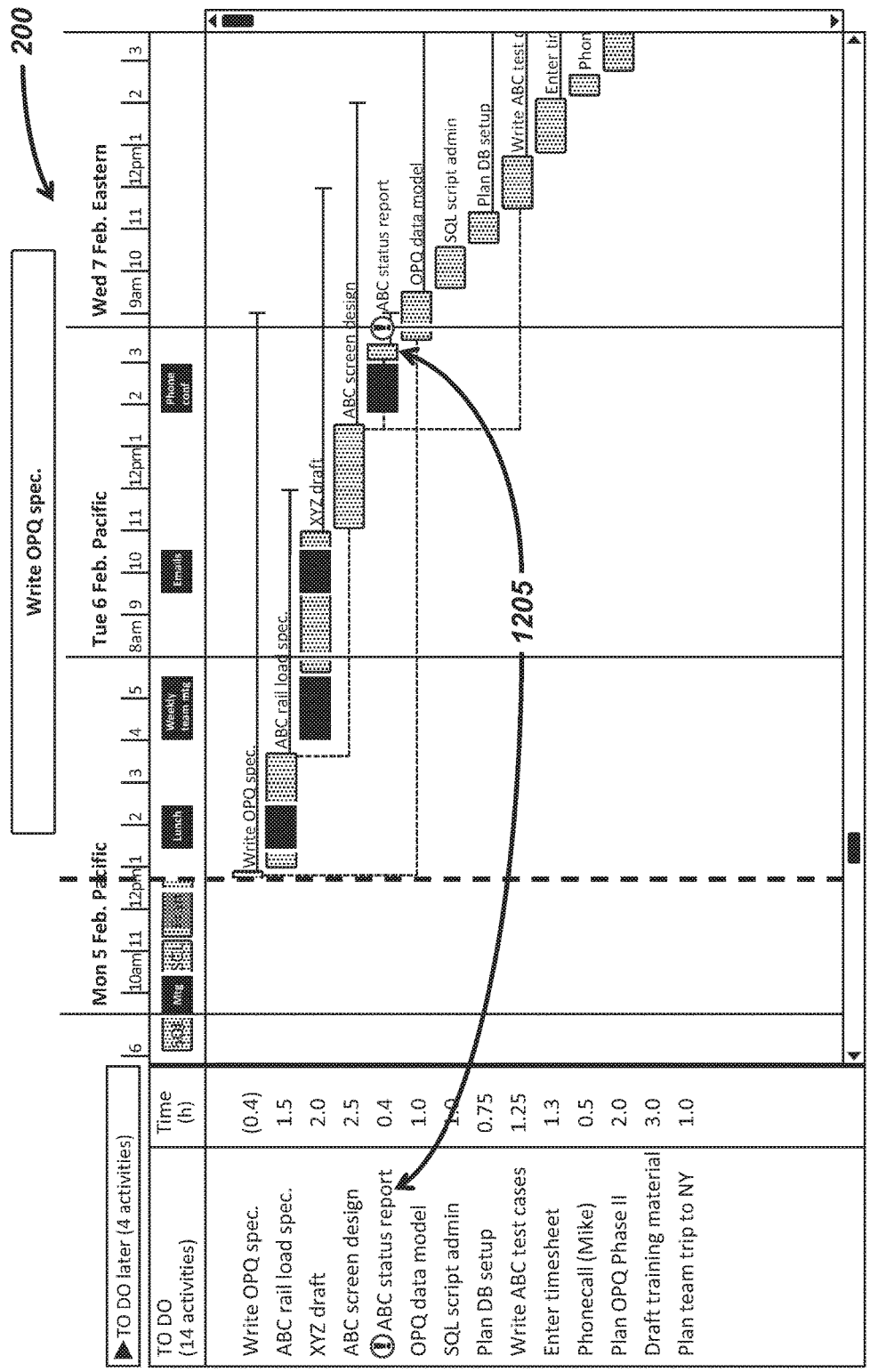

Because "ABC status report" 1205 is dependent on "ABC screen design," it would not be possible to prioritize "ABC status report" any earlier without first reprioritizing "ABC screen design." Another possibility for further reducing the time pressure on the "ABC status report" activity may be to extend the work interval for February 6 shown on FIG. 12 by a few minutes and move the "Emails" appointment to 3:00 p.m., or to move the appointment to the following day, or even to remove it altogether if it is not an essential appointment.

In one embodiment of the present invention, the system 100 may allow a user to manipulate a chart 200 through calculation and application of an Adjustment Experience Factor (AEF) and/or an Interruption Experience Factor (IEF). For example, and without limitation, the AEF may be applied when the effort distribution of future activities is forecast. The system 100 may do so by calculating a running average (or other aggregate) of the actual effort expended on activities relative to the original effort estimated for those activities prior to commencement of their execution and may adjust the effort distribution of future activities accordingly. For example, and without limitation, if the user normally underestimates the amount of effort required in order to complete an activity by 15%, the program may automatically multiply the nominal effort required to complete future activities by 1.15 when calculating those activities' effort distributions. If the user activates the AEF functionality, the program may periodically recalculate the AEF and may apply it when scheduling future activities.

Similarly, the system 100 may optionally allow the user to have an Interruption Experience Factor (IEF) applied when the effort distribution of future activities is forecast. The system 100 may do so by calculating a running average (or other aggregate) of the proportion of working time spent on past interruptions and may adjust the effort distribution of future activities accordingly. For example, and without limitation, if the user has normally spent 15% of his/her recent working time on interruptions, the program may automatically multiply the nominal effort required to complete future activities by 1.15 when calculating those activities' effort distributions. If the user activates the IEF functionality, the program periodically may recalculate the IEF and may apply it when scheduling future activities. The AEF and IEF may be activated separately or together.

Referring now to FIG. 13, and referring again to FIG. 1, an exemplary data model (i.e., scheduling data structure 107 on which the system 100 may execute) is illustrated in the Entity Relationship Diagram (ERD) shown. FIG. 13 employs standard crow's foot notation to indicate modalities and cardinalities, which one of ordinary skill in the art will immediately recognize without further labeling or embellishment. Each entity in the diagram may correspond to a table of data structure 107. Each attribute in the diagram may correspond to a table column. All entities and attributes of the ERD are described in detail at Appendix I. Exemplary datatypes used in the ERD of FIG. 13 are as follows:

NUMBER: an integer or floating-point number, corresponding, for example, and without limitation, to the NUMBER datatype in Oracle® 11g STRING: an array of characters, corresponding, for example, and without limitation, to the V/ARCHAR2 datatype in Oracle® 11g DATETIME: a date and time, corresponding, for example, and without limitation, to the DATE or TIMESTAMP datatype in Oracle® 11g References to entities or tables and to attributes, fields or columns hereinbelow pertain to the ERD of FIG. 13. Table columns are referred to using standard dot notation (for example, CHARTUSER.UserName refers to the UserName column of the CHARTUSER table). It is assumed hereinbelow that the database engine has been installed, that the data definition language (DDL) statements representing the ERD have already been carried out and that the necessary steps allowing a client user to log on to and read from and/or write to the data structures have been taken. Inter-table references are assumed, for example, and without limitation, to be embodied in foreign-key references to the identifying key(s) of the target tables. DDL and data manipulation language (DML) statements given in the examples below are compatible with Oracle® 11g. Coded routines given in the examples below adhere to Oracle® 11 g PL/SQL syntax. Other database systems may require a different syntax to achieve the same effects.

Referring now to FIG. 14, and referring again to FIG. 1, a method aspect of setting up and using the system 100 is now described in detail.

Prior to use of the system 100, an administrator may be able to install data structure objects, core master data, server executables and files, and client executables and files. The administrator also may be able to configure default chart 200 settings. After such installation steps are complete, and from the start at Block 1405, a user may be able to logon (Block 1410) to the system from the client. For example, and without limitation, a main window of the system 100 may provide security-related functionalities such as a dialog restricting which users may log on in order to manipulate the system's master data on the data structure 107.

In the event of a returning user's logon (Block 1415), the system may allow the user to retrieve a chart previously saved in the data structure 107 (Block 1431), and its current schedule and work intervals may be displayed (Block 1435). Alternatively, in the event of a user's first logon (Block 1415), the system 100 may identify a first-time logon condition and, in response, apply functionality to allow a user to configure master data into the data structure 107 in order to begin using a Personal Adaptive Schedule chart 200. For example, and without limitation, at Block 1420 the system 100 may facilitate setting up a user account. Account setup may include prompting the user to enter his/her name and/or the name(s) of any other persons who may be using the system 100. The user account dialog may allow the user to add new users, remove users, and edit user names.

After successful logon using a newly created account, the system 100 may allow the user to create a user chart (Block 1425) and configure chart settings, as described in detail below. At Block 1430, a user may be able to configure and generate initial work intervals for a newly-created chart, and an initial editable chart characterized by an empty schedule and work intervals may be displayed (Block 1435). In the embodiment illustrated in FIG. 14, the method may include one or more standby events (see Blocks 1412, 1432) wherein user action may be sequenced by a clocking function (e.g., delay). Post-delay actions may include, at Block 1437, checking if the user wishes to end processing by the system 100 (Block 1499). Post-delay actions also may include, at Block 1447, checking if the user wishes to use the system 100 to manage a different chart, and perhaps even a new chart (Block 1467). If the user chooses a different chart that may be edited, then the system 100 may retrieve the saved chart (Block 1431) and may display the chart (Block 1435) in anticipation of further editing. If the user opts for a new chart, the system 100 may, as described above, return to the steps of creating (Block 1425) and receiving initial work intervals (Block 1430) for the chart.

Generally speaking, the main window of the system 100 may provide a dialog that may allow the user to create or delete chart objects for each user and to edit the settings for the chart. A chart object may hold the events (e.g., activities, appointments and interruptions) that may have been planned or scheduled for a single user. A user may be able to have one main chart, but the user may also be able to have several other charts for different purposes, such as for trying out different possible variants of a schedule or for managing private activities (e.g., outside of the work environment).

For a selected chart that is not protected as read only (Block 1457), the user of the system 100 may be able to direct the modification of the chart. For example, and without limitation, based on user input at Block 1440, a user may be allowed to add, import, edit and/or remove appointments as updates to the chart 200 (Block 1485). Also for example, and without limitation, based on user input at Block 1445, a user may be allowed to add, edit, and/or remove activities or their dependencies or time limits as updates to the chart 200 (Block 1480). Also for example, and without limitation, based on user input at Block 1450, a user may be allowed to change an activity's priority as an update to the chart 200 (Block 1475). Also for example, and without limitation, based on user input at Block 1455, a user may be allowed to generate, add, edit, and/or remove work intervals as updates to the chart 200 (Block 1470). Also for example, and without limitation, based on user input at Block 1460, a user may be allowed to enter interruption or frozen mode, and/or to reenter normal mode (Block 1465); a description of these chart modes is given for the CHART.CurrentMode attribute in the Entity Relationship Diagram at Appendix I. If a chart 200 is not configured in frozen mode, the Now line may periodically advance (automatically) and the updated chart then be displayed at Block 1435. Also at Block 1460, a user may be allowed to adjust global chart settings (Block 1465). If at Block 1447 the user chooses a chart that the user is not permitted to edit (e.g., read only per Block 1457), the system 100 may not permit access to the modification functions (Blocks 1485, 1480, 1475, 1470, 1465) for that chart.

For each display cycle (for example, and without limitation, as timed by a delay step at Block 1432), the system 100 may periodically update the calculated Adjustment Experience Factor (AEF) and/or an Interruption Experience Factor (IEF). More specifically, at Block 1490, a user may choose to (re)apply or remove AEF and/or IEF before displaying the updated chart at Block 1435. In an alternative embodiment, for example, and without limitation, as timed by a delay step at Block 1432, the system 100 may periodically update the calculated Adjustment Experience Factor (AEF) and/or an interruption Experience Factor (IEF) (1495). More specifically, a user may be able to choose to (re)apply or remove (at Block 1490) AEF and/or IEF, so that the scheduled effort of future activities is adjusted accordingly and also updated periodically (Block 1495) and the resulting schedule displayed (Block 1435). In yet another embodiment, in the event that a user logs on or a client comes online, the chart 200 may update the offline period with an interruption, update the Now line and display the updated chart (Block 1435).

Referring again to FIG. 13, the method of FIG. 14 is now described in more detail. For example, and without limitation, chart objects may be stored in the CHART table, using a sequencer to generate the ChartId primary key. The user to whom the chart is assigned may be identified by UserId. The chart settings may be stored in the USERCHARTSETTING table. Exemplary settings are defined in the ERD description at Appendix I. These settings may determine some of the time constraints that are applied when the system 100 schedules activities.

After a chart has been created, at Block 1430 the user may be able to enter rules determining the start time and duration of daily, initially "empty" work intervals that may be automatically generated in the chart, so that the system 100 may create new work intervals correctly as needed in order to schedule activities and/or appointments on the chart. As shown in the table at FIG. 15, each set of rules may govern how the work intervals are to be automatically generated for each day of the week, starting at a specific date and time in a specific locale. The user may be expected to enter the working times for each weekday at the locale specified in the set of rules, thereby allowing users who travel and work in different time zones to generate work intervals corresponding to the working times at the location where the user expects to be during any given time period.

For any two sets of work-interval-generation rules defined for a chart, the set of rules having the later WORKINTERVALDEFINITION.BeginUtc attribute may supplant the set of rules having the earlier one, starting at the date/time given in the later rule-set's WORKINTERVALDEFINITION.BeginUtc attribute. Given the rules shown in FIG. 15, for example, and without limitation, the top set of rules may be applied for the period from 4 Apr. 2015 00:00 a.m. Mountain Daylight Time (=Saturday 4 Apr. 2015 06:00 a.m. UTC) up to but not including 1 May 2015 00:00 a.m. Pacific Daylight Time (=Friday 1 May 2015 07:00 a.m. UTC); the middle set of rules may be applied for the period starting 1 May 2015 00:00 a.m. Pacific Daylight Time (=Friday 1 May 2015 07:00 a.m. UTC), and so on. Work intervals may not be permitted to overlap (i.e. if one WORKINTERVAL entry's BeginUtc lies before another WORKINTERVAL entry's BeginUtc, then the first WORKINTERVAL entry's EndUtc may not be permitted to lie after the second WORKINTERVAL entry's BeginUtc). The rules for automatically generating work intervals may be applied so that the work interval for a given weekday may only be generated if the entire working time for that weekday, as defined in the respective rule set, may be generated without overlapping the first work interval generated by the subsequent rule-set. In other words, the rule pertaining to the working times for any single weekday may be applied either entirely or not at all. It may not be permitted for the work interval for that day to be "truncated."

After the user has initially defined the rules, the system 100 may automatically generate the first work intervals to be used by the chart, for example, and without limitation, 100 work intervals. If the user adds new work-interval-generation rules or edits or deletes existing ones, only work intervals lying in the future may be affected. For example, and without limitation, deleting a set of rules that has already been supplanted by a later set of rules whose WORKINTERVALDEFINITION.BeginUtc lies in the past may have no effect on the chart's existing work intervals.

The system 100 may generate work intervals whenever the rules are initially created or edited, as well as upon client startup or whenever the Now line is advanced to a new date, such that at least, for example and without limitation, 100 work intervals may be available in the future (i.e. at least 100 work intervals exist where NORKINTERVAL.BeginUtc≥CHART.NowUtc).

Referring still to the ERD shown in FIG. 13, the system 100 may check how many future work intervals already exist, for example, and without limitation, by using the following SQL query:

select count(*) from workinterval wi where wi.ChartId=:bvChartId and wi.BeginUtc>=(select NowUtc from chart where ChartId=:bvChartId);

where :bvChartId identifies the chart for which the work intervals are to be generated. It may then, for example and without limitation, subtract that number from 100 in order to determine how many work intervals may be generated. If any future work intervals exist, the starting point from which the additional work intervals may be generated may be the highest WORKINTERVAL.EndUtc already existing in the chart. If no future work intervals exist, the chart's NowUtc value may be used as the starting point. A query to achieve this effect may be as follows:

select to_char(nvl(MaxWIEndUtc.LastEndUtc, c.NowUtc), 'YYYY-MM-DD HH24:MM') from
(
select max(wi.endutc) LastEndUtc
from workinterval wi
where wi.chartid=:bvChartId
) maxWIEndUtc
join chart c on c.chartid=:bvChartId;

The results of the above determinations may be passed as the arguments parNumWIsToCreate and parStartUtc of the process shown in FIG. 24 in order to generate the work intervals, and append the same onto the end of a chart. Note that two work intervals in which the EndUtc value of one interval is equal to the BeginUtc of the other interval may be considered as not overlapping, so the first work interval generated will not overlap the last work interval present on the chart, even if it is assigned a WORKINTERVAL.BeginUtc value exactly equal to parStartUtc.

When comparing times, the system 100 may apply the following definition of "overlap": given two time intervals A and B having respective start times of A.BeginTime and B.BeginTime and respective end times of A.EndTime and B.EndTime, with A.EndTime>A.BeginTime and B.EndTime>B.BeginTime, A and B overlap if one or more of the following combinations of conditions is true: A.BeginTime≥B.BeginTime AND A.BeginTime<B.EndTime; A.EndTime>B.BeginTime AND A.EndTime≤B.EndTime; B.BeginTime≥A.BeginTime AND B.BeginTime<A.EndTime; B.EndTime>A.BeginTime AND B.EndTime≤A.EndTime. According to this definition, if a time interval begins at exactly the same time as another time interval ends, the two time intervals do not overlap. For example, and without limitation, a time interval that ends at 5:00 PM and a time interval that begins at 5:00 PM are considered to be non-overlapping. Furthermore, the system 100 may treat a discrete point in time as overlapping a time interval if it is greater than or equal to the start time of the time interval and less than the end time of the time interval. According to this definition, if it is equal to the end time of the time interval, it is considered as not overlapping the time interval.

Referring additionally to FIG. 16, this table shows an example of work intervals that have been generated according to the rules in the table at FIG. 15. After the work intervals have been generated, the system 100 may allow the user to manually add new work intervals or edit existing ones. All dates and times that are displayed to the user may correspond to local dates and times for the time zone that is implied by the selected WORKINTERVAL.LocaleId in the record being edited, and may be converted to UTC dates and times when checking work intervals for overlaps and when storing them on the database. The user may only be allowed to edit future work intervals (ie. work intervals whose BeginUtc is ≥ the current UTC date and time). The user may also be allowed to edit the EndUtc of the current work interval (i.e. the work interval in which the current UTC date and time lies, if there is such a work interval).

After work intervals have been generated for a user's chart, the empty chart may be displayed on screen (Block 1435). For this purpose, a certain time range of generated work intervals may be read into the program's memory. For example, and without limitation, initially the two most recent complete intervals prior to the chart's NowUtc attribute may be loaded, as well as all subsequent intervals such that the first ten intervals having an EndUtc attribute greater than the current UTC time are read in. When the chart later contains scheduled activities, the system 100 may also ensure that at least as many intervals are read into memory as are required to include all activity segments currently scheduled for the future. For example, and without limitation, given the ERD shown in FIG. 13, information like that shown in the table at FIG. 18 may be assembled using a query like that at FIG. 17, if the chart's Now line and the current UTC time fall between 2015-04-30 15:00 and 2015-05-01 00:00 and no activities end past 2015-05-19 00:00 UTC, and if a dividing line having a thickness corresponding to 3 minutes is to be drawn before each work interval. The OfsFromChartOrigin value in the result set may be used when calculating the coordinates of objects being drawn on the screen, as described further below.

The chart 200 of the system 100 may be divided into three display areas termed "views." For example, and without limitation, these areas are indicated with dashed lines in FIG. 19. A view may be defined as the currently visible sub-region of a larger logical drawing surface called a frame, whose contents may be hidden outside the boundaries of the view. The textual list of To Do items may be displayed in one view (1900), the work-interval timeline (dates, clock times and time zones) may be displayed in a second view (1904), and the activity bars and their appointment transects and other associated graphical objects may be displayed in the third view (1902). Each view may be scrollable so that other contents in its respective frame may be brought into the visible area of the view. The scrolling of views 1900 and 1902 may be coordinated vertically (e.g. when 1900 may scroll down by 24 pixels, 1902 also may scroll down by 24 pixels), so that any displayed To Do list item may remain horizontally aligned with its corresponding activity bar. The scrolling of views 1904 and 1902 may be coordinated horizontally (e.g. when 1902 may scroll to the right by 100 pixels, 1904 may scroll to the right by 100 pixels), so that any displayed graphical objects in 1902 may remain located directly beneath their assigned time ranges as shown in the work-interval timeline in 1904.

The three frames in which the views may be respectively located are shown, for example, and without limitation, as heavily outlined areas in FIG. 20. For example, and without limitation, frame 2006 contains the complete list of the current and future To Do items, of which the respective view 2000 (corresponding to 1900 in FIG. 19) shows a subset. To the left of the frame the lane numbers corresponding to each To Do list item are shown for purposes of illustration (and in this example correspond to ACTIVITY.Priority for each activity in the To Do list). "To Do items," as described hereinabove, may be determined, for example, and without limitation, by the following SQL:

select actyname, remainingeffortinmin, priority from activity where chartid=:bvChartId and ExecutionStatus in (Scheduled, Executing) order by priority asc;

Frame 2010 may contain the work-interval timeline for all currently loaded work intervals (e.g., in the displayed frame 2010 only four intervals have been loaded in order to fit in the drawing) as well as the execution lane and its contained event segments that fall within those work intervals, of which the respective view 2004 (corresponding to 1904 in FIG. 19) may show a sub-range. Frame 2008 may contain all the future activity bar segments (i.e. ACTYSEGMENT.BeginUtc≥CHART.NowUtc) and appointment transects (APPSEGMENT.BeginUtc≥CHART.NowUtc) for the currently executing activity and future scheduled activities, as well as their associated graphical objects such as time limit handles and warning symbols. To the right of the frame the lane numbers corresponding to each activity are shown for purposes of illustration. View 2002 (corresponding to 1902 in FIG. 19) may be a sub-region of frame 2008. For example, and without limitation, it may be as tall as view 2000 and may show the same lanes, at the same vertical scale, as are shown in view 2000, and may be as wide as view 2004 and may show the same time range, at the same horizontal scale, as is shown in view 2004.

The horizontal coordinate axis of 2008 may have the same extent and resolution as does that of 2010. The vertical coordinate axis of 2008 may have the same extent and resolution as does that of 2006. The drawing origin 2012 of the activity bar frame 2008 may have (x, y) coordinates (0, 0), where x increases rightward and y increases downward. For example, and without limitation, the x-axis may be scaled to time in minutes, and the y-axis may be scaled to lanes (priority of activities). Given a screen horizontal resolution of DpiX pixels per inch and vertical resolution of DpiY pixels per inch, if each hour of time represented in the chart is to have a horizontal extent H of 0.5 inches, then H (in pixels)=DpiX×0.5, and if each lane in the chart is to have a vertical extent L of 0.25 inches, then L (in pixels)=DpiY×0.25.

The horizontal offset X in pixels of any minute M from the origin of the chart (frame) may thus be $$X = H \times M/60$$

where the first minute M=0. The vertical offset Y in pixels of the top of lane number N from the y-axis origin of the frame (2008, 2006) may be given by $$Y_{top} = L \times N$$

and the vertical offset in pixels of the bottom of lane N from the y-axis origin of the frame may be given by $$Y_{bottom} = L \times (N+1)$$

where the number N of the first lane (which has priority 0) is 0. The vertical midpoint in pixels of lane N may thus be $$Y_{middle} = [(L \times N) + [L \times (N+1)]]/2.$$

For example, and without limitation, to draw a horizontal line in the vertical middle of lane 5 starting at an offset of 17 minutes and having a duration of 80 minutes, and assuming that each hour of time represented in the chart is to have a horizontal extent of 0.5 inches, that each lane in the chart is to have a vertical extent of 0.25 inches, and that DpiX=120 and DpiY=120, then the starting coordinates ($X_{begin}$, $Y_{middle}$) in pixels of the line may be calculated as follows:

$$X_{begin} = (120/2) \times 17/60 = 60 \times 17/60 = 17$$

$$Y_{middle} = [[(120/4) \times 5] + [(120/4) \times (5+1)]]/2 = (150 + 180)/2 = 165$$

thus ($X_{begin}$, $Y_{middle}$)=(17, 165). Similarly, the ending X coordinate of the line, $X_{end}$, may be $$X_{end} = (120/2) \times (17+80)/60 = 60 \times (97/60) = 97$$

so that the ending coordinates ($X_{end}$, $Y_{middle}$)=(97, 165).

To ease coding, a drawing transformation matrix may be used to scale the pixel-based coordinates into vertical units of lanes and horizontal units of minutes, if the runtime environment supports such transformation matrices.

To calculate the horizontal coordinate X of a graphical object that may be drawn at a specific UTC time T within frame 2010 or 2008, one may apply the following exemplary procedure:

Among the work intervals that have been loaded into memory for display, for example, and without limitation, by using a query such as that at FIG. 17, find the work interval (WI) where T≥WI.BeginUtc and T<WI.EndUtc. (if there is no such work interval, the point may not be drawn on the chart.)

Calculate the absolute time span in minutes between WI.BeginUtc and T.

Add the resulting number of minutes to the work interval's OfsFromChartOrigin value as returned by the query that was used to load the work intervals for display, for example, as shown in FIG. 18.

Convert the number of minutes to a horizontal pixel coordinate using the formula described above for calculating the horizontal offset X in pixels of a minute M from the frame's origin.

After initially loading the work intervals to be displayed, as described above, the width of frames 2010 and 2008 may be set to the total length of the loaded work intervals in minutes (e.g., which can be calculated as the OfsFromChartOrigin+LenInMin values from the last entry generated by a query for loading work intervals, such as that at FIG. 17), which is then transformed into units of pixels using the formulas given above. For the data in FIG. 18, for example, and without limitation, the width of frames 2010 and 2008 may need to be 5235+540=5775 minutes. Thus, if each hour in the chart were scaled to a horizontal extent of 1 inch, then given DpiX=120, H=DpiX×1=120, and M=5775, the frame width may be X=H×M/60, i.e. 120×5775/60=11,550 pixels. As an additional example, if each hour in the chart were scaled to a horizontal extent of 0.5 inches, then H=DpiX× 0.5=60, in which case the frame width may be 60×5775/ 60=5775 pixels. Similarly, the heights of frames 2008 and 2006 may need to be sufficient to accommodate all lanes to hold the activity bars representing current and future To Do items. Given 29 such activities, for example, and without limitation, 29 lanes may be required. Thus, if each lane in the chart were scaled to a vertical extent of 0.25 inches, then given DpiY=120, L=30 and N=29, the frame height might be $Y_{bottom}$=L×(N+1), i.e. 30×(29+1)=900 pixels.

After loading the work intervals to be displayed and setting the width of frames 2010 and 2008, the vertical lines dividing the work intervals, the dates and time zones of each work interval and the hourly time-division markers within each work interval may be drawn in frame 2010, as well as the vertical lines dividing the work intervals in frame 2008. The dates and days of the week of each work interval, as well as the horizontal offset (in minutes from the origin) of each loaded work interval and the respective work interval's hourly time-division markers, may be obtained using a routine such as the GetWholeHourTimes routine at FIG. 21, exemplary output for which is shown in FIG. 22. To calculate the coordinates of each hourly division marker to be displayed, the system 100 may iterate through the loaded work intervals (FIG. 18), pass each interval's BeginUtc and EndUtc value to GetWholeHourTimes, and add each resulting hourly division's OFS_FROM_BEGIN value (FIG. 22) to the work interval's OfsFromChartOrigin value in order to obtain the hourly division's offset in minutes from the chart origin (see, for example, and without limitation, FIG. 23).

Since the offsets output by the routine described above may be in minutes from the horizontal-axis origin of the respective frame, these values may be converted to pixels when determining the coordinates for drawing the hourly divisions and date or time information, as described above.

Work events (e.g., activities, appointments, and interruptions) may be stored in the ACTIVITY, APPOINTMENT and INTERRUPTION tables as shown in the ERD (FIG. 13). Each row may contain core information regarding the work event it represents. In order to be displayed on the chart, each work event may have one or more segments. Event segments may represent the visible (bar) portion of events scheduled on the chart. Each segment may represent a single continuous time span during which the user may focus effort on the event. As shown in FIG. 13, the segments for activities may be held in the ACTYSEGMENT table; those for appointments, in the APPTSEGMENT table; and those for interruptions, in the INTERRUPSEGMENT table.

Time limits indicating the constraints within which activities should take place may be stored in the ACTYTIMELIMIT table shown in the ERD (FIG. 13). Each row may contain core information that may define one specific limit for one specific activity, as well as information reflecting the most recent evaluation of that limit.

For any given activity on a user's chart, the system 100 may allow the user to add, edit, and remove time limits, ensuring that the values stored in the attributes of those limits are consistent with the ERD description for this table and its attributes. As explained in the ERD description at Appendix I, time limits may be permitted to be defined using fixed (explicit) points in time or relative (referenced) points in time. In the latter case, the ACTYTIMELIMIT.TargetApptId or ACTYTIMELIMIT.TargetActyId attribute may be filled. Variants of the system 100 may allow multiple charts (for one or more users) to be stored on the data structure 107, in which case the user may be allowed to define time limits that refer to the appointments and activities selected from other charts (assigned to the same or other users) as well as from the same chart. In this case, the values assigned to ACTYTIMELIMIT.TargetApptId or ACTYTIMELIMIT.TargetActyId may be the identifiers of events on those other charts.

The system 100 may observe the following rules whenever scheduling work events, as the rules help ensure accurate calculation of the amount of effort spent on individual events and accurate forecasting of when it will be possible to complete individual activities. In the following rules, event means an activity, appointment, or interruption; event segment means a continuous sub-portion of an activity, appointment or interruption (as stored in the ACTYSEGMENT, APPTSEGMENT or INTERRUPSEGMENT tables). The term overlap is meant in the sense defined previously. The detailed methods for scheduling work events described in subsequent sections are designed so that the following rules may be applied consistently:

(1) Event segments belonging to the same event may not overlap each other.

(2) Event segments may only occupy time within a work interval. (They may not overlap a time span lying between two intervals.)

(3) Event segments may not overlap the Now line (the chart's NowUtc value), except that a currently executing appointment or activity may have a segment whose BeginUtc=NowUtc.

(4) Unexecuted (i.e. future scheduled) activity segments may not overlap:

a) other activity segments, or the post activity-buffer of a prior activity;

b) any appointments or appointment segments, or the pre- or post-appointment buffer applicable to an appointment, except for appointments having APPOINTMENT.SuppressTransect=1 (True);

c) any interruptions or interruption segments, or the post-interruption buffer applicable to an interruption;

d) any time span lying between two work intervals (as already indicated above), or the PreEnd or PostBegin buffer applicable to a work interval.

(5) Although unexecuted activity segments may not overlap other activity segments, they may be interlaced with the segments of other activities. For example, and without limitation, if part of Activity A has executed and then Activity B is reprioritized to Priority 0 so that it may begin executing, Activity B's segments may lie between the executed and unexecuted segments of Activity A and thus be interlaced with them; however, none of the activity segments of A and B may overlap.

(6) Future scheduled activity segments may respect the minimum segment duration for activities, except for the final (last) segment of an activity. A further exception may apply to an activity segment that starts at the Now line and that immediately follows another segment preceding the Now line for the same activity; in this case, the segment starting at the Now line conceptually represents a continuation of the previous segment and thus the sum of those two segments' lengths may respect the minimum segment duration for activities, unless the segment starting at the Now line is the final segment of the activity.

(7) Appointment segments may overlap segments of other appointments.

(8) Interruption segments may overlap appointment segments.

(9) Interruption segments may not begin or end after the chart's NowUtc value.

The chart may be adjusted to ensure the above rules are adhered to when work intervals, activities, appointments or interruptions are changed. All changes to work intervals, activities, appointments and interruptions and the resulting changes to the chart may be performed in a single database transaction, to ensure consistency is maintained.

The rules listed above may determine in large part how the chart 200 responds to user or application actions that are intended to affect scheduled events. User actions are changes introduced into the chart by user input (commands) and may include operations such as inserting a new activity, reprioritizing an activity, deleting an activity, resizing a work interval, and entering or exiting interruption mode. Application actions are operations that are initiated by the system 100 itself and are designed have an effect on scheduled events, such as the regularly occurring advancement of a chart's NowUtc pointer to the current date and time. The following descriptions provide examples of how such actions may be handled so as to ensure the above rules are respected.

For example, and without limitation, FIG. 25 shows a sequence of operations that may generally be performed whenever a system 100 or user action occurs which could potentially affect the scheduled events shown in the chart. In the descriptions that follow, all times referred to are UTC times unless otherwise noted. All time-related calculations and routines may assume that time-related results and parameters will have a granularity of 1 minute, such that all UTC times of objects on the chart fall on a minute boundary. For example, and without limitation, the Now line may lie exactly at 09:30:00 a.m. or 09:31:00 a.m., but not at 09:30:15 a.m. (15 seconds after 09:30). The current time may not be rounded to lie in the future, but rather may be truncated to lie on the beginning boundary of the most recent minute that has begun transpiring (to accomplish this, a routine for obtaining the current UTC time for assigning to a chart's NowUtc pointer may truncate the time such that it contains no seconds component).

Some of the operations described further below may include calls to utility routines and/or the use of constants. The call signatures and specifications of elements used in the examples are illustrated in FIGS. 29A, 29B, and 29C, together with PL/SQL packages in which they may be contained as referred to in code. The usage of such routines and constants will be clear to anyone of ordinary skill in the art. These routines may work with a database designed according to the Entity Relationship Diagram illustrated in FIG. 13 and described at Appendix I.

Some of the application or user actions described further below may require that appointments on the chart be resegmented, i.e. that their segments be adjusted or re-created, in order to remain consistent with the rules described above and to ensure the events on the chart continue to behave correctly. For each such appointment, a routine having the following input and output parameters may be used: input: appointment ID (identifier of the appointment that is to be resegmented and updated); output: result (success or error code indicating whether the operation succeeded). For example, and without limitation, high-level pseudocode describing such a routine may be as shown in FIGS. 30A and 30B.

Some of the application or user actions described further below may require that a set of appointments which overlap a specific time range on the chart be resegmented as described in the preceding section. For this purpose, a routine having the following input and output parameters may be used: input: chart ID (identifier of the chart in which the appointments are to be resegmented); input: starting time (the starting point of the time range within which appointments should be resegmented); input: ending time (the ending point of the time range within which appointments should be resegmented); output: result (success or error code indicating whether the operation succeeded). For example, and without limitation, high-level pseudocode describing such a routine may be as shown in FIG. 31.

Some of the application or user actions described further below may require that interruptions on the chart be resegmented, i.e. that their segments be adjusted or re-created, in order to remain consistent with the rules described above and to ensure the events on the chart continue to behave correctly. For each such interruption, a routine having the following input and output parameters may be used: input: interruption ID (identifier of the interruption that is to be resegmented and updated); output: result (success or error code indicating whether the operation succeeded). For example, and without limitation, high-level pseudocode describing such a routine may be as shown in FIG. 32.

Some of the application or user actions described further below may require that a set of interruptions which overlap a specific time range on the chart be resegmented as described above. For this purpose, a routine having the following input and output parameters may be used: input: chart ID (identifier of the chart in which the interruptions are to be resegmented); input: starting time (the starting point of the time range within which interruptions should be resegmented); input: ending time (the ending point of the time range within which interruptions should be resegmented); output: result (success or error code indicating whether the operation succeeded). For example, and without limitation, high-level pseudocode describing such a routine may be as shown in FIG. 33.

Whenever activities are rescheduled, the system 100 may locate available time gaps in the chart that are of sufficient length so that, if an activity segment were scheduled in such a gap, it might not violate any of the rules mentioned in the previous section. For this purpose a routine having the following input and output parameters may be used that determines the available times for scheduling a single activity: input: chart ID (identifier of the chart in which activities are to be rescheduled); input: starting time (the earliest UTC time point at which the first activity segment may potentially begin; the routine will not allow the first activity segment to begin before this time point); input: number of minutes to plan (the total effort, in number of minutes, that should be scheduled in the future for the activity); input: minimum number of minutes for the segment starting at the Now line (minimum length in minutes that a gap starting at the Now line must have in order to allow an activity segment to be scheduled within it; only relevant if the starting time parameter equals NowUtc); input: minimum number of minutes per segment (the minimum length in minutes that a single continuous gap must have in order to allow an activity segment to be scheduled within it); output: list of time spans which the activity's segments should occupy when scheduled (a time span is a record, i.e. compound variable, containing a beginning UTC time, an ending UTC time and a length in minutes); output: result (success or error code indicating whether the operation succeeded). For example, and without limitation, high-level pseudocode describing such a routine may be as shown in FIGS. 34A and 34B.

Some of the application or user actions described further below may require that the not-yet-executed portion of activities on a chart be resegmented and rescheduled starting at a specific time and/or priority. For this purpose a routine may be used having the following input and output parameters: input: chart ID (identifier of the chart in which activities are to be rescheduled); input: starting time (the earliest UTC time point at which the first activity segment should be permitted to begin; if this is non-null, the first activity segment to be re-created will not start any earlier than the specified time); input: starting priority (the priority of the earliest activity whose unexecuted segments should be rescheduled; if this is null or <0, priority 0 will be assumed; if this is ≥0, only unexecuted segments of activities having priority ≥ this starting priority will be rescheduled); output: result (success or error code indicating whether the operation succeeded). For example, and without limitation, high-level pseudocode describing such a routine may be as shown in FIGS. 35A and 35B.

Some operations which change the scheduling of activities on the chart may require that a gap be inserted in the sequence of activity priorities scheduled on the chart. For example, and without limitation, if a chart contains five activities that are scheduled to execute in the future (including an activity that is currently executing or is about to execute), those activities may have priorities 0, 1, 2, 3 and 4; if a gap is then inserted at priority 3, the resulting sequence of priorities will be 0, 1, 2, 4 and 5. To accomplish this, a routine may be used having the following input and output parameters: input: chart ID (identifier of the chart containing the activities whose priorities are to be adjusted); input: priority where the gap should be inserted; output: result (success or error code indicating whether the operation succeeded). For example, and without limitation, high-level pseudocode describing such a routine may be as shown in FIG. 36.

Some operations which change the scheduling of activities on the chart may produce temporary gaps in the sequence of activity priorities scheduled on the chart (a gap is a priority value that has no activity assigned to it and that lies between other priority values which do have assigned activities); such gaps may be removed before the chart is redrawn. For example, and without limitation, if a chart contains five activities that are scheduled to execute in the future (including an activity that is currently executing or is about to execute), those activities may have priorities 0, 1, 2, 3 and 4; if the activity at priority 3 is then assigned priority 5 so that it will be scheduled after the activity having priority 4, the gap at priority 3 may be removed so that the sequence of priorities of the reordered activities might remain continuous, i.e. 0, 1, 2, 3 and 4. To accomplish this, a routine may be used having the following input and output parameters: input: chart ID (identifier of the chart containing the activities whose priorities are to be adjusted); input: starting priority (the priority after which all gaps in the sequence of priorities are to be closed); output: result (success or error code indicating whether the operation succeeded). For example, and without limitation, high-level pseudocode describing such a routine may be as shown in FIG. 37.

Editing operations performed by a user on a chart's work intervals, such as adding new ones, removing existing ones, or adjusting the duration or buffer intervals of a work interval, may affect the segmentation of appointment and interruption events lying within a defined time range on the chart, as well as the activities scheduled within and after that range. To respond to such changes so that the events on the chart remain consistent with the rules described above and continue to behave correctly, a routine may be used having the following input and output parameters: input: chart ID (identifier of the chart containing the work intervals that were changed); input: starting time (the earliest UTC time point affected by the change); input: ending time (the latest UTC time point affected by the change); output: result (success or error code indicating whether the operation succeeded). For example, and without limitation, high-level pseudocode describing such a routine may be as shown in FIG. 38.

The system 100 may occasionally calculate the number of minutes of effort scheduled for activities within a given time range. For this purpose, a routine may be used having the following input and output parameters: input: chart ID (identifier of the chart containing the activities); input: starting time (earliest UTC time in the range over which activity effort should be calculated); input: ending time (latest UTC time in the range over which activity effort should be calculated); output: result (number of minutes of effort scheduled for activities within the specified range). For example, and without limitation, high-level pseudocode describing such a routine may be as shown in FIG. 39.

The system 100 may occasionally advance the Now line on a chart (i.e. the chart's NowUtc attribute) to a later UTC date and time, up to the current UTC date and time; as part of this operation, the segmentation and status of appointments which overlap the time range between the old (previous) and the new (later) UTC time may be updated to reflect the new situation. For this purpose, a routine may be used having the following input and output parameters: input: chart ID (identifier of the chart for which the NowUtc pointer was advanced); input: current chart mode (NORMAL, INTERRUPTION or FROZEN); input: previous NowUtc (the previous UTC time point from which the pointer was advanced); input: new NowUtc (the new UTC time point to which the pointer is being advanced); output: result (success or error code indicating whether the operation succeeded). For example, and without limitation, high-level pseudocode describing such a routine may be as shown in FIG. 40.

The system 100 may occasionally advance the Now line on a chart (i.e. the chart's NowUtc attribute) to a later UTC date and time, up to the current UTC date and time; as part of this operation, the segmentation and status of interruptions on the chart may require updating to reflect the new situation. For this purpose, a routine may be used having the following input and output parameters: input: chart ID (identifier of the chart for which the NowUtc pointer was advanced); input: current chart mode (NORMAL, INTERRUPTION or FROZEN); input: previous NowUtc (the previous UTC time point from which the pointer was advanced); input: new NowUtc (the new UTC time point to which the pointer is being advanced); output: result (success or error code indicating whether the operation succeeded). For example, and without limitation, high-level pseudocode describing such a routine may be as shown in FIG. 41.

The system 100 may occasionally advance the Now line on a chart (i.e. the chart's NowUtc attribute) to a later UTC date and time, up to the current UTC date and time; as part of this operation, the segmentation and status of activities on the chart may require updating to reflect the new situation. For this purpose, a routine may be used having the following input and output parameters: input: chart ID (identifier of the chart for which the NowUtc pointer was advanced); input: current chart mode (NORMAL, INTERRUPTION or FRO- ZEN); input: previous NowUtc (the previous UTC time point from which the pointer was advanced); input: new NowUtc (the new UTC time point to which the pointer is being advanced); output: result (success or error code indicating whether the operation succeeded). For example, and without limitation, high-level pseudocode describing such a routine may be as shown in FIG. 42.

The system 100 may occasionally advance the Now line on a chart (i.e. the chart's NowUtc attribute) to a later UTC date and time, up to the current UTC date and time. For this purpose, a routine can be used having the following input and output parameters: input: chart ID (identifier of the chart for which the NowUtc pointer is to be advanced); input: new NowUtc (the new UTC time point to which the pointer is to be advanced); output: result (success or error code indicating whether the operation succeeded). For example, and without limitation, high-level pseudocode describing such a routine may be as shown in FIG. 43.

The system 100 may occasionally evaluate the degree to which the time limits of activities on a chart are threatened; as part of this operation, the system 100 may assess the amount of time that may be potentially available for scheduling activities within a given time range. For this purpose, a routine may be used having the following input and output parameters: input: chart ID (identifier of the chart containing the activities); input: starting time (earliest UTC time in the range over which available time should be assessed); input: ending time (latest UTC time in the range over which available time should be assessed); input: minimum number of minutes per activity segment (the minimum length in minutes that a single continuous gap may have in order to consider that gap as being potentially available for scheduling an activity); output: result (amount of potentially available time in minutes). The routine may ignore interruption buffer times if it assumes that code calling this routine will pass a time in the starting time parameter that already respects such buffers, but otherwise may respect all appointments, appointment buffers, work intervals and work-interval buffers. For example, and without limitation, high-level pseudocode describing such a routine may be as shown in FIG. 44.

Periodically or in response to various actions, the system 100 may evaluate the time limits of an activity on a chart and resolve those limits to specific dates and times. For this purpose, a routine may be used having the following input and output parameters: input: activity ID (identifier of the activity whose time limits are to be resolved); output: result (success or error code indicating whether the operation succeeded). For example, and without limitation, high-level pseudocode describing such a routine may be as shown in FIG. 45.

Periodically or in response to various actions, the system 100 may evaluate the time-limit threats pertaining to an activity on a chart. For this purpose, a routine may be used having the following input and output parameters: input: activity ID (identifier of the activity whose time-limit threats are to be evaluated); output: result (success or error code indicating whether the operation succeeded). For example, and without limitation, high-level pseudocode describing such a routine may be as shown in FIGS. 46A, 46B, and 46C.

To create a new activity and schedule it in the future on the chart, the user may enter the activity's basic attributes (for example, and without limitation, name, estimated effort, intended priority, and—if scheduled portions of the activity should have a minimum duration that deviates from the global setting for minimum activity-segment durations—the activity's minimum segment duration). The system 100 may then carry out the following steps within a single transaction: validate that the target priority (i.e. the user's intended priority) is greater than or equal to 0 and is less than or equal to 1 more than the priority of the latest scheduled activity on the chart (if the chart already has a scheduled activity); insert a gap at the target priority in the sequence of scheduled activity priorities, using the routine previously described for that purpose; adjust the remaining estimated effort of the new activity by the most recently calculated Adjustment Experience Factor (AEF) and/or Interruption Experience Factor (IEF) for the chart, if the option to apply the respective factor has been selected; insert the new activity into the database; reschedule all activity segments, starting at the target priority, using the routine previously described for that purpose; evaluate the time limits and update the time-limit threat levels for all rescheduled activities, using the routines previously described for that purpose; redraw the chart.

If the user changes an activity's EstimatedEffort or RemainingEffortInMin attribute before the activity has begun executing, the system 100 may carry out the following steps within a single transaction: update the activity's EstimatedEffort and RemainingEffortInMin attributes to the new value, ensuring the chart's most recently calculated Adjustment Experience Factor (AEF) and/or Interruption Experience Factor (IEF) is applied to the RemainingEffortInMin attribute if the option to apply the respective factor has been selected; reschedule all activity segments, starting at the changed activity's priority, using the routine previously described for that purpose; evaluate the time limits and update the time-limit threat levels for all rescheduled activities, using the routines previously described for that purpose; redraw the chart.

After an activity has begun executing, the user may not change its EstimatedEffort attribute but may change its RemainingEffortInMin attribute; in this case the system 100 may carry out the following steps within a single transaction: update the activity's RemainingEffortInMin attribute to the new value, ensuring the chart's most recently calculated Adjustment Experience Factor (AEF) and/or Interruption Experience Factor (IEF) is applied to the attribute if the option to apply the respective factor has been selected; reschedule all activity segments, starting at the changed activity's priority, using the routine previously described for that purpose; evaluate the time limits and update the time-limit threat levels for all rescheduled activities, using the routines previously described for that purpose; redraw the chart. Changes to an activity's EstimatedEffort or RemainingEffortInMin attribute after the activity has already been executed, if allowed by the system 100, may have no effect on future scheduled activity segments.

To allow the user to adjust the priority of any scheduled activity which has unexecuted portions, a routine may be used having the following input and output parameters: input: activity ID (identifier of the activity whose priority is to be adjusted); input: target priority (the new priority which the activity should have); output: result (success or error code indicating whether the operation succeeded). For example, and without limitation, high-level pseudocode describing such a routine may be as shown in FIG. 47.

After performing this operation, the system 100 may: evaluate the time limits and update the time-limit threat levels for all rescheduled activities, using the routines previously described for that purpose; redraw the chart. The reprioritization operation and the above steps may all be carried out within a single transaction.

If the user deletes an activity, the system 100 may carry out the following steps within a single transaction: save the priority value of the activity to a local variable; delete the activity and its segments from the database; if the deleted activity had a priority ≥0, pack (remove) the gaps in the sequence of activity priorities using the routine previously described for this purpose, starting at the deleted activity's priority; reschedule all activity segments on the specified activity's chart using the routine previously described for this purpose, starting at the deleted activity's priority; evaluate the time limits and update the time-limit threat levels for all rescheduled activities, using the routines previously described for that purpose; redraw the chart.

To create a new appointment and schedule it on the chart, the user may enter the appointment's basic attributes (for example, and without limitation, name, start time, end time, flag indicating whether the appointment should affect scheduling of activities, and—if the buffer intervals before and after the appointment should deviate from the global settings for pre- and post-appointment buffer intervals—the appointment's buffer intervals). The system 100 may then carry out the following steps within a single transaction: insert the new appointment into the database, setting its BeginUtc and EndUtc attributes to the input start time and end time (as transformed from local times to UTC times), its LenInMin attribute to the number of minutes between BeginUtc and EndUtc, its SuppressTransect attribute according to whether the appointment should affect scheduling of activities, its PreBufLenInMin and PostBufLenInMin to the input buffer intervals (if the global settings are to be overridden), its PreBufUtc attribute to a time calculated by subtracting the applicable pre-appointment buffer interval from BeginUtc, and its PostBufUtc attribute to a time calculated by adding the applicable post-appointment buffer interval to EndUtc; resegment and update the appointment, using the routine previously described for that purpose; reschedule all activity segments, starting at priority 0, using the routine previously described for that purpose; evaluate the time limits and update the time-limit threat levels for all rescheduled activities, using the routines previously described for that purpose; redraw the chart. As an optimization, the system 100 may restrict the operation of rescheduling activity segments to only those activities that are potentially affected by the appointment, i.e. starting at the priority of the earliest activity that overlaps the time range from the appointment's PreBufUtc to its PostBufUtc attributes.

If the user edits an appointment to adjust its start time, end time, flag indicating whether the appointment should affect scheduling of activities, or buffer intervals, the system 100 may carry out the following steps within a single transaction: update the appointment's adjusted BeginUtc, EndUtc, LeninMin, SuppressTransect, PreBufLeninMin, PostBufLenInMin, PreBufUtc and PostBufUtc attributes on the database with the new values (using input local times as transformed to UTC times), using the same rules for setting these attributes as described above for inserting a new appointment; resegment and update the appointment, using the routine previously described for that purpose; reschedule all activity segments, starting at priority 0, using the routine previously described for that purpose; evaluate the time limits and update the time-limit threat levels for all rescheduled activities, using the routines previously described for that purpose; redraw the chart. As an optimization, the system 100 may restrict the operation of rescheduling activity segments to only those activities that are potentially affected by the appointment, i.e. starting at the priority of the earliest activity that overlaps the time range from the appointment's PreBufUtc to its PostBufUtc attributes.

If the user deletes an appointment, the system 100 may carry out the following steps within a single transaction: delete the appointment and its segments from the database; reschedule all activity segments, starting at priority 0, using the routine previously described for that purpose; evaluate the time limits and update the time-limit threat levels for all rescheduled activities, using the routines previously described for that purpose; redraw the chart. As an optimization, the system 100 may restrict the operation of rescheduling activity segments to only those activities that are potentially affected by the appointment, i.e. starting at the priority of the earliest activity that overlaps the time range from the appointment's PreBufUtc to its PostBufUtc attributes (which would need to be saved to local variables before deleting the appointment).

To create a single new work interval on the chart, the user may enter the work interval's basic attributes (for example, and without limitation, time locale, start time, end time, and—if the buffer intervals at the start and end of the work interval should deviate from the global settings for work interval buffer lengths—the work interval's buffer intervals). The system 100 may then carry out the following steps within a single transaction: insert the new work interval into the database (ensuring that it does not overlap any other work intervals on the same chart), setting its LocaleId attribute to the input time locale, its BeginUtc and EndUtc attributes to the input start time and end time (as transformed from local times to UTC times), its LeninMin attribute to the number of minutes between BeginUtc and EndUtc, its PostBeginBufLenInMin and PreEndBufLenInMin to the input buffer intervals (if the global settings are to be overridden), its PostBeginBufUtc attribute to a time calculated by adding the applicable post-begin buffer interval to BeginUtc, and its PreEndBufUtc attribute to a time calculated by subtracting the applicable pre-end buffer interval from EndUtc; update the NextBeginUtc and NextPostBeginBufUtc attributes of the new work interval and the one immediately preceding it; reschedule the chart's events for the time range between the new work interval's BeginUtc and EndUtc values, using the routine previously described for that purpose; evaluate the time limits and update the time-limit threat levels for all rescheduled activities, using the routines previously described for that purpose; redraw the chart.

If the user edits a work interval to adjust its start time, end time, or buffer intervals, the system 100 may carry out the following steps within a single transaction: update the work interval's adjusted BeginUtc, EndUtc, LenInMin, PostBeginBufLenInMin, PreEndBufLenInMin, PostBeginBufUtc and PreEndBufUtc on the database with the new values (using input local times as transformed to UTC times), using the same rules for setting these attributes as described above for inserting a new work interval; update the NextBeginUtc and NextPostBeginBufUtc attributes of the work interval immediately preceding the one that was edited; reschedule the chart's events for the outermost time range over which the work interval was changed, using the routine previously described for this purpose (for example, and without limitation, if the work interval was adjusted by moving both its BeginUtc and its EndUtc to earlier time points, then the time range to be passed to the routine may extend from the new BeginUtc value to the old EndUtc value, since these may represent the outermost bounds of the time range affected by the change); evaluate the time limits and update the time-limit threat levels for all rescheduled activities, using the routines previously described for that purpose; redraw the chart.

If the user deletes a work interval, the system 100 may carry out the following steps within a single transaction: save the BeginUtc and EndUtc values of the work interval to local variables; delete the work interval from the database; update the NextBeginUtc and NextPostBeginBufUtc attributes of the work interval immediately preceding the one that was deleted (these may then refer to the times of the work interval immediately following the one that was deleted); reschedule the chart's events for the time range between the deleted work interval's BeginUtc and EndUtc values, using the routine previously described for that purpose; evaluate the time limits and update the time-limit threat levels for all rescheduled activities, using the routines previously described for that purpose; redraw the chart.

If the user edits one or more work-interval-generation rules in order to regenerate future work intervals on a chart according to the adjusted rules, in accordance with the algorithm given in FIG. 24, the system 100 may carry out the following steps within a single transaction: save the BeginUtc of the earliest work interval having an EndUtc value greater (later) than the time point from which new work intervals are to be generated, i.e. having EndUtc > the starting time that is input into the algorithm described in FIG. 24, because this work interval may be deleted during regeneration and its BeginUtc may be needed further below for a test; regenerate the desired number of future work intervals according to the algorithm described in FIG. 24, passing the chart's NowUtc pointer or a later time point, whichever is desired, to that algorithm as the input starting time; reschedule the chart's events for the time range extending from the earlier of the BeginUtc that was saved above and the BeginUtc of the first work interval that was newly generated, i.e. the earliest work interval having an EndUtc value greater than the time point from which new work intervals were to be generated, to the EndUtc of the last work interval on the chart; evaluate the time limits and update the time-limit threat levels for all rescheduled activities, using the routines previously described for that purpose; redraw the chart.

If the user edits any of the global chart settings in the USERCHARTSETTING table as defined in the ERD description at Appendix I, the system 100 may carry out the following steps within a single transaction: if global appointment-buffer-length settings (USERCHARTSETTING.SETTINGNAME=PreAppointmentBuffer or PostAppointmentBuffer) were changed, update the PreBufUtc and PostBufUtc attributes of any appointments in which the respective setting is not overridden and which have an EndUtc greater (later) than the chart's NowUtc marker; if global work-interval-buffer-length settings (USERCHARTSETTING.SETTINGNAME PostWorkIntervalBeginBuffer or PreWorkIntervalEndBuffer) were changed, update the PostBeginBufUtc and PreEndBufUtc attributes of any work intervals in which the respective setting is not overridden and which have an EndUtc greater (later) than the chart's NowUtc marker; and update the work intervals' NextPostBeginBufUtc attributes, starting with the work interval immediately preceding the earliest work interval having an EndUtc greater than the chart's NowUtc marker, and proceeding through to the last work interval; if an option to apply an Adjustment Experience Factor (AEF) or Interruption Experience Factor (IEF) was changed, remove the factor from, or calculate and apply the factor to, the RemainingEffortInMin attributes of the not-yet-executed activities on the chart in accordance with the option, using the routines described hereinbelow for those purposes; reschedule all activity segments on the chart using the routine previously described for this purpose, starting at priority 0; evaluate the time limits and update the time-limit threat levels for all rescheduled activities, using the routines previously described for that purpose; redraw the chart.

If a chart is assigned to a different user (for example, and without limitation, CHART.USERID is changed), this may cause the chart to acquire a different set of global settings, since these settings may be tied to both a user and a chart in the USERCHARTSETTING table. To respond to this action, the system 100 may carry out the following steps within a single transaction: update the PreBufUtc and PostBufUtc attributes of any appointments in which the respective global appointment-buffer-length setting is not overridden and which have an EndUtc greater (later) than the chart's NowUtc marker; update the PostBeginBufUtc and PreEndBufUtc attributes of any work intervals in which the respective global work-interval-buffer-length setting is not overridden and which have an EndUtc greater (later) than the chart's NowUtc marker, and update the work intervals' NextPostBeginBufUtc attributes, starting with the work interval immediately preceding the earliest work interval having an EndUtc greater than the chart's NowUtc marker, and proceeding through to the last work interval; remove, or calculate and apply, an Adjustment Experience Factor (AEF) and/or Interruption Experience Factor (IEF) to the RemainingEffortInMin attributes of the not-yet-executed activities on the chart in accordance with the option to apply the respective factor, using the routines described hereinbelow for those purposes; reschedule all activity segments on the chart using the routine previously described for this purpose, starting at priority 0; evaluate the time limits and update the time-limit threat levels for all rescheduled activities, using the routines previously described for that purpose; redraw the chart.

If the user issues a command to indicate that an interruption should now begin, the chart may enter interruption mode, carrying out the following steps within a single transaction: check whether the previous mode was interruption—if so, exit with a success code; update the chart's CurrentMode attribute to INTERRUPTION; insert an interruption into the database having the following attributes: ExecutionStatus=EXECUTING, BeginUtc=the chart's current NowUtc value, EndUtc=the chart's current NowUtc value, LenInMin=0 (this may increase as the NowUtc pointer advances in interruption mode), EffortInMin=0, DisplacedActyEffortInMin=number of minutes of activity segments on the chart that fall within the range between the chart's current NowUtc value and the UTC time calculated by adding the post-interruption buffer to NowUtc, using the routine previously described for calculating scheduled activity effort within a time range; reschedule all activity segments on the chart using the routine previously described for this purpose, starting at priority 0; evaluate the time limits and update the time-limit threat levels for all rescheduled activities, using the routines previously described for that purpose; redraw the chart. Rescheduling all activity segments upon entering interruption mode may be necessary because the post-interruption buffer may immediately affect the timing of activities.

If the user issues a command to indicate that the chart should enter frozen mode (to prevent the Now line from advancing), the system 100 may carry out the following steps within a single transaction: check whether the previous mode was frozen—if so, exit with a success code; update the chart's CurrentMode attribute to FROZEN.

If the user issues a command to indicate that the chart should resume normal mode, the system 100 may carry out the following steps within a single transaction: check whether the previous mode was normal—if so, exit with a success code; update the chart's CurrentMode attribute to NORMAL; if there is an interruption in status EXECUTING, update its status to EXECUTED; if an activity in the SCHEDULED state at priority 0 is touching the Now line, update its status to EXECUTING.

While a user's application client for a given chart is logged on to the server or database, the resource client 130 may periodically submit a command to the server or database to advance the chart's Now line (i.e. the chart's NowUtc attribute) to the current UTC date and time; this may be done every several minutes and may be made parameterizable. It may also be possible for the user to issue a spontaneous command to force the Now pointer to advance to the current UTC date and time. Whenever the command to advance the Now line occurs, the system 100 may carry out the following steps within a single transaction: advance the chart's NowUtc pointer, using the routine previously described for this purpose; evaluate the time limits and update the time-limit threat levels for all rescheduled activities, using the routines previously described for that purpose; redraw the chart.

To allow the user to enter an interruption onto the chart that began in the past, in accordance with the corresponding variants listed in FIGS. 5A through 5D, a routine may be used having the following input and output parameters (for example, and without limitation, the input parameters may be set in accordance with the options chosen in the dialog shown in FIG. 4): input: chart ID (identifier of the chart into which the interruption should be inserted); input: cause (short text describing the source or cause of the interruption); input: starting time (UTC time at which the interruption began); input: ending time (UTC time at which the interruption ended; NowUtc if it has not ended); input: flag indicating whether the chart should enter and remain in interruption mode after the interruption is created; input: flag indicating whether past activity effort falling within the time span of the interruption should be redistributed to the portion of the chart following the interruption; output: result (success or error code indicating whether the operation succeeded). For example, and without limitation, high-level pseudocode describing such a routine may be as shown in FIG. 48.

After performing this operation, the system 100 may: evaluate the time limits and update the time-limit threat levels for all rescheduled activities, using the routines previously described for that purpose; redraw the chart. The interruption-creation operation and the above steps may all be carried out within a single transaction.

If a user's application client has been offline or otherwise disconnected from the server or database for an unusually long time, for example, and without limitation, 15 minutes or more, then when the user logs on again or the connection has been reestablished and the user wishes to display a chart assigned to the user, the user may have the option of allowing the NowUtc pointer to advance from its most recent value to the current UTC time in either a temporary interruption mode, which may cause all portions of activities after the previous NowUtc time that had not yet been executed to be displaced into the future (past the new NowUtc time), or in normal mode, which may cause the portions of activities falling between the previous and the new NotUtc time to be marked with the execution status EXECUTED; as a further option in this situation, the system 100 may allow the user to put the chart into frozen mode. For example, and without limitation, high-level logic describing this behavior may be as shown in FIG. 49.

If the user adds, edits or removes any time-limit settings for an activity that has not yet been completely executed, the system 100 may carry out the following steps within a single transaction: update the time-limit settings of the activity on the database; evaluate the time limits and update the time-limit threat levels for the activity, using the routines previously described for that purpose; redraw the chart or, as an optimization, just redraw the part of the chart pertaining to the activity whose time limits were changed.

Variants of the system 100 which allow the user to define time limits by reference to events on other charts may periodically reevaluate the time limits of the not-yet-executed activities within a chart while it is being displayed; this may be accomplished by polling or by reacting to database-change events responding to INSERTs, UPDATEs or DELETEs in the ACTIVITY or APPOINTMENT table, if the database system supports such a mechanism (the event handler may need to check if the updated ACTIVITY or APPOINTMENT entry is referenced in the TargetActyId or TargetApptId of the time limits defined for the displayed chart's unexecuted activities and, if so, respond as described below). When polling or handling such a database-change event, the system 100 may carry out the following steps within a single transaction: evaluate the time limits and update the time-limit threat levels for each not-yet-executed activity on the displayed chart, using the routines previously described for that purpose; redraw the chart. As an optimization the system 100 may refrain from redrawing the chart if it determines that no threat-level values have changed since the displayed chart's time limits were last evaluated.

After an operation occurs that causes work intervals, appointments, activities or interruptions to be changed so that the chart may need to be redrawn, for example, and without limitation, the logic shown in FIGS. 50A and 50B may be applied to output them to the frame (2008) for display.

To simplify the drawing operation described above, an SQL query like that shown in FIGS. 26A and 26B may be used to pre-calculate the horizontal offsets of work intervals, appointment segments, activity segments and interruption segments and to obtain other information needed in the above drawing logic; the p_time_utils.GetCurr-TimeUtc routine called in the query may return the current UTC time, truncated to the most recent whole minute (without seconds or fractional seconds). The query in FIGS. 26A and 26B may output information like that shown in FIG. 27. As an alternative to drawing shapes on a surface representing event segments, the system 100 may create and embed user-interface controls into the viewing frame, using the coordinates derived as described in the above logic; such controls may respond to mouse clicks and allow the user to perform in-place editing of event attributes more easily.

As part of redrawing the chart after evaluating its activities' time limits and updating their time-limit threat levels, the system 100 may draw applicable time-limit threat-level indicators and time-limit handles if the user has chosen the option to do so. To do this, the system 100 may query the maximum threat level that has been calculated for each given activity that is displayed on the chart and has an execution status of SCHEDULED or EXECUTING; if the maximum time-limit threat for an activity is >0, a symbol, character or other indicator representing the relative threat level (THREAT_WARNING_LOW, THREAT_WARNING_HIGH, THREAT_VIOLATION_LOW, THREAT_VIOLATION_HIGH) may be displayed next to the activity's name in the to-do list and/or next to the earliest (leftmost) or latest (rightmost) segment of the activity displayed in Lanes ≥0 on the chart. The drawing coordinates for the symbol may be calculated using the coordinate-calculation procedures described previously in regards to calculation of horizontal and vertical pixel coordinates on the chart, taking the BeginUtc or EndUtc and the lane number (priority) of the respective activity segment in the list of chart objects to be displayed (cf. FIGS. 26 and 27) as the reference point relative to which the threat indicator on the chart should be shown. Alternatively, a warning color or other visual indication of the relative threat level may be used when drawing the to-do list, lane, activity bar or other object for an activity on the chart.

The system 100 may allow the user to display time-limit handles corresponding to one or more time-limit rule types (for example, and without limitation, for all time-limits where ACTYTIMELIMIT.RULE='FBBP' or 'FBD') for all activities that are displayed on the chart and have an execution status of SCHEDULED or EXECUTING. A handle for an activity's time limit may be drawn so that it extends from the start (BeginUtc, if ACTYTIMELIMIT.RULE starts with 'S', i.e. is one of the "start . . . " rules) of the earliest activity segment having status SCHEDULED, or the end (EndUtc, if ACTYTIMELIMIT.RULE starts with 'F', i.e. is one of the "finish . . . " rules) of the latest activity segment having status SCHEDULED, to the x-coordinate to which ACTYTIMELIMIT.LimitUtc is mapped on the work-interval timeline, using the coordinate-calculation procedures described previously in regards to calculation of horizontal and vertical pixel coordinates on the chart. If a time-limit to which a handle would extend is not represented on the chart (for example if it lies between two work intervals), the handle may extend from the activity to the point between the activity and the limit that is furthest from the activity but is still represented on the chart; such a handle may be tipped with an arrowhead or other means of indicating that the limit actually extends further than depicted. If the activity for which a time-limit handle is being drawn has several time limits of the same rule type for which the user has chosen to display handles, then the handle for the time limit lying closest to the activity may be given precedence.

If the user has chosen to activate the Adjustment Experience Factor (AEF) and/or Interruption Experience Factor (IEF) functionality, the system 100 may periodically calculate these factors from the activities and interruptions over a parameterizable time range in the past and apply them to the RemainingEffortInMin attribute of all activities having priority ≥0. To calculate a chart's AEF, a routine may be used having the following input and output parameters: input: chart ID (identifier of the chart for which the AEF is to be calculated); input: starting time (the earliest UTC time point of the range over which activities should be examined); input: ending time (the latest UTC time point of the range over which activities should be examined); output: AEF (the calculated AEF); output: result (success or error code indicating whether the operation succeeded). The routine may examine all activities having BeginUtc ≥ the input starting time and EndUtc ≥ the input ending time and may calculate the ratio of the total actual effort spent on those activities to the original estimated effort for them. The routine may then aggregate these values in different ways, for example, and without limitation, by calculating the average ratio of estimated to actual effort per activity or instead by summing the actual effort of all activities and dividing it by the total estimated effort for all activities. The routine may also update the chart's LastCalcAEF attribute.

To apply a chart's AEF to the activities scheduled on a chart, a routine may be used having the following input and output parameters: input: chart ID (identifier of the chart to which the AEF is to be applied); input: AEF (the AEF to be applied); output: result (success or error code indicating whether the operation succeeded). The routine may iterate through all activities that are scheduled for the future, remove any AEF that has previously been applied to those activities (using the logic described in the next paragraph), multiply those activities' RemainingEffortInMin attribute by the new AEF, set the activities' Applied_AEF attribute to the new AEF value, reschedule the activities, and evaluate their time limits and threat levels using the routines previously described for that purpose.

To remove any AEF that has previously been applied to the activities that are scheduled for the future on a chart, a routine may be used having the following input and output parameters: input: chart ID (identifier of the chart from which the AEF is to be removed); input: rescheduling flag (boolean value indicating whether future scheduled activities should be rescheduled after the AEF has been removed); output: result (success or error code indicating whether the operation succeeded). The routine may divide the RemainingEffortInMin attribute of all activities on the chart that are scheduled for the future by the AEF that was previously applied to those activities, if any, and reset those activities' Applied_AEF attribute to 1.0; if the rescheduling flag indicates that rescheduling should be performed, the routine may also reschedule the activities and evaluate their time limits and threat levels using the routines previously described for that purpose.

Similarly, to calculate a chart's IEF, a routine may be used having the following input and output parameters: input: chart ID (identifier of the chart for which the IEF is to be calculated); input: starting time (the earliest UTC time point of the range over which activities should be examined); input: ending time (the latest UTC time point of the range over which activities should be examined); output: IEF (the calculated IEF); output: result (success or error code indicating whether the operation succeeded). The routine may then estimate or calculate the extent to which activities between the input starting time and the input ending time have been delayed by interruptions, and may also update the chart's LastCalcIEF attribute. An estimation may be done, for example, and without limitation, by determining the amount of working time that had been potentially available for scheduling of activities over the given time range (by summing the LenInMin attributes of work intervals lying within that range and then subtracting from it the number of minutes falling within the pre-appointment and post-appointment buffer ranges and the number of minutes falling within the post-work-interval-begin and pre-work-interval-end buffers), then adding to it the number of minutes of interruption that have occurred within the intervals that were potentially available for scheduling, then dividing the sum by the amount of potentially available working time that was determined in the first step. Alternatively, a more precise calculation may be done, for example, and without limitation, by summing the DisplacedActyEffortInMin values of interruptions lying within the specified time range, adding that sum to the total effort actually expended on activities within the time range, and dividing the result by the total effort expended on activities as determined in the second step.

To apply a chart's IEF to the activities scheduled on a chart, a routine may be used having the following input and output parameters: input: chart ID (identifier of the chart to which the IEF is to be applied); input: IEF (the IEF to be applied); output: result (success or error code indicating whether the operation succeeded). The routine may iterate through all activities that are scheduled for the future, remove any IEF that has previously been applied to those activities (using the logic described in the next paragraph), multiply those activities' RemainingEffortInMin attribute by the new IEF, set the activities' Applied_IEF attribute to the new IEF value, reschedule the activities, and evaluate their time limits and threat levels using the routines previously described for that purpose.

To remove any IEF that has previously been applied to the activities that are scheduled for the future on a chart, a routine may be used having the following input and output parameters: input: chart ID (identifier of the chart from which the IEF is to be removed); input: rescheduling flag (boolean value indicating whether future scheduled activities should be rescheduled after the IEF has been removed); output: result (success or error code indicating whether the operation succeeded). The routine may divide the RemainingEffortInMin attribute of all activities on the chart that are scheduled for the future by the IEF that was previously applied to those activities, if any, and reset those activities' Applied_IEF attribute to 1.0; if the rescheduling flag indicates that rescheduling should be performed, the routine may also reschedule the activities and evaluate their time limits and threat levels using the routines previously described for that purpose.

Embodiments of the present invention are described herein in the context of a system of computers, servers, and software. Those of ordinary skill in the art will realize that the embodiments of the present invention described above are provided as examples, and are not intended to be limiting in any way. Other embodiments of the present invention will readily suggest themselves to such skilled persons having the benefit of this disclosure.

A skilled artisan will note that one or more of the aspects of the present invention may be performed on a computing device. The skilled artisan will also note that a computing device may be understood to be any device having a processor, memory unit, input, and output. This may include, but is not intended to be limited to, cellular phones, smart phones, tablet computers, laptop computers, desktop computers, personal digital assistants, etc. FIG. 28 illustrates a model computing device in the form of a computer 810, which is capable of performing one or more computer-implemented steps in practicing the method aspects of the present invention. Components of the computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI).

The computer 810 may also include a cryptographic unit 825. Briefly, the cryptographic unit 825 has a calculation function that may be used to verify digital signatures, calculate hashes, digitally sign hash values, and encrypt or decrypt data. The cryptographic unit 825 may also have a protected memory for storing keys and other secret data. In other embodiments, the functions of the cryptographic unit may be instantiated in software and run via the operating system.

A computer 810 typically includes a variety of computer readable media. Computer readable media can be any available media that can be accessed by a computer 810 and includes both volatile and nonvolatile media, removable and non-removable media. By way of example, and not limitation, computer readable media may include computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 28 illustrates an operating system (OS) 834, application programs 835, other program modules 836, and program data 837.

The computer 810 may also include other removable/non-removable, volatile/nonvolatile computer storage media. By way of example only, FIG. 28 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives, and their associated computer storage media discussed above and illustrated in FIG. 28, provide storage of computer readable instructions, data structures, program modules and other data for the computer 810. In FIG. 28, for example, hard disk drive 841 is illustrated as storing an OS 844, application programs 845, other program modules 846, and program data 847. Note that these components can either be the same as or different from OS 833, application programs 833, other program modules 836, and program data 837. The OS 844, application programs 845, other program modules 846, and program data 847 are given different numbers here to illustrate that, at a minimum, they may be different copies. A user may enter commands and information into the computer 810 through input devices such as a keyboard 862 and cursor control device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a graphics controller 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 28. The logical connections depicted in FIG. 28 include a local area network (LAN) 871 and a wide area network (WAN) 873, but may also include other networks 120. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 28 illustrates remote application programs 885 as residing on memory device 881.

The communications connections 870 and 872 allow the device to communicate with other devices. The communications connections 870 and 872 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Accordingly, the PASS 100, as illustrated and described above, may advantageously combine the following elements into a single, unified application view:

(1) an effort-scaled, serialized cascading bar chart, embodying specifically the behaviors by which temporal overlapping of activities may be automatically prevented and by which the activity bars in the chart may be automatically re-sequenced (from earlier to later) when the activities' priorities (from top to bottom in the To Do list) are changed; and inter-activity buffers which may automatically insert additional "task-switching" time between the segments of any two adjacent activities on the chart; and work-interval-boundary buffers which may automatically insert additional time between an activity segment and the boundaries of the work interval within which it is scheduled; and the use of a minimum activity segment duration which may prevent the software from scheduling periods of activity effort that are impracticably short.

(2) appointment transects, by which the scheduled effort of any activity on the chart may be automatically displaced by the scheduled effort of certain appointments with which it may overlap; and appointment-activity buffers which may automatically insert additional time between an activity and the appointment(s) that it may overlap.

(3) interruption tracking, by which the scheduled effort of activities on the chart may be displaced to a later time during or after the occurrence of an interruption; and post-interruption buffers which may automatically insert additional time between an interruption and any activity that may immediately follow or resume after it; and the ongoing calculation and application of an interruption and/or adjustment experience factor when scheduling future activities.

(4) absolute or relative (referential) time limits, with or without time offsets; and the use of colors, icons or other visual indicators that may call attention to potentially threatened or violated time limits of future activities on the chart.

(5) time-limit handles, which may graphically show the exact time pressure operating on activities on the chart and which thus may give a clear and immediate idea of the extent to which activities may be reprioritized in order to relieve this pressure, or the extent to which they may be reprioritized in order to relieve the pressure on other activities.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

APPENDIX I

The Entity Relationship Diagram, ERD, given in FIG. 13 for this exemplary implementation of the Personal Adaptive Schedule invention, called the application below, supports a system in which multiple users each have one or more charts for scheduling their respective appointments and activities. This appendix describes the ERD's entities (database tables) and their attributes (database table columns) in detail.

Attributes having "Len" (Length) in their name in the listed database tables represent the duration of a single continuous time interval in minutes.

Attributes having "Effort" in their name represent the total number of minutes that an individual spends doing something within one or more separate time intervals. For example, someone who reads the newspaper for 15 minutes today and 20 minutes tomorrow has spent a total effort of 35 minutes reading the paper.

Attributes having "Utc" in their name always store a date and time in Coordinated Universal Time (UTC). Wherever a "UTC time" is mentioned in the text that follows, a UTC date and time is meant.

Standard dot notation is used in some places to refer to the attributes of entities. For example, CHART.NowUtc refers to the NowUtc attribute of the CHART object.

Activity

This table holds the activities that have been planned or scheduled on a user's chart. Planned activities as referred to in the previous sentence are activities that do not yet have specific start and end times assigned to them; these represent activities that have not yet been scheduled. Scheduled activities are activities to which specific start and end times have been assigned.

ActyId

Primary key field; number generated by automatic sequence or by application routine.

ActyName

A short name or description for the activity.

ChartId

The chart in which the activity is planned or scheduled.

Priority

The relative precedence of the activity compared to other activities on the same chart. Possible values:
- −2: the activity has not yet been scheduled.
- −1: the activity has been completely executed,
- 0: the activity is currently executing, or its execution is immediately pending.
- 1 . . . N: the activity is scheduled at the respective later priority after the currently executing activity.

The Priority attribute determines in part where activities appear on the chart. Activities with priority −2 are located in the "work queue" list; these are activities which the user intends to do at some point in the future but has not yet scheduled. Activities with priority −1 have completely executed and appear entirely to the left (i.e., temporally-precedent) of the Now line (the chart's time cursor, NowUtc) in the execution lane. Activities with priority 0 are located either in the first lane below the execution lane to the right (i.e., temporally-subsequent) of the Now line, or in both the execution lane and the first lane below it, with one or more segments of the activity appearing to the left of the Now line in the execution lane, and one or more segments of the activity appearing to the right of the Now line in the first lane below the execution lane. Activities with later priority values appear in the lanes further below, such that activities having later priority values always appear subsequent to, and below, those activities having earlier priority values.

ExecutionStatus The extent to which the activity has been executed on the chart. Possible values are:
  Unscheduled. The activity is not yet scheduled, i.e. it is in the "work queue". Activities in this state have no segments; BeginUtc and EndUtc are undefined (null).
  Scheduled. The activity is scheduled to occur in the future, i.e. one of the following conditions is true:
    the activity's Priority is >0 (this can be the case even if the activity has some already-executed segments, which can happen if the unexecuted portion of an activity has been reprioritized to a later priority after it has already started executing);
    the activity's Priority is =0 and its BeginUtc is > NowUtc (the chart's NowUtc).
  Executing. The activity is currently executing, i.e. its Priority=0, its BeginUtc is ≤NowUtc, and its EndUtc is > NowUtc; if BeginUtc=NowUtc, all of its segments are still in the state Scheduled even though the activity itself is in the state Executing; otherwise one or more of its segments is in the state Executed and one or more of its segments is in the state Scheduled.
  Executed. The activity has been completely executed, i.e. its EndUtc is ≤NowUtc and all of its segments are in the state Executed; its Priority is −1.

Begin Utc

The UTC date and time when the activity is scheduled to begin executing. This is null if the activity is not yet scheduled, i.e. ExecutionStatus is Unscheduled.

EndUtc

The UTC date and time when the activity is scheduled to finish executing. This is null if the activity is not yet scheduled, i.e. ExecutionStatus is Unscheduled.

EstdEffortInMin

User-estimated effort required to complete the activity, i.e. the total effort in minutes which the user estimates the activity would require in order to be completed if it could be performed without interruption. Until the activity starts executing, this field can be edited by the user, and the RemainingEffortInMin field is then updated simultaneously[1]; but after the activity starts executing, the user can only edit the RemainingEffortInMin field.

[1] If the APPLIED_AEF and/or APPLIED_IEF attributes are non-null and are not equal to 1.0, the value entered for EstdEffortInMin must be multiplied by the respective experience factor(s) when updating RemainingEffortInMin.

EstdEffortInMin can be compared to the effort actually spent on executing the activity (calculated as the sum of the activity's executed segments' durations) in order to analyze the relative efficiency with which the activity has been executed.

RemainingEffortInMin

The future effort in minutes that has been scheduled for the activity. Until the activity starts executing, this field's value is updated whenever EstdEffortInMin is updated[1] and is not editable by the user, although it can be indirectly influenced by applying or removing an Adjustment Experience Factor or Interruption Experience Factor to the activity; after the activity starts executing, this field can be edited by the user and is always equal to the sum of the activity's unexecuted segments' durations, i.e. the durations of the segments having ExecutionStatus=Scheduled. If RemainingEffortnMin is edited after an activity starts executing, the activity's unexecuted segments' durations are recalculated accordingly, and thus the total amount of time spent on an activity can end up being greater or less than EstdEffortInMin.

MinSegLenInMin

Minimum length of time in minutes that a continuous segment of the activity may have. If a value is assigned to this field, it overrides the chart's global MinActivitySegmentDuration setting for the individual activity.

Applied_AEF

The Adjustment Experience Factor that has most recently been applied to RemainingEffortInMin, if any.

Applied_IEF

The Interruption Experience Factor that has most recently been applied to RemainingEffortInMin, if any.

ACTYSEGMENT

This table holds the scheduled time intervals of each scheduled activity appearing on the chart. An activity segment represents a continuous, uninterrupted time interval which the user spends focusing effort on the activity of which the segment is a part. When calculating the schedule, the application maps activity segments, not the activities themselves, onto the chart's displayed work intervals; during this mapping, a single activity segment is not permitted to overlap any appointments, periods between work intervals or other activity segments on the same chart. An activity's actual effort is equal to the sum of all its segments' durations, i.e. the sum of those segments' LenInMin attributes.

ActyId

Primary key field. The activity of which this segment is a part.

SegmentNum

Primary key field; number generated by automatic sequence or by application routine, Identifier of this segment within its activity. Note that this attribute merely serves to distinguish an activity's segments from each other; it does not determine their chronological sequence within the chart (this is determined by the BeginUtc attribute).

ExecutionStatus

The extent to which the activity segment has been executed on the chart. Possible values are:

Scheduled. The activity segment has been scheduled and lies entirely within the future, i.e. it is unexecuted; its BeginUtc is NowUtc (the chart's NowUtc).

Executed. The activity segment has been completely executed; its EndUtc is ≤NowUtc. This also pertains to the segment of a currently executing activity where the segment's EndUtc=CHART.NowUtc; as the chart's time cursor (CHART.NowUtc) advances, such a segment is elongated so that its EndUtc follows the time cursor; however, since the segment always lies entirely to the left of the time cursor, i.e. does not overlap it in the sense described previously, it is always considered to be completely executed.

An activity segment's ExecutionStatus is never Executing, because the portions of the activity immediately to the left and right of the time cursor are always represented by separate segments on the database.

Begin Utc

The UTC date and time when the activity segment is scheduled to begin executing.

EndUtc

The UTC date and time when the activity segment is scheduled to finish executing.

LenInMin

The continuous length of time occupied by the activity segment, in minutes. This is equivalent to the time span from BeginUtc to EndUtc in minutes, but is stored redundantly in order to facilitate calculations of the schedule.

ACTYTIMELIMIT

This table holds the time-limit rules defining when activities should take place. The application uses the information in this table to help determine whether to display warnings to the user about approaching or violated time-limits. Each time limit is defined as a relative or absolute point in time to which a positive or negative offset (in minutes) is added in order to determine the final limit.

ActyId

Primary key field. The activity for which a time limit is defined by this rule.

ItemNum

Primary key field; number generated by automatic sequence or by application routine. Identifier of this time-limit rule among all time-limit rules for the activity. This attribute serves to distinguish an activity's time-limit rules from each other.

Rule

The kind of time limit being defined. Possible values are:

SBBY=start before the start of another activity. If Rule is set to this value, TargetActyId will normally refer to an activity in a different chart but does not have to; the target activity's BeginUtc is the referenced point in time.

SABY=start after the start of another activity. If Rule is set to this value, TargetActyId will normally refer to an activity in a different chart but does not have to; the target activity's BeginUtc is the referenced point in time.

SBEY=start before the end of another activity. If Rule is set to this value, TargetActyId will normally refer to an activity in a different chart but does not have to; the target activity's EndUtc is the referenced point in time.

SAEY=start after the end of another activity. If Rule is set to this value, TargetActyId may refer to an activity in the same chart or in a different chart; the target activity's EndUtc is the referenced point in time. When the rule refers to an activity in the same chart and the OfsInMin attribute is 0, it represents a dependency relationship: the activity for which the rule is being defined (ActyId) is considered dependent on the referenced activity (TargetActyId), and the application should prevent the user from reprioritizing the dependent activity to an earlier priority than that of the referenced activity.

FBBY=finish before the start of another activity. If Rule is set to this value, TargetActyId will normally refer to an activity in a different chart but does not have to; the target activity's BeginUtc is the referenced point in time.

FBEY=finish before the end of another activity. If Rule is set to this value, TargetActyId will normally refer to an activity in a different chart but does not have to; the target activity's EndUtc is the referenced point in time.

SBBP=start before the start of an appointment. If Rule is set to this value, TargetApptId must refer to an appointment (in the same chart or in a different chart); the target appointment's BeginUtc is the referenced point in time.

SABP=start after the start of an appointment. If Rule is set to this value, TargetApptId must refer to an appointment (in the same chart or in a different chart); the target appointment's BeginUtc is the referenced point in time.

SBEP=start before the end of an appointment. If Rule is set to this value, TargetApptId must refer to an appointment (in the same chart or in a different chart); the target appointment's EndUtc is the referenced point in time.

SAEP=start after the end of an appointment. If Rule is set to this value, TargetApptId must refer to an appointment (in the same chart or in a different chart); the target appointment's EndUtc is the referenced point in time.

FBBP=finish before the start of an appointment. If Rule is set to this value, TargetApptId must refer to an appointment (in the same chart or in a different chart); the target appointment's BeginUtc is the referenced point in time.

FBEP=finish before the end of an appointment. If Rule is set to this value, TargetApptId must refer to an appointment (in the same chart or in a different chart); the target appointment's EndUtc is the referenced point in time.

SBD=start before a fixed point in time. If Rule is set to this value, TargetDateTimeUtc is the referenced point in time and must contain a UTC date and time, SAD=start after a fixed point in time. If Rule is set to this value, TargetDateTimeUtc is the referenced point in time and must contain a UTC date and time.

FBD=finish before a fixed point in time. (This rule represents a deadline in the common understanding of the word.) If Rule is set to this value, TargetDateTimeUtc is the referenced point in time and must contain a UTC date and time.

The "start" or "finish" imperative of the above rule types always pertains to the activity for which the rule is being defined, i.e. the activity given by ActyId. For example, SBBP means "the activity given by ActyId should start before the start of an appointment."

TargetActyId

The activity whose scheduled time is referenced by the rule, if Rule is one of the xxxY values.

TargetApptId

The appointment whose scheduled time is referenced by the rule, if Rule is one of the xxxP values.

TargetDateTimeUtc

The fixed point in time (UTC) that is referenced by the rule, if Rule is one of the xxD values.

OfsInMin

A positive or negative offset, in number of minutes, relative to the point in time that is indicated by applying Rule to the referenced activity, appointment or fixed point in time. A negative OfsInMin value represents a point in time before the referenced time; a positive OfsInMin value represents a point in time after the referenced time. If the referenced point in time is fixed (corresponding to Rule=SBD, SAD or FBD), then OfsInMin will normally be 0 but does not have to be.

The time limit defined by the rule is determined by combining Rule, the referenced time and OfsInMin. In this way it is possible to define time limits such as "finish at least 2 hours before Appointment XYZ starts" (Rule=FBBP, TargetApptId=XYZ, OfsInMin=−120) or "start no earlier than 3 days after Activity ABC has finished" (Rule=SAEY, TargetActyId=ABC, OfsInMin=4320).

LimitUtc

The UTC time calculated by combining Rule, the referenced time and OfsInMin.

ThreatLevel

The relative risk that the activity for which the rule is being defined, as currently scheduled, will violate the specified time limit. Possible values are:

THREAT_NONE=0: the activity is unlikely to violate the specified time limit

THREAT_WARNING_LOW=1: the activity does not violate the limit but is starting to get close to it THREAT_WARNING_HIGH=2: the activity does not violate the limit but has gotten very close to it THREAT_VIOLATION_LOW=3: the activity violates the limit but not by very much THREAT_VIOLATION__HIGH=4: the activity severely violates the limit

APPOINTMENT

This table holds the appointments that have been scheduled on a user's chart. In contrast to activities, appointments have fixed start and end times (though the user may potentially edit them).

ApptId

Primary key field; number generated by automatic sequence or by application routine.

ApptName

A short name or description for the appointment.

ChartId

The chart in which the appointment is scheduled.

ExecutionStatus

The extent to which the appointment has been executed on the chart. Possible values are:

Scheduled. The appointment has been scheduled and lies entirely within the future, i.e. its BeginUtc is > NowUtc (the chart's NowUtc); all of the appointment's segments are in the state Scheduled.

Executing. The appointment has begun executing, i.e. its BeginUtc is ≤NowUtc and its EndUtc is > NowUtc; if BeginUtc=NowUtc, all of its segments are still in the state Scheduled even though the appointment itself is in the state Executing; otherwise one or more of its segments is in the state Executed and one or more of its segments is in the state Scheduled.

Executed. The appointment has been completely executed, i.e. its EndUtc is ≤NowUtc; all of its segments are in the state Executed.

BeginUtc

The UTC date and time when the appointment is scheduled to begin executing.

EndUtc

The UTC date and time when the appointment is scheduled to finish executing.

LenInMin

The continuous length of time occupied by the appointment, in minutes. This is equivalent to the time span from BeginUtc to EndUtc in minutes, but is stored redundantly in order to facilitate calculations of the schedule.

EffortInMin

The scheduled length of time occupied by the appointment, in minutes. This is equivalent to the time span from BeginUtc to EndUtc in minutes, minus any portion of the appointment that would fall within the time span between two work intervals. Also, an appointment's EffortInMin is equal to the sum of all its segments' durations, i.e. the sum of those segments' LeninMin attributes.

PreBufLenInMin

Length (in minutes) of the time span immediately prior to the appointment (BeginUtc) during which no activity segments should be scheduled. If a value is assigned to this field, it overrides the chart's global PreAppointmentBuffer setting for the individual appointment.

PreBufUtc

The starting point, in UTC time, of the time span immediately prior to the appointment during which no activity segments should be scheduled. It is equal to BeginUtc minus PreBufLenInMin.

PostBufLenInMin

Length (in minutes) of the time span immediately following the appointment (EndUtc) during which no activity segments should be scheduled. If a value is assigned to this field, it overrides the chart's global PostAppointmentBuffer setting for the individual appointment.

PostBufUtc

The stopping point, in UTC time, of the time span immediately following the appointment during which no activity segments should be scheduled. It is equal to EndUtc plus PostBufLenInMin.

Suppress Transect

Indicates whether the appointment should be considered when scheduling activities that would overlap the appointment's time range between PreBufUtc and PostBufUtc. If it is set to False (=0), which is the default, the appointment's time ranges should be respected when calculating the time spans that are available for activities. If it is set to True (=1), the appointment's time ranges should be ignored during this calculation, and the appointment should only be displayed in the execution lane, without a related transect appearing in the overlapping activity's priority lane.

APPTSEGMENT

This table holds the scheduled time intervals of each appointment appearing on the chart. An appointment segment represents a continuous, uninterrupted time interval scheduled on the chart between the appointment's start and end times. When calculating the schedule, the application maps appointment segments, not the appointments themselves, onto the chart's displayed work intervals; during this mapping, appointment segments are permitted to overlap other appointment segments on the same chart but may not occupy the periods between work intervals. If the appointment falls entirely within a work interval (the usual case), then the appointment will have only a single appointment segment whose length in minutes is equal to that of the appointment; if an appointment extends from one work interval into another, then the appointment will have at least two segments, with each segment appearing entirely within its respective work interval; if any part of an appointment lies between two work intervals, then the appointment's LenInMin attribute will be greater than the sum of the appointment's segments' LenInMin attributes.

ApptId

Primary key field. The appointment of which this segment is a part.

SegmentNum

Primary key field; number generated by automatic sequence or by application routine. Identifier of this segment within its appointment. Note that this attribute merely serves to distinguish an appointment's segments from each other; it does not determine their chronological sequence within the chart (this is determined by the BeginUtc attribute).

ExecutionStatus

The extent to which the appointment segment has been executed on the chart. Possible values are:

Scheduled. The appointment segment has been scheduled and lies entirely within the future, i.e. it is unexecuted; its BeginUtc is ≥NowUtc (the chart's NowUtc).

Executed. The appointment segment has been completely executed; its EndUtc is ≤NowUtc. This also pertains to the segment of a currently executing appointment where the segment's EndUtc=CHART.NowUtc; as the chart's time cursor (CHART.NowUtc) advances, such a segment is elongated so that its EndUtc follows the time cursor; however, since the segment always lies entirely to the left of the time cursor, i.e. does not overlap it in the sense described previously, it is always considered to be completely executed.

An appointment segment's ExecutionStatus is never Executing, because the portions of the appointment immediately to the left and right of the time cursor are always represented by separate segments on the database.

Begin Utc

The UTC date and time when the appointment segment is scheduled to begin executing.

EndUtc

The UTC date and time when the appointment segment is scheduled to finish executing.

LenInMin

The continuous length of time occupied by the appointment segment, in minutes. This is equivalent to the time span from BeginUtc to EndUtc in minutes, but is stored redundantly in order to facilitate calculations of the schedule.

Chart

A chart holds the events (activities, appointments and interruptions) that have been planned or scheduled for a single user. A user normally has one main chart, but s/he may also have several other charts for different purposes, such as trying out different possible variants of a schedule or managing private activities (outside of the work environment).

ChartId

Primary key field; number generated by automatic sequence or by application routine.

UserId

The owner of the chart, i.e. the user whose events are scheduled in the chart. A chart must have an owner but can be reassigned to a different owner from its original one.

CurrentMode

The current operation mode of the chart, i.e. normal, frozen or interruption. The CurrentMode determines whether the chart's time cursor (NowUtc) advances and how events on the chart are adjusted when that happens, as follows:

normal: time cursor advances to the current time (rounded down to the most recent minute), causing resegmentation of events that overlap the time interval between the time cursor's previous value (PrevNowUtc) and its new value (NowUtc).

frozen: time cursor does not advance.

interruption: when the time cursor advances, an interruption segment is inserted between the time cursor's previous value and its new value (if interruption mode commenced within that time interval) or is extended from the time cursor's previous value to its new value (if the chart had already been in interruption mode at the time cursor's previous position); subsequent activity segments are rescheduled accordingly.

PrevNowUtc

The UTC time to which the chart's time cursor (NowUtc) pointed immediately before advancing to its current position, i.e. the value of NowUtc immediately before NowUtc's most recent update.

NowUtc

The most recent UTC time to which the chart's time cursor has advanced. During a normal user session, NowUtc is updated periodically (every several minutes); therefore, it either represents the current time or a very recent point in time, and it corresponds to the position of the "Now" line on the chart, adjusted for the locale (time zone) of the work interval which the "Now" line currently transects.

LastCalcAEF

The Adjustment Experience Factor most recently calculated for the chart.

LastCalcIEF

The Interruption Experience Factor most recently calculated for the chart,

Chartuser

This table holds the persons whose activities, appointments and interruptions are scheduled in charts.

UserId

Primary key field; number generated by automatic sequence or by application routine.

UserName

The user's name.

Interruption

This table holds the interruptions that have occurred on a user's chart.

InterrupId

Primary key field; number generated by automatic sequence or by application routine.

Cause

A short description of the cause of the interruption.

ChartId

The chart in which the interruption occurs.

ExecutionStatus

The extent to which the interruption has been executed on the chart, Possible values are:

Executing. The interruption is currently taking place; its EndUtc=NowUtc (the chart's NowUtc) and the chart is in interruption mode.

Executed. The interruption has ended; its EndUtc is ≤NowUtc.

BeginUtc

The UTC date and time when the interruption started.

EndUtc

The most recent value of the chart's time cursor (CHART.NowUtc) if the interruption is still executing, or the UTC date and time when the interruption ended if it has already finished executing.

LenInMin

The continuous length of time occupied by the interruption, in minutes. This is equivalent to the time span from BeginUtc to EndUtc in minutes, but is stored redundantly in order to facilitate calculations of the schedule.

EffortInMin

The scheduled length of time occupied by the interruption, in minutes. This is equivalent to the time span from BeginUtc to EndUtc in minutes, minus any portion of the interruption that falls within the time span between two work intervals if the interruption extends over the boundary of a work interval. An interruption's EffortInMin is equal to the sum of all its segments' durations, i.e. the sum of those segments' LenInMin attributes.

PostBufLenInMin

Length (in minutes) of the time span immediately following the interruption (EndUtc) during which no activity segments should be scheduled. If a value is assigned to this field, it overrides the chart's global PostInterruptionBuffer setting for the individual interruption.

DisplacedActyEffortInMin

The number of minutes of activity-related effort that have been displaced so far due to the interruption. This is updated whenever the interruption is extended (such as when the chart's NowUtc pointer is advanced while the chart is in interruption mode).

INTERRUPSEGMENT

This table holds the scheduled time intervals of each interruption appearing on the chart. An interruption segment represents a continuous time interval scheduled on the chart between the interruption's start and end times. When calculating the schedule, the application maps interruption segments, not the interruptions themselves, onto the chart's displayed work intervals; during this mapping, interruption segments are permitted to overlap appointment segments on the same chart but may not occupy the periods between work intervals. If the interruption falls entirely within a work interval (the usual case), then the interruption will have only a single interruption segment whose length in minutes is equal to that of the interruption; if an interruption extends from one work interval into another, then the interruption will have at least two segments, with each segment appearing entirely within its respective work interval; if any part of an interruption lies between two work intervals, then the interruption's LenInMin attribute will be greater than the sum of the interruption's segments' LenInMin attributes. In contrast to appointment segments and activity segments, interruption segments do not have an ExecutionStatus attribute; this is because interruption segments are always executed, since their EndUtc is never later than the chart's NowUtc value.

InterrupId

Primary key field. The interruption of which this segment is a part.

SegmentNum

Primary key field; number generated by automatic sequence or by application routine. Identifier of this segment within its interruption. Note that this attribute merely serves to distinguish an interruption's segments from each other; it does not determine their chronological sequence within the chart (this is determined by the BeginUtc attribute).

Begin Utc

The UTC date and time when the interruption segment began executing.

EndUtc

The UTC date and time when the interruption segment ended; this may be no later than the most recent value of the chart's time cursor (CHART.NowUtc), though it can be equal to it.

LenInMin

The continuous length of time occupied by the interruption segment, in minutes. This is equivalent to the time span from BeginUtc to EndUtc in minutes, but is stored redundantly in order to facilitate calculations of the schedule.

TIMELOCALE

This table holds the time-zone locales needed by the application for converting between UTC dates/times and local dates/times. A time-zone locale implies a time zone as well as rules governing when (and whether) that time zone enters and exits Daylight Savings Time. The actual conversion functionality can be provided by the database system, the operating system or third-party libraries; this table maps the time-zone locales used in the application to the native time-zone locale identifiers used by the database, operating system or third-party libraries that perform the actual inter-time-zone conversions.

The table of time locales represents core master data that should be deployed with the application.

LocaleId

Primary key field. Identifier of the time-zone locale (referenced by other tables' foreign keys)

LocaleName

User-friendly name for the time-zone locale, used for display in the application window and dialogs.

LocaleStrKey

The native string identifier used by the operating system, database system or third-party date/time calculation library when converting between UTC dates/times and dates/times in the time-zone locale, if the system or library uses strings for this purpose. For example, if Oracle® 11g were used to provide the date/time-conversion functionality, then this column would hold the Oracle® time zone region (example: 'US/Central') whose rules correspond to the rules for the time-zone locale specified by LocaleId, since Oracle® uses string identifiers for these regions.

LocaleNumKey

The native numeric identifier used by the operating system, database system or third-party date/time calculation library when converting between UTC dates/times and dates/times in the time-zone locale, if the system or library uses numbers for this purpose.

USERCHARTSETTING

This table holds global settings (such as standard buffer durations) for a single chart owned by a user.

UserId

Primary key field. The user to whose chart the setting identified by SettingName should be applied if the specified chart is currently assigned to this user.

ChartId

Primary key field. The chart to which the setting identified by SettingName should be applied if this chart is currently assigned to the specified user.

SettingName

Primary key field. The name of the global setting for the specified user and chart. Possible settings are:

PostWorkIntervalBeginBuffer: minimum amount of time in minutes that should be inserted between the start time of a work interval and the segment of any activity which immediately follows it, PreWorkIntervalEndBuffer: minimum amount of time in minutes that should be inserted between the end time of a work interval and the segment of any activity which immediately precedes it, PreAppointmentBuffer: minimum amount of time in minutes that should be inserted between the start time of an appointment and the segment of any activity which immediately precedes it.

PostAppointmentBuffer: minimum amount of time in minutes that should be inserted between the end time of an appointment and the segment of any activity which immediately follows it.

PostActivityBuffer: minimum amount of time in minutes that should be inserted between the end time of an activity and the first segment of the (next-lower-priority) activity which immediately follows it, PostInterruptionBuffer: minimum amount of time in minutes that should be inserted between the end time of an interruption and the segment of any activity which immediately follows it.

MinActivitySegmentDuration: minimum length of time in minutes that a continuous segment of an activity may have.

ApplyAEF: whether an adjustment experience factor (AEF) should be applied when scheduling activities: 1=apply AEF, 0=do not apply AEF ApplyIEF: whether an interruption experience factor (IEF) should be applied when scheduling activities: 1=apply IEF, 0=do not apply IEF Setting Value The setting's numeric value.

WORKINTERVAL

This table holds the time intervals in a chart during which the user may focus effort on work, and it represents the date and time windows that are displayed on the application main screen. Its entries are initially generated automatically by the application, when a chart is first created or whenever the application attempts to schedule events past the last work interval that currently exists; the user can also add, remove or adjust the start time or end time of future work intervals. No two work intervals may overlap.

Each row in the table represents a single continuous span of time available for working in a given locale (time zone) on a particular date or dates.

ChartId

Primary key field. The chart to which the work interval belongs, i.e. the chart for which the work interval constitutes part of the scheduling timeline.

WorkIntervalId

Primary key field; number generated by automatic sequence or by application routine. A unique identifier for this work interval within the specified chart. (This field is used instead of BeginUtc as a primary-key attribute so that the interval's BeginUtc can be adjusted by the user without the application's having to delete and then reinsert the work interval.)

LocaleId

The time-zone locale for which the work interval is valid. When the application displays the work interval in the timeline on the screen, the date(s) and times occupied by the work interval—which are stored in UTC time—are translated into the corresponding local date(s)/times for the specified locale.

Begin Utc

The UTC date and time when the work interval begins.

PostBeginBufLenInMin

Length (in minutes) of the time span starting at the start of the work interval, during which no activity segments should be scheduled. If a value is assigned to this field, it overrides the chart's global PostWorkIntervalBeginBuffer setting for the individual work interval.

PostBeginBufUtc

The UTC time when the user actually expects to commence work during the work interval; normally this lies several minutes after the start of the work interval. The field holds a UTC date and time representing a time point that is N minutes after BeginUtc, where N is PostWorkIntervalBeginBuffer minutes (global setting) by default or instead has been individually overridden by the user in the work interval's PostBeginBufLenInMin attribute. This is updated for all future work intervals whenever PostWorkIntervalBeginBuffer is changed, to the extent that this setting has not been overridden in those work intervals.
PreEndBufLenInMin Length (in minutes) of the time span starting immediately before the end of the work interval (EndUtc), during which no activity segments should be scheduled. If a value is assigned to this field, it overrides the chart's global PreWorkIntervalEndBuffer setting for the individual work interval.
PreEndBufUtc The UTC time when the user actually expects to stop working during the work interval; normally this lies several minutes before the end of the work interval. The field holds a UTC date and time representing a time point that is N minutes before EndUtc, where NA is PreWorkIntervalEndBuffer minutes (global setting) by default or instead has been individually overridden by the user in the work interval's PreEndBufLenInMin attribute. This is updated for all future work intervals whenever PreWorkIntervalEndBuffer is changed, to the extent that this setting has not been overridden in those work intervals.
EndUtc The UTC date and time when the work interval ends.
LenInMin The continuous length of time occupied by the work interval, in minutes. This is equivalent to the time span from BeginUtc to EndUtc in minutes, but is stored redundantly in order to facilitate calculations of the schedule.
NextBeginUtc The UTC date and time when the next work interval begins; it is always identical to the next work interval's BeginUtc attribute. It is null only if the current work interval is the latest one that has been generated so far for the chart.
NextPostBeginBufUtc The UTC time when the user expects to commence work during the next work interval. It is null only if the current work interval is the latest one that has been generated so far for the chart. This attribute is redundant to the next work interval's PostBeginBufLUtc value but simplifies and speeds up SQL queries that are needed for finding available working times for scheduling events on the chart.
WORKINTERVALDEFINITION This table holds the rules for automatically generating new work intervals in a chart, Each row in the table represents the working times (starting clock-time and duration) to be generated for each weekday in a specified locale, starting at a specified date and time. When the application needs to generate new work intervals (in the WORKINTERVAL table) in order to be able to schedule events, it uses these rules to determine the default locale and times for those work intervals.
ChartId Primary key field. The chart for which the rule should be applied when generating new work intervals.
BeginUtc Primary key field. The UTC date and time at which the application should start applying the rule in this table row when automatically generating new work intervals. Whenever it needs to generate new work intervals, the application must apply the WORKINTERVALDEFINITION rule having the most recent WORKINTERVALDEFINITION.BeginUtc value on or before those generated work intervals' WORKINTERVAL.BeginUtc values.

For example, if a user enters a rule specifying that starting at 11:00 PM, Aug. 8, 2015, in the Eastern Time Zone, work on Tuesdays within that time zone should begin at 9:00 AM and continue for 9 hours, then the chart will store the UTC time in BeginUtc that is equivalent to 11:00 PM, Aug. 8, 2015, Eastern Time Zone, i.e. 3:00 AM, Aug. 9, 2015, UTC. The first time on or after 3:00 AM, Aug. 9, 2015, UTC, when 9:00 AM occurs on a Tuesday within the Eastern Time Zone is at 1:00 PM, Aug. 11, 2015, UTC. The first work interval generated for a Tuesday according to this rule will therefore have a WORKINTERVAL.BeginUtc attribute of 1:00 PM, Aug. 11, 2015, UTC, and a WORKINTERVAL.EndUtc attribute of 10:00 PM, Aug. 11, 2015, UTC.

If the application needs to generate new work intervals having a WORKINTERVAL.BeginUtc attribute on or after a given UTC time of x, then the application should apply the rule having the latest WOtkINTERVALDEFINITIOIN.BeginUtc on or before x; in other words, this rule supplants any rule having an earlier WORKINTERVALDEFINITION.BeginUtc value.
LocaleId The time zone to be associated with the work intervals generated by the rule. (This governs how the times in the work interval are displayed on the user's screen.)
SunBeginTime Local clock time within the specified locale when work starts on a Sunday, in number of minutes after midnight. For example, 540 (minutes)=9:00 AM. Null if no work is done on Sundays.
SunLenInMin Duration of the working day on Sundays, in minutes. Null if no work is done on Sundays.
MonBeginTime Local clock time within the specified locale when work starts on a Monday, in number of minutes after midnight. Null if no work is done on Mondays.
MonLenInMin Duration of the working day on Mondays, in minutes. Null if no work is done on Mondays,
(Analogous Table Attributes for the Remaining Days of the Week)

TuesBeginTime, TuesLenInMin, WedBeginTime, WedLenInMin, ThuBeginTime, ThuLenInMin, FriBeginTime, FriLenInMin, SatBeginTime, SatLenInMin.

That which is claimed is:

1. A computer program product embodied in a non-transitory computer readable storage medium embodying a computer program for forecasting a personal schedule; the computer program product comprising:
    a Schedule Editor Subsystem;
    a Schedule Analysis Subsystem; and
    a Report Generation Subsystem;
    wherein the Schedule Editor Subsystem is configured to receive, via a computer user interface, time management information including effort data, work event data, and time span data;
    wherein the Schedule Analysis Subsystem is configured to calculate, using the time management information, an effort-scaled Gantt-style bar chart for forecastinq effort of a resource, and characterized by
        a plurality of work intervals, each associated with the time span data, and each comprising a start time and an end time, and each having an individually sizeable time extent that is permitted, by the Schedule Analysis Subsystem, to differ from that of at least one other of the plurality of work intervals;

a timeline comprising the plurality of work intervals and excluding at least one interval of time between at least two adjacent ones of the plurality of work intervals; and a plurality of activities to be performed by the resource, each of the plurality of activities being associated with the work event data, and each comprising at least one activity bar segment, wherein each of the plurality of activity bar segments is characterized by a respective temporal extent positionable within at least one of the work intervals in the timeline, such that a position and extent of the at least one activity bar segment corresponding to an activity of the plurality of activities indicate when effort is forecasted to be focused on the activity; and wherein the Report Generation Subsystem is configured to display via a computer graphical display, the effort-scaled Gantt-style bar chart.

2. The computer program product according to claim 1 wherein the Schedule Editor Subsystem is further configured to receive a revision to one of the start time and the end time of one of the plurality of work intervals, which defines a revised work interval; and wherein the Schedule Analysis Subsystem is further configured to position the respective temporal extent of at least one of the activity bar segments within the revised work interval based on the revision.

3. The computer program product according to claim 1 wherein at least one of the plurality of work intervals is of a time-zone-specific type; wherein the Schedule Editor Subsystem is further configured to receive the time span data further comprising time zone data; wherein the Schedule Analysis Subsystem is further configured to associate the at least one of the plurality of work intervals with the time-zone data to define time-zone information; and wherein the Report Generation Subsystem is further configured to display the time-zone information on the effort-scaled Gantt-style bar chart.

4. The computer program product according to claim 1 wherein the Schedule Editor Subsystem is further configured to receive the work event data further comprising priority data;

wherein the Schedule Analysis Subsystem is further configured to calculate the Gantt-style bar chart to include a current time mark, which defines a Now line, and position a first subset of the plurality of activity bar segments temporally-subsequent to the Now line in the Gantt-style bar chart, which defines future activity bar segments, such that none of the future activity bar segments temporally overlap each other; and wherein the Report Generation Subsystem is further configured to display the Gantt-style bar chart with the future activity bar segments sequentially cascading, based on the priority data.

5. The computer program product according to claim 4 wherein the Schedule Editor Subsystem is further configured to receive a revision to the work event data of the time management information; and wherein the Schedule Analysis Subsystem is further configured to position at least one of the activity bar segments in the Gantt-style bar chart based on the revision.

6. The computer program product according to claim 4 wherein the Schedule Analysis Subsystem is further configured to position a second subset of the plurality of activity bar segments temporally-precedent to the Now line in the Gantt-style bar chart, which defines past activity bar segments; and wherein the Report Generation Subsystem is further configured to display in the Gantt-style bar chart the past activity bar segments within an execution lane.

7. The computer program product according to claim 4 wherein the Schedule Editor Subsystem is further configured to receive the effort data further comprising estimated effort data; and wherein the Schedule Analysis Subsystem is further configured to associate the estimated effort data with a second subset of the plurality of activity bar segments positioned temporally-precedent to the Now line in the Gantt-style bar chart, which defines past activity bar segments, calculate actual effort data for the past activity bar segments, calculate an adjustment experience factor (AEF), defined as an aggregate of the actual effort data for the past activity bar segments relative to the estimated effort data for the past activity bar segments, and position at least one of the future activity bar segments in the Gantt-style bar chart based on the AEF.

8. The computer program product according to claim 4 wherein the Schedule Analysis Subsystem is further configured to calculate an inter-activity buffer, defined as a task-switching time between an adjacent two of the plurality of activity bar segments, and position the inter-activity buffer between the adjacent two of the activity bar segments in the Gantt-style bar chart.

9. The computer program product according to claim 4 wherein the Schedule Editor Subsystem is further configured to receive the work event data further comprising appointment data; and wherein the Schedule Analysis Subsystem is further configured to calculate, using the appointment data, an appointment characterized by a start time and an end time, calculate an appointment transect, defined as a displacement sufficient to remove temporal overlap of the appointment with one of the future activity bar segments, which defines an appointment-displaced activity bar segment, in the Gantt-style bar chart, and position the appointment-displaced activity bar segment in the Gantt-style bar chart based on the appointment transect.

10. The computer program product according to claim 9 wherein the Schedule Analysis Subsystem is further configured to calculate an appointment-activity buffer, defined as a non-negative time span between the appointment and the appointment-displaced activity bar segment, and position the appointment-activity buffer between the appointment and the appointment-displaced activity bar segment in the Gantt-style bar chart.

11. The computer program product according to claim 10 wherein the Schedule Analysis Subsystem is further configured to temporally advance the Now line so as to position the appointment and the appointment-displaced activity bar segment temporally-precedent to the Now line in the Gantt-style bar chart; and wherein the Report Generation Subsystem is further configured to display in the Gantt-style bar chart the appointment and the appointment-displaced activity bar segment within an execution lane.

12. The computer program product according to claim 4 wherein the Schedule Editor Subsystem is further configured to receive the work event data further comprising interruption data; and
  wherein the Schedule Analysis Subsystem is further configured to
    temporally associate the interruption data with a second subset of the plurality of activity bar segments positioned temporally-precedent to the Now line in the Gantt-style bar chart, which defines past activity bar segments,
    calculate an interruption experience factor (IEF), defined as an aggregate of the interruption data for the past activity bar segments over a past time range, and
    position at least one of the future activity bar segments in the Gantt-style bar chart based on the IEF.

13. The computer program product according to claim 4 wherein the Schedule Editor Subsystem is further configured to receive the work event data further comprising interruption data; and
  wherein the Schedule Analysis Subsystem is further configured to
    calculate, using the interruption data, an interruption characterized by a start time and an end time,
    calculate an interruption bar, defined as a displacement sufficient to remove temporal overlap of the interruption with one of the future activity bar segments, which defines an interruption-displaced activity bar segment, in the Gantt-style bar chart, and
    position the interruption-displaced activity bar segment in the Gantt-style bar chart based on the interruption bar.

14. The computer program product according to claim 13 wherein the Schedule Analysis Subsystem is further configured to
  calculate a post-interruption buffer, defined as a non-negative time span between the interruption and the interruption-displaced activity bar segment, and
  position the post-interruption buffer between the interruption and the interruption-displaced activity bar segment in the Gantt-style bar chart.

15. The computer program product according to claim 14 wherein the Schedule Analysis Subsystem is further configured to temporally advance the Now line so as to position the interruption and the interruption-displaced activity bar segment temporally-precedent to the Now line in the Gantt-style bar chart; and wherein the Report Generation Subsystem is further configured to display in the Gantt-style bar chart the interruption and the interruption-displaced activity bar segment within an execution lane.

16. The computer program product according to claim 4 wherein the Schedule Analysis Subsystem is further configured to
  calculate a work-interval-boundary buffer, defined as a non-negative time span between one of the future activity bar segments, which defines a buffered activity segment, and one of the start time and the end time of one of the plurality of work intervals within which the buffered activity segment is scheduled, which defines a buffered work interval boundary, and
  position the work-interval-boundary buffer between the buffered activity segment and the buffered work interval boundary in the Gantt-style bar chart.

17. The computer program product according to claim 4 wherein the Schedule Editor Subsystem is further configured to receive the work event data further comprising time-limit data; and wherein the Schedule Analysis Subsystem is further configured to
  calculate, using the time-limit data, a time limit characterized by a time point, and associated with one of the plurality of activities, which defines a limited activity, and
  position the time limit adjacent and temporally-subsequent to one of the plurality of activity bar segments of the limited activity in the Gantt-style bar chart; and
  wherein the Report Generation Subsystem is further configured to display in the Gantt-style bar chart the time limit as a time-limit handle.

18. The computer program product according to claim 4 wherein the Schedule Editor Subsystem is further configured to receive the work event data further comprising time-limit data; and wherein the Schedule Analysis Subsystem is further configured to
  calculate, using the time-limit data, a time limit characterized by a time point, and associated with one of the plurality of activities, which defines a limited activity, and
  position the time limit adjacent and temporally-precedent to one of the plurality of activity bar segments of the limited activity in the Gantt-style bar chart; and
  wherein the Report Generation Subsystem is further configured to display in the Gantt-style bar chart the time limit as a time-limit handle.

19. The computer program product according to claim 4 wherein the Schedule Editor Subsystem is further configured to receive the work event data further comprising appointment data;
  wherein the Schedule Analysis Subsystem is further configured to calculate, using the appointment data, a plurality of appointments, each characterized by a respective start time and a respective end time;
  wherein the Schedule Editor Subsystem is further configured to receive the work event data further comprising time-limit data comprising a reference to the start time or end time of one of the plurality of appointments, which defines referential time-limit data;
  wherein the Schedule Analysis Subsystem is further configured to
    calculate, using the referential time-limit data, a referential time limit characterized by a time point, and associated with one of the plurality of activities, which defines a limited activity, and
    position the referential time limit adjacent to one of the plurality of activity bar segments of the limited activity in the Gantt-style bar chart; and
  wherein the Report Generation Subsystem is further configured to display in the Gantt-style bar chart the referential time limit as a time-limit handle.

20. A non-transitory computer readable storage medium embodying a computer program to execute a method for forecastinq a personal schedule; the method comprising:
  receiving, via a computer user interface, time management information including effort data, work event data, and time span data;
  calculating, using the time management information, an effort-scaled Gantt-style bar chart for forecastinq effort of a resource, and characterized by
    a plurality of work intervals, each associated with the time span data, and each comprising a start time and an end time, and each having an individually sizeable time extent that is permitted to differ from that of at least one other of the plurality of work intervals;

a timeline comprising the plurality of work intervals and excluding at least one interval of time between at least two adjacent ones of the plurality of work intervals; and a plurality of activities to be performed by the resource, each of the plurality of activities being associated with the work event data, and each comprising at least one activity bar segment, wherein each of the plurality of activity bar segments is characterized by a respective temporal extent positionable within at least one of the work intervals in the timeline, such that a position and extent of the at least one activity bar segment corresponding to an activity of the plurality of activities indicate when effort is forecasted to be focused on the activity; and displaying the effort-scaled Gantt-style bar chart on a computer graphical display.

21. The non-transitory computer readable storage medium according to claim 20 wherein the method further comprises receiving a revision to one of the start time and the end time of one of the plurality of work intervals, which defines a revised work interval; and positioning the respective temporal extent of at least one of the activity bar segments within the revised work interval based on the revision.

22. The non-transitory computer readable storage medium according to claim 20 wherein at least one of the plurality of work intervals is of a time-zone-specific type; wherein the method further comprises receiving the time span data further comprising time zone data, associating the at least one of the plurality of work intervals with the time-zone data to define time-zone information, and displaying the time-zone information on the effort-scaled Gantt-style bar chart.

23. The non-transitory computer readable storage medium according to claim 20 wherein the method further comprises
receiving the work event data further comprising priority data,
calculating the Gantt-style bar chart to include a current time mark, which defines a Now line,
positioning a first subset of the plurality of activity bar segments temporally-subsequent to the Now line in the Gantt-style bar chart, which defines future activity bar segments, such that none of the future activity bar segments temporally overlap each other, and
displaying the Gantt-style bar chart with the future activity bar segments sequentially cascading, based on the priority data.

24. The non-transitory computer readable storage medium according to claim 23 wherein the method further comprises receiving a revision to the work event data of the time management information, and positioning at least one of the activity bar segments in the Gantt-style bar chart based on the revision.

25. The non-transitory computer readable storage medium according to claim 23 wherein the method further comprises
positioning a second subset of the plurality of activity bar segments temporally-precedent to the Now line in the Gantt-style bar chart, which defines past activity bar segments, and
displaying in the Gantt-style bar chart the past activity bar segments within an execution lane.

26. The non-transitory computer readable storage medium according to claim 23 wherein the method further comprises
receiving the effort data further comprising estimated effort data,
associating the estimated effort data with a second subset of the plurality of activity bar segments positioned temporally-precedent to the Now line in the Gantt-style bar chart, which defines past activity bar segments,
calculating actual effort data for the past activity bar segments,
calculating an adjustment experience factor (AEF), defined as an aggregate of the actual effort data for the past activity bar segments relative to the estimated effort data for the past activity bar segments, and
positioning at least one of the future activity bar segments in the Gantt-style bar chart based on the AEF.

27. The non-transitory computer readable storage medium according to claim 23 wherein the method further comprises
calculating an inter-activity buffer, defined as a task-switching time between an adjacent two of the plurality of activity bar segments, and
positioning the inter-activity buffer between the adjacent two of the activity bar segments in the Gantt-style bar chart.

28. The non-transitory computer readable storage medium according to claim 23 wherein the method further comprises
receiving the work event data further comprising appointment data,
calculating, using the appointment data, an appointment characterized by a start time and an end time,
calculating an appointment transect, defined as a displacement sufficient to remove temporal overlap of the appointment with one of the future activity bar segments, which defines an appointment-displaced activity bar segment, in the Gantt-style bar chart, and
positioning the appointment-displaced activity bar segment in the Gantt-style bar chart based on the appointment transect.

29. The non-transitory computer readable storage medium according to claim 28 wherein the method further comprises
calculating an appointment-activity buffer, defined as a non-negative time span between the appointment and the appointment-displaced activity bar segment, and
positioning the appointment-activity buffer between the appointment and the appointment-displaced activity bar segment in the Gantt-style bar chart.

30. The non-transitory computer readable storage medium according to claim 29 wherein the method further comprises
temporally advancing the Now line so as to position the appointment and the appointment-displaced activity bar segment temporally-precedent to the Now line in the Gantt-style bar chart, and
displaying in the Gantt-style bar chart the appointment and the appointment-displaced activity bar segment within an execution lane.

31. The non-transitory computer readable storage medium according to claim 23 wherein the method further comprises
receiving the work event data further comprising interruption data,
temporally associating the interruption data with a second subset of the plurality of activity bar segments positioned temporally-precedent to the Now line in the Gantt-style bar chart, which defines past activity bar segments,
calculating an interruption experience factor (IEF), defined as an aggregate of the interruption data for the past activity bar segments over a past time range, and
positioning at least one of the future activity bar segments in the Gantt-style bar chart based on the IEF.

32. The non-transitory computer readable storage medium according to claim 23 wherein the method further comprises
receiving the work event data further comprising interruption data, calculating, using the interruption data, an interruption characterized by a start time and an end time, calculating an interruption bar, defined as a displacement sufficient to remove temporal overlap of the interruption with one of the future activity bar segments, which defines an interruption-displaced activity bar segment, in the Gantt-style bar chart, and positioning the interruption-displaced activity bar segment in the Gantt-style bar chart based on the interruption bar.

33. The non-transitory computer readable storage medium according to claim 32 wherein the method further comprises calculating a post-interruption buffer, defined as a non-negative time span between the interruption and the interruption-displaced activity bar segment, and positioning the post-interruption buffer between the interruption and the interruption-displaced activity bar segment in the Gantt-style bar chart.

34. The non-transitory computer readable storage medium according to claim 33 wherein the method further comprises temporally advancing the Now line so as to position the interruption and the interruption-displaced activity bar segment temporally-precedent to the Now line in the Gantt-style bar chart, and displaying in the Gantt-style bar chart the interruption and the interruption-displaced activity bar segment within an execution lane.

35. The non-transitory computer readable storage medium according to claim 23 wherein the method further comprises calculating a work-interval-boundary buffer, defined as a non-negative time span between one of the future activity bar segments, which defines a buffered activity segment, and one of the start time and the end time of one of the plurality of work intervals within which the buffered activity segment is scheduled, which defines a buffered work interval boundary, and positioning the work-interval-boundary buffer between the buffered activity segment and the buffered work interval boundary in the Gantt-style bar chart.

36. The non-transitory computer readable storage medium according to claim 23 wherein the method further comprises receiving the work event data further comprising time-limit data, calculating, using the time-limit data, a time limit characterized by a time point, and associated with one of the plurality of activities, which defines limited activity, positioning the time limit adjacent and temporally-subsequent to one of the plurality of activity bar segments of the limited activity in the Gantt-style bar chart, and displaying in the Gantt-style bar chart the time limit as a time-limit handle.

37. The non-transitory computer readable storage medium according to claim 23 wherein the method further comprises receiving the work event data further comprising time-limit data, calculating, using the time-limit data, a time limit characterized by a time point, and associated with one of the plurality of activities, which defines limited activity, positioning the time limit adjacent and temporally-precedent to one of the plurality of activity bar segments of the limited activity in the Gantt-style bar chart, and displaying in the Gantt-style bar chart the time limit as a time-limit handle.

38. The non-transitory computer readable storage medium according to claim 23 wherein the method further comprises receiving the work event data further comprising appointment data, calculating, using the appointment data, a plurality of appointments, each characterized by a respective start time and a respective end time, receiving the work event data further comprising time-limit data comprising a reference to the start time or end time of one of the plurality of appointments, which defines referential time-limit data, calculating, using the referential time-limit data, a referential time limit characterized by a time point, and associated with one of the plurality of activities, which defines a limited activity, positioning the referential time limit adjacent to one of the plurality of activity bar segments of the limited activity in the Gantt-style bar chart, and displaying in the Gantt-style bar chart the referential time limit as a time-limit handle.

* * * * *

UNITED STATES PATENT AND TRADEMARK OFFICE
CERTIFICATE OF CORRECTION

PATENT NO.        : 10,445,702 B1
APPLICATION NO.   : 15/198393
DATED             : October 15, 2019
INVENTOR(S)       : John E. Hunt It is certified that error appears in the above-identified patent and that said Letters Patent is hereby corrected as shown below:

In the Specification

Column 2, Line 31, (approx.) replace 'dates,' with --dates.--

Column 5, Line 15, replace 'invention,' with --invention.--

Column 6, Line 51, replace 'Schedule' with --Scheduling--

Column 9, Line 17, replace 'Delphi@' with --Delphi®--

Column 14, Line 9, replace 'W,' with --WI,--

Column 21, Line 60, replace 'line, A' with --line. A--

Column 26, Line 23, replace 'V/ARCHAR2' with --VARCHAR2--

Column 26, Line 43, replace '11 g' with --11g--

Column 29, Line 25, replace 'NORKINTERVAL.BeginUtc-' with --WORKINTERVAL.BeginUtc--

Column 29, Line 31, replace 'wi.ChartId=:' with --wi.ChartId =--

Column 29, Line 32, replace 'bvChartId' with --:bvChartId--

Column 29, Line 45, replace 'HH24:MM' with --HH24:MI--

Column 30, Line 29, replace 'ie.' with --i.e.--

Column 32, Line 47, replace '(if' with --(If--

<div style="text-align: right;">
Signed and Sealed this
Eighteenth Day of February, 2020

Andrei Iancu
*Director of the United States Patent and Trademark Office*
</div>

Column 43, Line 54, replace 'TING.SETTINGNAME PostWorkIntervalBeginBuffer' with --TING.SETTINGNAME = PostWorkIntervalBeginBuffer--

Column 46, Line 1, replace 'NotUtc' with --NowUtc--

Column 46, Line 47, replace 'p_time_utils.GetCurr-TimeUtc' with --p_time_utils.GetCurrTimeUtc--

Column 47, Line 63, replace 'EndUtc ≥ the' with --EndUtc ≤ the--

Column 53, Line 48, replace 'Activity' with --ACTIVITY--

Column 53, Line 67, replace 'executed,' with --executed.--

Column 54, Line 24, replace 'ExecutionStatus The extent' with
--ExecutionStatus
      The extent--

Column 55, Line 52, replace 'routine,' with --routine.--

Column 55, Line 62, replace 'BeginUtc is NowUtc' with --BeginUtc is ≥NowUtc--

Column 58, Line 28, replace 'THREAT_VIOLATION__HIGH' with
--THREAT_VIOLATION_HIGH--

Column 59, Line 10, replace 'LeninMin' with -- LenInMin--

Column 59, Line 34, replace 'Suppress Transect' with --SuppressTransect--

Column 60, Line 42, replace 'Chart' with --CHART--

Column 61, Line 28, replace 'chart,' with --chart.--

Column 61, Line 29, replace 'Chartuser' with --CHARTUSER--

Column 61, Line 38, replace 'Interruption' with --INTERRUPTION--

Column 61, Line 50, replace 'chart,' with --chart.--

Column 62, Line 57, replace 'Begin Utc' with --BeginUtc--

Column 63, Line 20, replace 'keys)' with --keys).--

Column 63, Line 59, replace 'it,' with --it.--

Column 63, Line 63, replace 'it,' with --it.--

CERTIFICATE OF CORRECTION (continued)
U.S. Pat. No. 10,445,702 B1

Column 64, Line 8, replace 'it,' with --it.--

Column 65, Line 21, replace 'NA' with --N--

Column 65, Line 45, replace 'PostBeginBufLUtc' with --PostBeginBufUtc--

Column 65, Line 50, replace 'chart,' with --chart.--

Column 66, Line 19, replace 'WOtkINTERVALDEFINITIOIN' with --WORKINTERVALDEFINITION--

Column 66, Line 41, replace 'Mondays,' with --Mondays.--

Column 66, Lines 42-43, replace '(Analogous Table Attributes for the Remaining Days of the Week)' with --(Analogous table attributes for the remaining days of the week)--

In the Claims

Claim 1, Column 66, Line 62, replace 'forecastinq' with --forecasting--

Claim 1, Column 67, Line 19, replace 'display via' with --display, via--

Claim 20, Column 70, Line 56, replace 'forecastinq' with --forecasting--

Claim 20, Column 70, Line 61, replace 'forecastinq' with --forecasting--

Claim 36, Column 74, Line 3, replace 'defines limited' with --defines a limited--

Claim 37, Column 74, Line 16, replace 'defines limited' with --defines a limited--